(12) United States Patent
Lee et al.

(10) Patent No.: US 12,453,733 B2
(45) Date of Patent: Oct. 28, 2025

(54) COMPOSITION FOR PREVENTION OR TREATMENT OF INTRACTABLE EPILEPSY COMPRISING mTOR INHIBITOR

(71) Applicant: SoVarGen Co., Ltd., Daejeon (KR)

(72) Inventors: Jeong Ho Lee, Daejeon (KR); Jae Seok Lim, Daejeon (KR); Woo-Il Kim, Daejeon (KR); Dong Seok Kim, Seoul (KR); Hoon Chul Kang, Seoul (KR); Se Hoon Kim, Seoul (KR)

(73) Assignee: SoVarGen Co., Ltd., Daejeon (KR)

( * ) Notice: Subject to any disclaimer, the term of this patent is extended or adjusted under 35 U.S.C. 154(b) by 762 days.

(21) Appl. No.: 17/171,908

(22) Filed: Feb. 9, 2021

(65) Prior Publication Data

US 2021/0186980 A1    Jun. 24, 2021

Related U.S. Application Data

(63) Continuation of application No. 15/555,622, filed as application No. PCT/KR2016/002248 on Mar. 7, 2016, now abandoned.

(30) Foreign Application Priority Data

| Mar. 6, 2015 | (KR) | 10-2015-0031606 |
| Mar. 20, 2015 | (KR) | 10-2015-0038668 |
| Jan. 29, 2016 | (KR) | 10-2016-0011747 |
| Mar. 4, 2016 | (KR) | 10-2016-0026643 |

(51) Int. Cl.
| *A61K 31/5377* | (2006.01) |
| *A01K 67/027* | (2006.01) |
| *A01K 67/0276* | (2024.01) |
| *A61K 31/436* | (2006.01) |
| *A61K 31/4375* | (2006.01) |
| *A61K 31/501* | (2006.01) |
| *A61K 31/519* | (2006.01) |
| *A61K 31/711* | (2006.01) |
| *A61P 25/08* | (2006.01) |
| *C12N 15/85* | (2006.01) |
| *C12N 15/90* | (2006.01) |
| *C12Q 1/6883* | (2018.01) |
| *G01N 33/68* | (2006.01) |

(52) U.S. Cl.
CPC ........ *A61K 31/5377* (2013.01); *A01K 67/027* (2013.01); *A01K 67/0276* (2013.01); *A61K 31/436* (2013.01); *A61K 31/4375* (2013.01); *A61K 31/501* (2013.01); *A61K 31/519* (2013.01); *A61K 31/711* (2013.01); *A61P 25/08* (2018.01); *C12N 15/85* (2013.01); *C12N 15/907* (2013.01); *C12Q 1/6883* (2013.01); *G01N 33/68* (2013.01); *A01K 2217/075* (2013.01); *A01K 2227/105* (2013.01); *A01K 2267/0356* (2013.01); *C12Q 2600/156* (2013.01)

(58) Field of Classification Search
CPC ........ A01K 2217/075; A01K 2227/105; A01K 2267/0356; A01K 67/027; A01K 67/0276; A01K 2267/0312; A01K 67/0275; A61K 31/436; A61K 31/4375; A61K 31/501; A61K 31/519; A61K 31/5377; A61K 31/711; A61K 31/4725; A61K 31/497; A61P 25/08; C12N 15/85; C12N 15/907; C12N 9/12; C12Q 1/6883; C12Q 2600/156; C12Q 1/68; C12Q 2600/112; G01N 2333/4704; G01N 2800/2857; G01N 33/68; G01N 33/6872; A23V 2002/00; A23V 2200/322
See application file for complete search history.

(56) References Cited

U.S. PATENT DOCUMENTS

| 2008/0188461 A1 | 8/2008 | Guan et al. |
| 2014/0378436 A9* | 12/2014 | Rice ................. C07D 451/02 514/211.09 |
| 2015/0065380 A1 | 3/2015 | Lee et al. |

FOREIGN PATENT DOCUMENTS

KR    10-2007-0116555    12/2007

OTHER PUBLICATIONS

Barcia (Intraventricular and Intracerebral Delivery of Anti-epileptic Dugs in the Kindling Model, Neurotherapeutics: The Journal of the American Society for Experimental Neuro Therapeutics, vol. 6, 337-343, Apr. 2009).*
U.S. Appl. No. 15/555,622, filed Sep. 5, 2017.
EPO, Extended European Search Report of EP 20211954.1 dated May 3, 2021.
Hevner, Robert, F., "Brain overgrowth in disorders of RTK-P13K-AKT signaling: A mosaic of malformations," *Seminars in Perinathology*, vol. 39, No. 1, pp. 36-43 (2014).
Ljungberg M.C. et al., "Rapamycin suppresses seizures and neuronal hypertrophy in a mouse model of cortical dysplasia," *Disease Models and Mechanisms*, pp. 389-398 (2009).
D'Gama A. M. et al., "Mammalian Target of Rapamycin Pathway Mutations Causes Hemimegalencephaly and Focal Cortical Dysplasia," *Annals of Neurology*, pp. 720-725 (2015).
Sancak, O. et al., "Mutational analysis of the TSC1 and TSC2 genes in a diagnostic setting: genotype—phenotype correlations and comparison of diagnostic DNA techniques in Tuberous Sclerosis Complex," *European Journal of Human Genetic*, pp. 731-741 (2005).

(Continued)

*Primary Examiner* — Rei Tsang Shiao
(74) *Attorney, Agent, or Firm* — Leydig, Voit & Mayer, Ltd.

(57) ABSTRACT

Provided is a use of the prophylaxis, amelioration or therapy of intractable epilepsy, for example, Focal Cortical Dysplasia (FCD).

11 Claims, 41 Drawing Sheets
Specification includes a Sequence Listing.

(56) References Cited

OTHER PUBLICATIONS

A service of the U.S. National Institutes of Health, "A Pilot Study to Evaluate the Effects of Everolimus on Brain mTOR Activity and Cortical Hyperexcitability in TSC and FCD," Clinical Trails.gov Identifier: NCTO2451696 (2015).
Wong, Michael, "Mammalian Target of Rapamycin (mTOR) Activation in Focal Cortical Dysplasia and Related Focal Cortical Malformations," *NIH Public Access Manuscript*, Exp. Neurol, 244, pp. 22-26 (2013).
Blumcke, Ingmar et al., "The clinicopathologic spectrum of focal cortical dysplasias: A consensus classification proposed by an ad hoc Task Force of the ILAE Diagnostic Methods Commission," *Epilepsia*, 52(1), pp. 158-174 (2011).
Fauser, Susanne et al., "Clinical characteristics in focal cortical dysplasia: a retrospective evaluation in a series of 120 patients," *Brian*, 129, pp. 1907-1916 (2006).
Grabiner, Brian et al., "A Diverse Array of Cancer-Associated MTOR Mutations Are Hyperactivating and Can Predict Rapamycin Sensitivity," *Cancer Discovery*, pp. 554-563 (2014).
M. Cardamone et al., "Mamma Target of Rapamycin Inhibitors for Intractable Epilepsy and Subependymal Giant Cell Astrocytomas in Tuberous Sclerosis Complex," *The Journal of Pediatrics*, vol. 184, No. 5, pp. 1195-1200 (2014).
P. Curatola et al., "mTOR inhibitors as a new therapeutic option for epilepsy", *Expert Review of Neurotherapeutics*, vol. 13, No. 6, pp. 627-638 (2013).
L. H. Zeng et al., "Rapamycin prevents epilepsy in a mouse model of tuberous sclerosis complex," *Annals of Neurology*, vol. 63, No. 4, pp. 444-453 (2008).
J. S. Lim et al., "Brain somatic mutations in MTOR cause focal cortical dysplasia type II leading to intractable epilepsy," *Nature Medicine*, vol. 21, No. 4, pp. 395-400 (2015).
Epo, the partial supplementary European Search Report of EP 16761953.5 dated Jul. 20, 2018.
Marin-Valencia, "Pathogenetic Mechanisms of Focal Cortical Dysplasia," *Epilepsia*, pp. 970-978 (2014).
Drug Topic, Overview of pharmaceutical excipients used in tablets and capsules, pp. 1-15 (2008).

\* cited by examiner

[FIG. 1a]
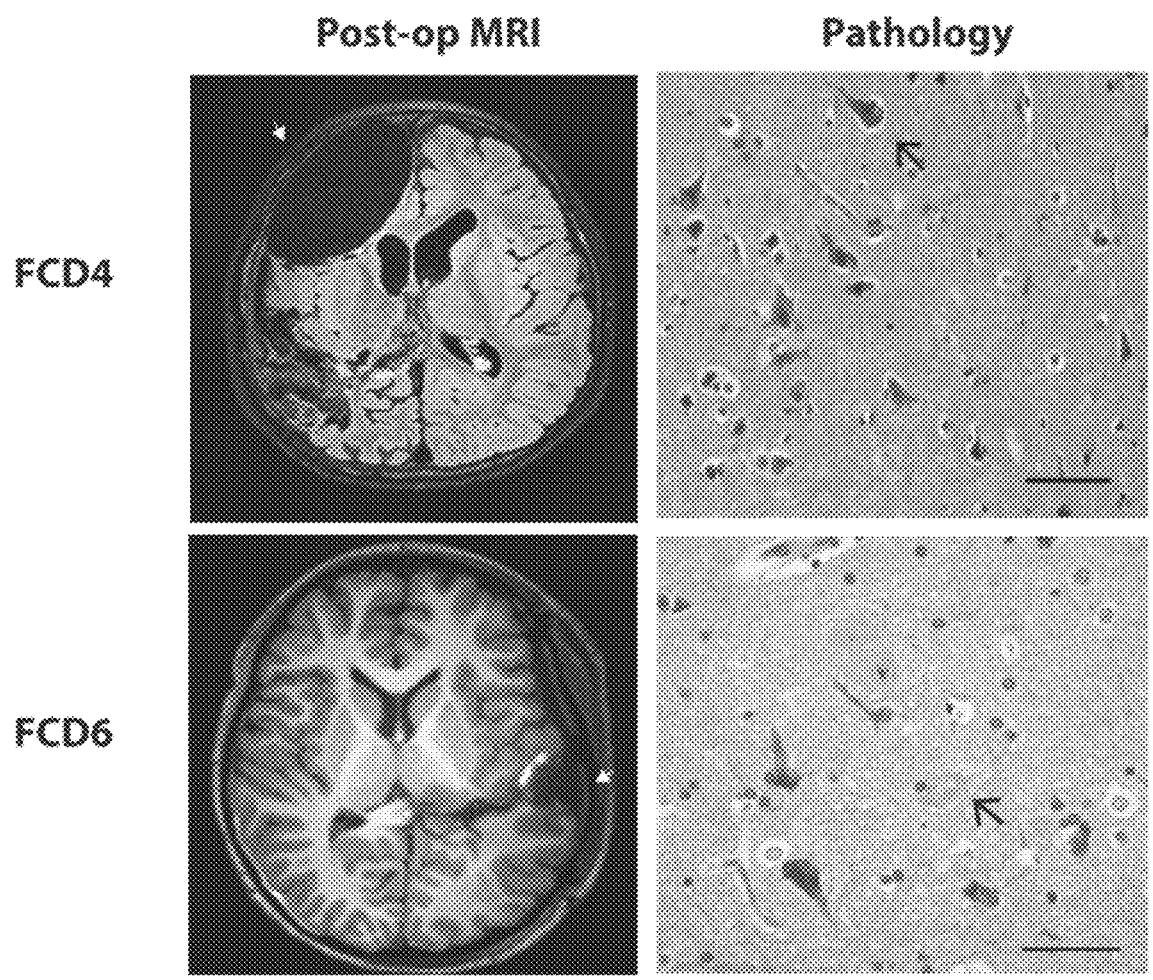

[FIG. 1b]
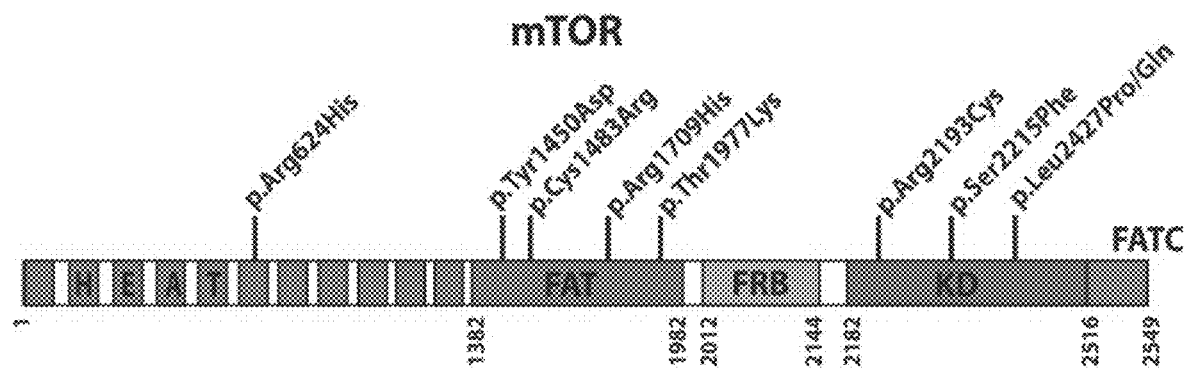
[FIG. 1c]

[FIG. 2a]
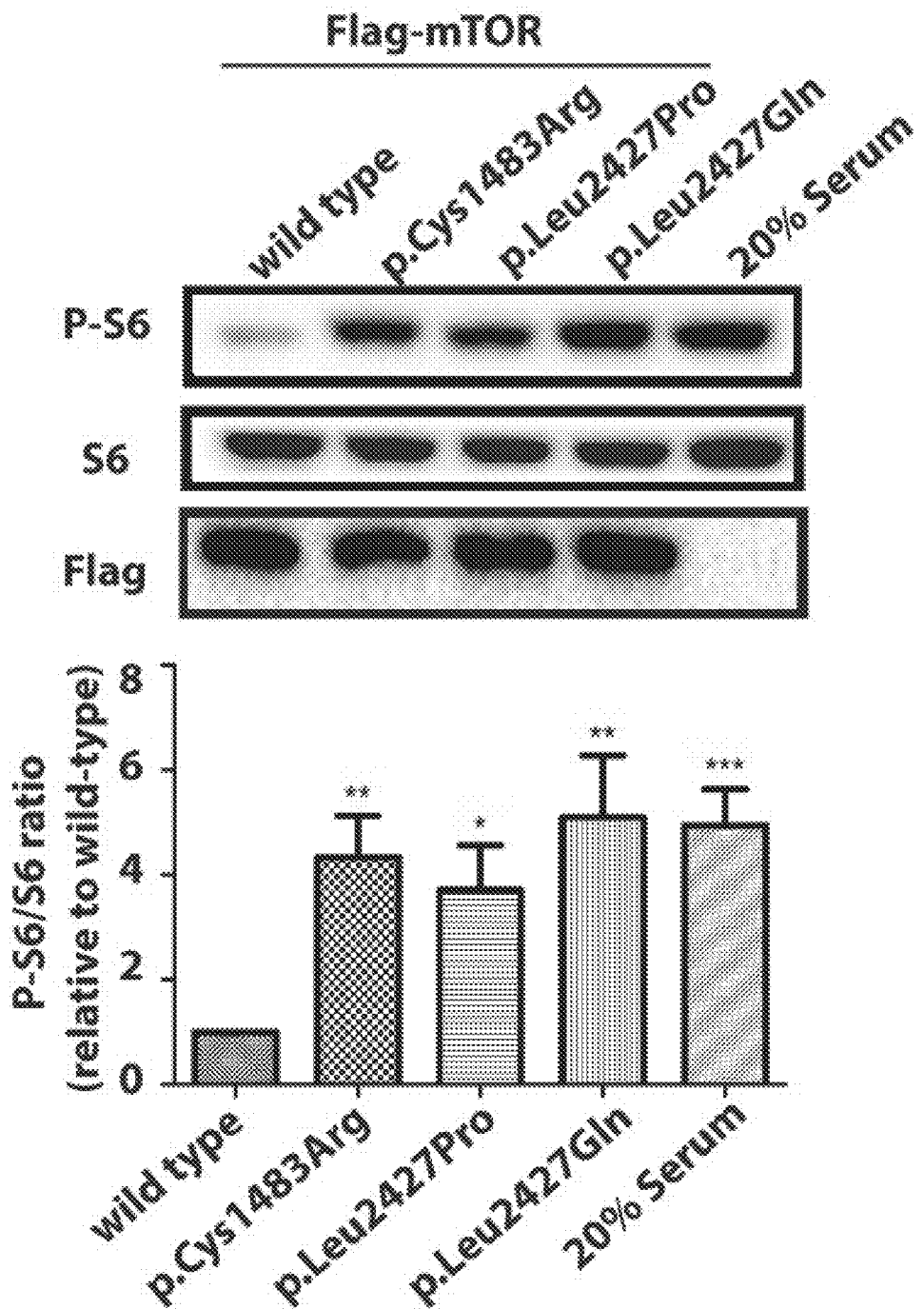

[FIG. 2b]
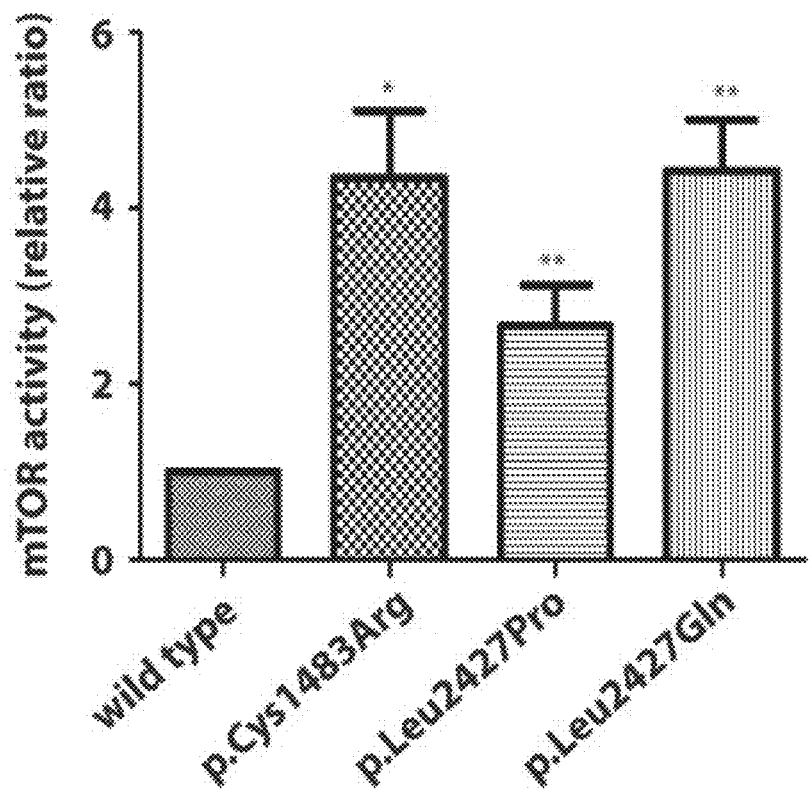

[FIG. 2c]
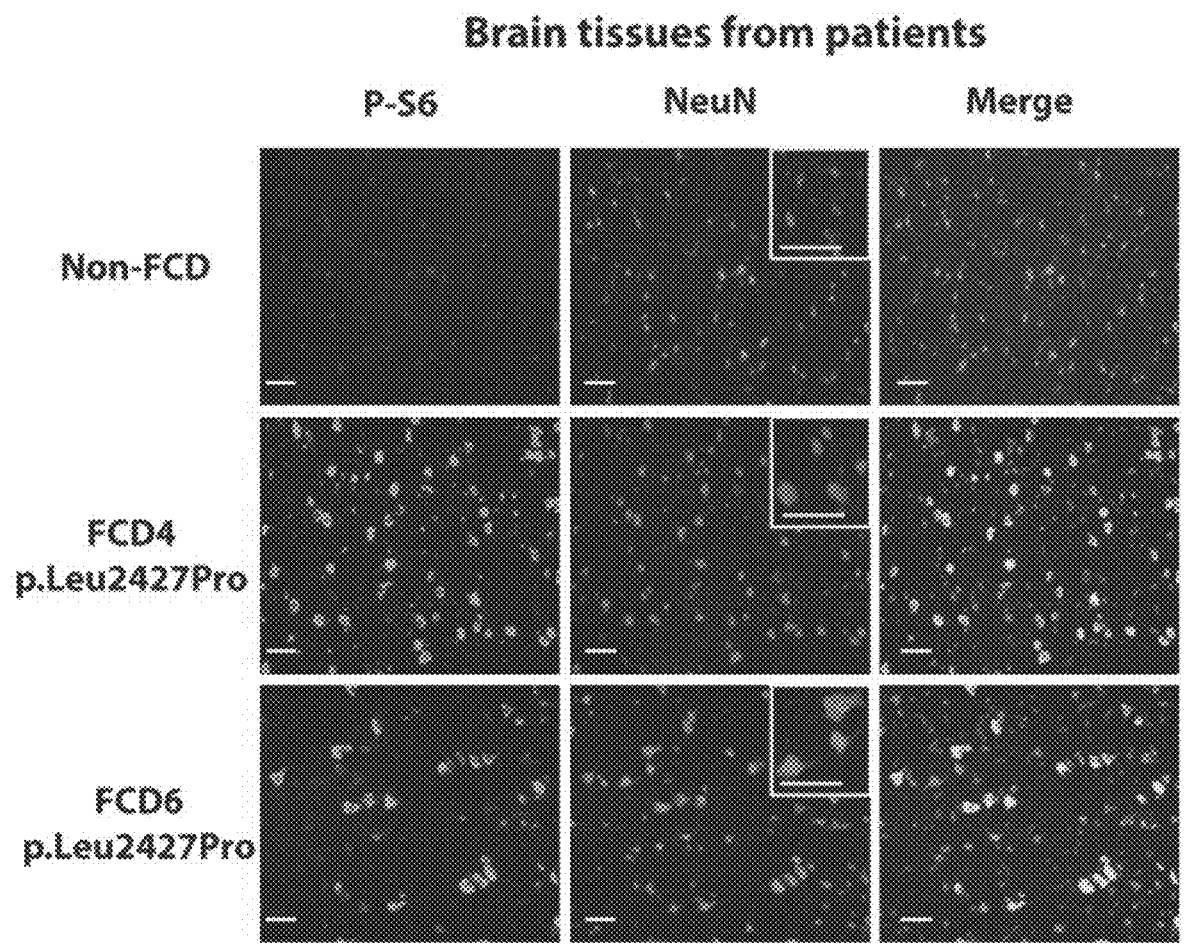

[FIG. 2d]
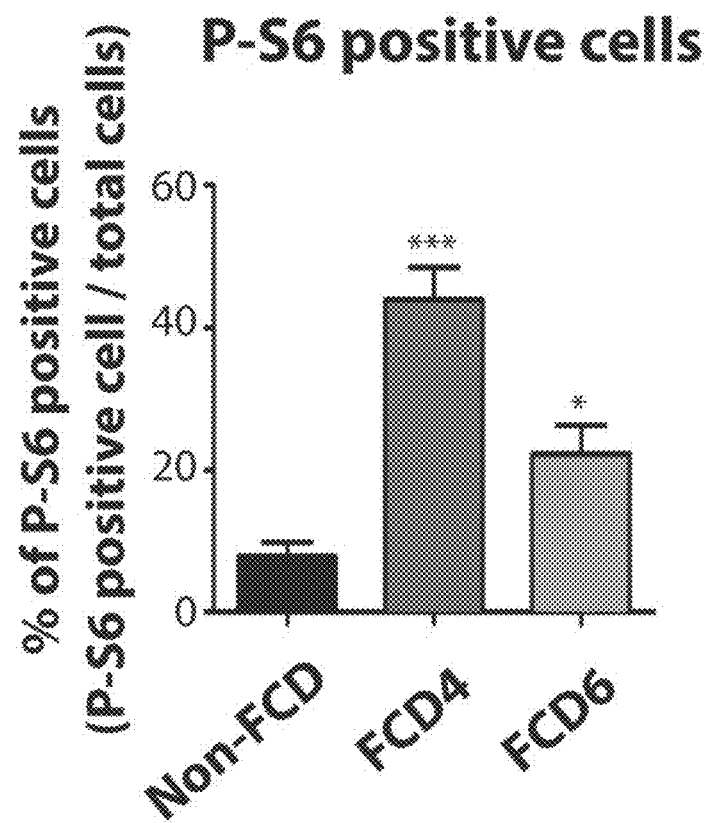

[FIG. 2e]
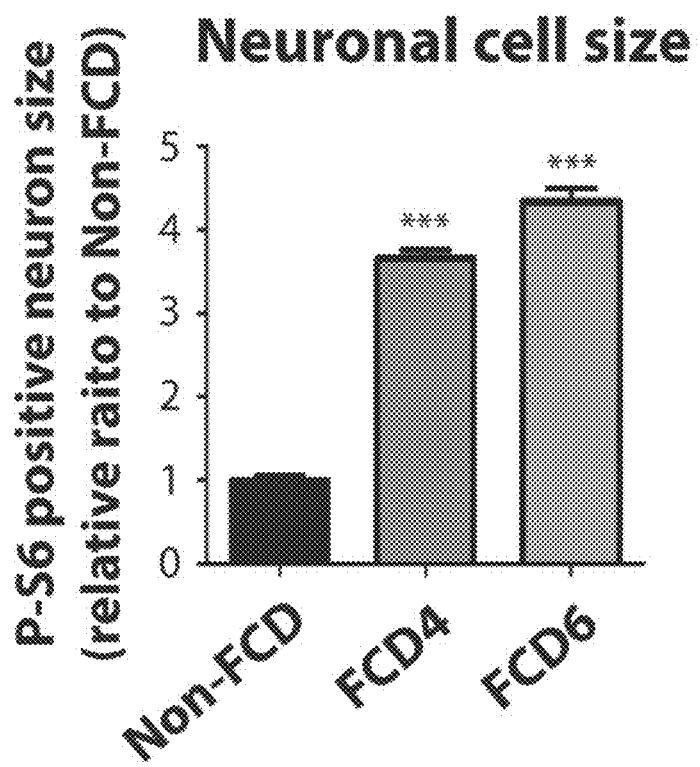
[FIG. 3a]
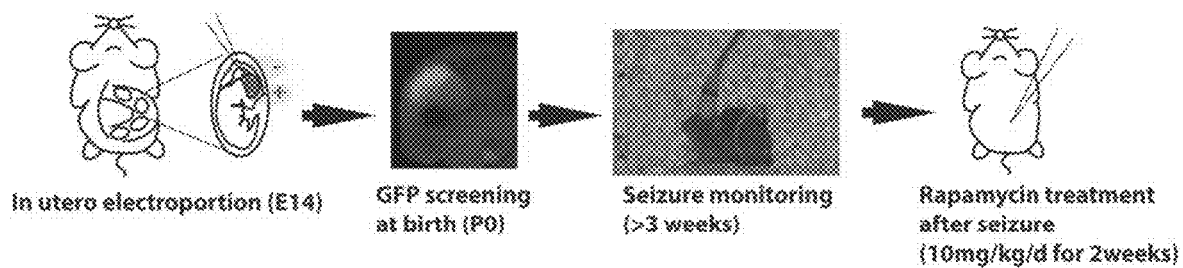

[FIG. 3b]
| Group | No. of GFP+ pups | No. of mice with seizure | % |
|---|---|---|---|
| Wild type | 8 | 0 | 0 |
| p.Leu2427Pro | 23 | 21 | 91.3 |
[FIG. 3c]
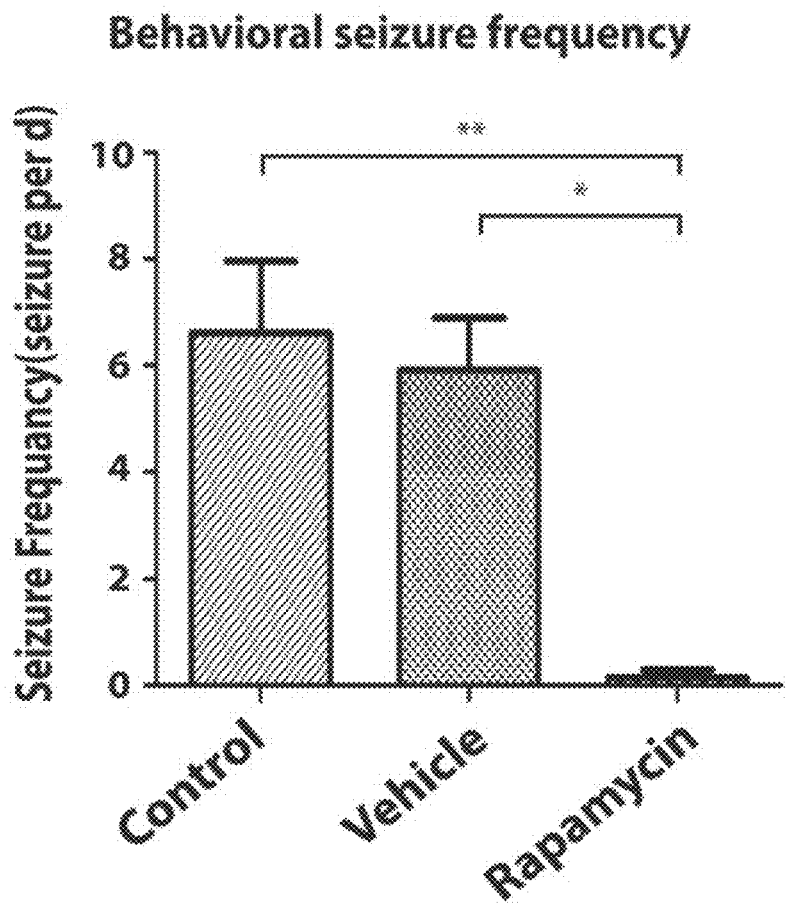

[FIG. 3d]
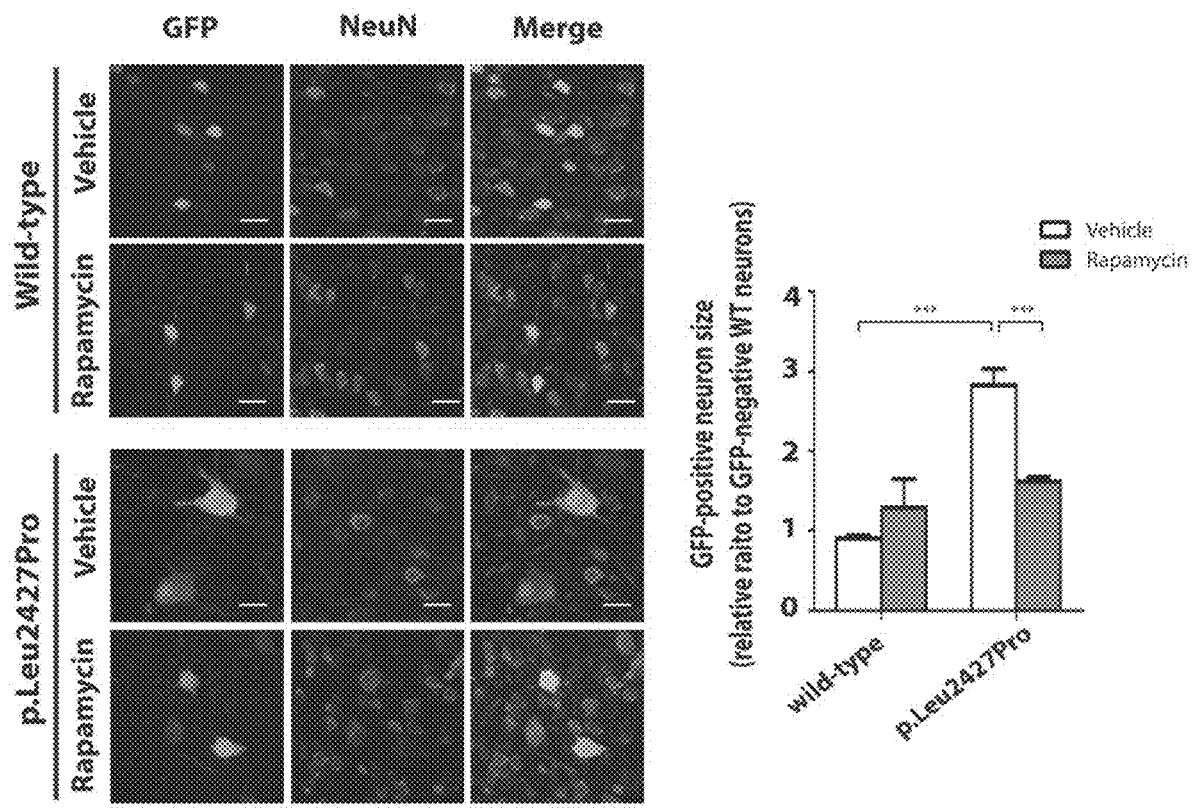

[FIG. 4]
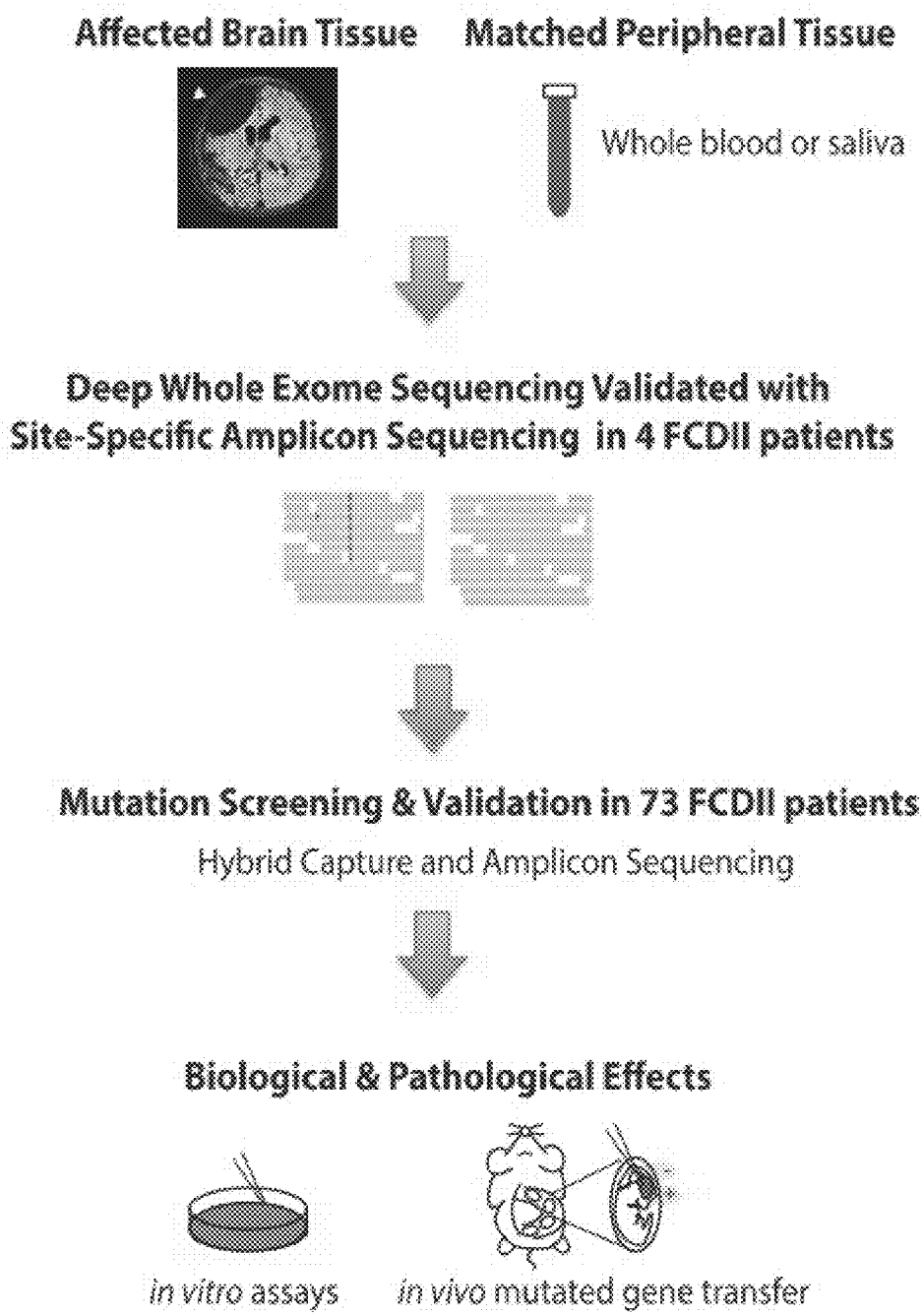

[FIG. 5a]
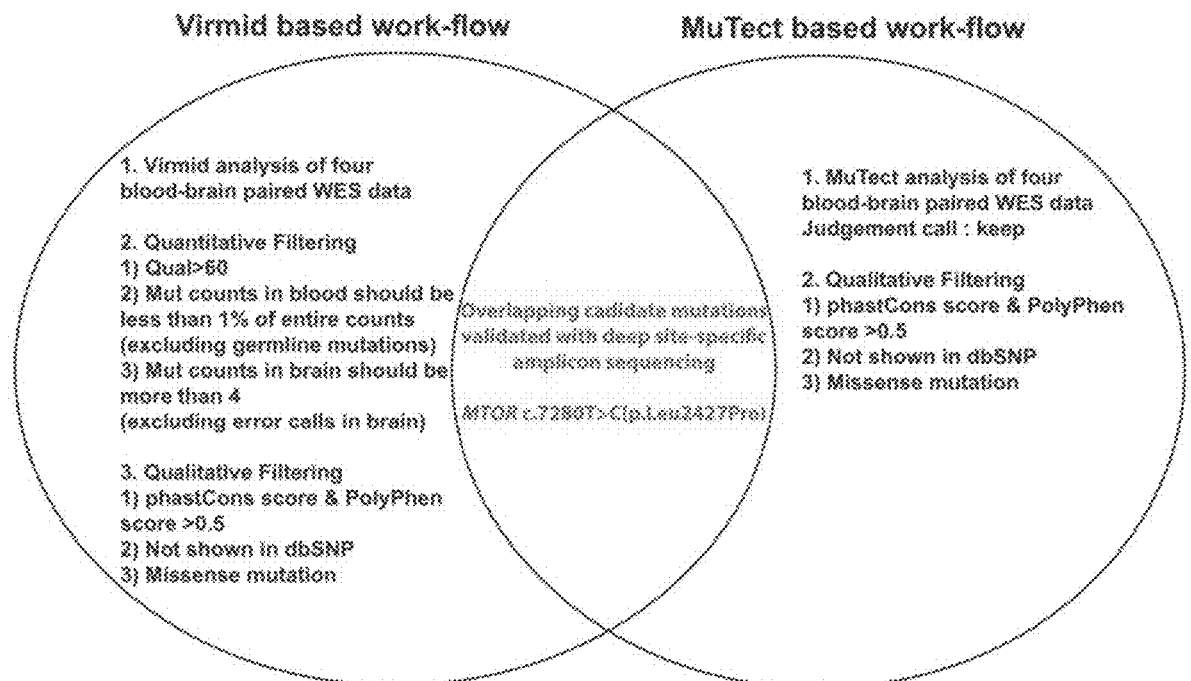
[FIG. 5b]
MTOR c.7280T>C
(p.Leu2427Pro)
| | Deep whole exome sequencing | | | | | | Deep amplicon sequencing | | | | | |
|---|---|---|---|---|---|---|---|---|---|---|---|---|
| | Brain | | | Blood | | | | Brain | | | Blood | | |
| | Ref | Mut | % | Ref | Mut | % | | Ref | Mut | % | Ref | Mut | % |
| FCD4 | 338 | 36 | 9.6 | 268 | 0 | 0 | FCD4 | 150,460 | 21,751 | 12.6 | 937 | 4 | 0.43 |
| FCD6 | 270 | 20 | 6.9 | 417 | 0 | 0 | FCD6 | 141,798 | 11,140 | 7.3 | 1262 | 4 | 0.32 |

[FIG. 6]
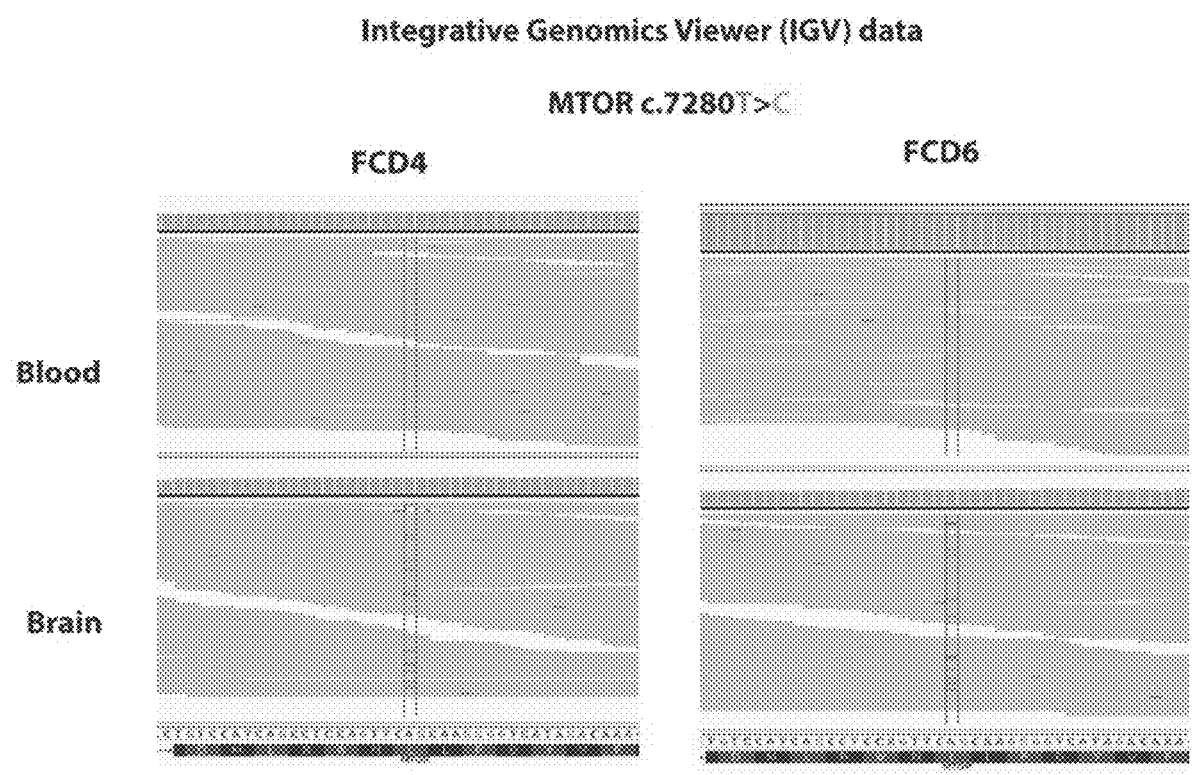

[FIG. 7]
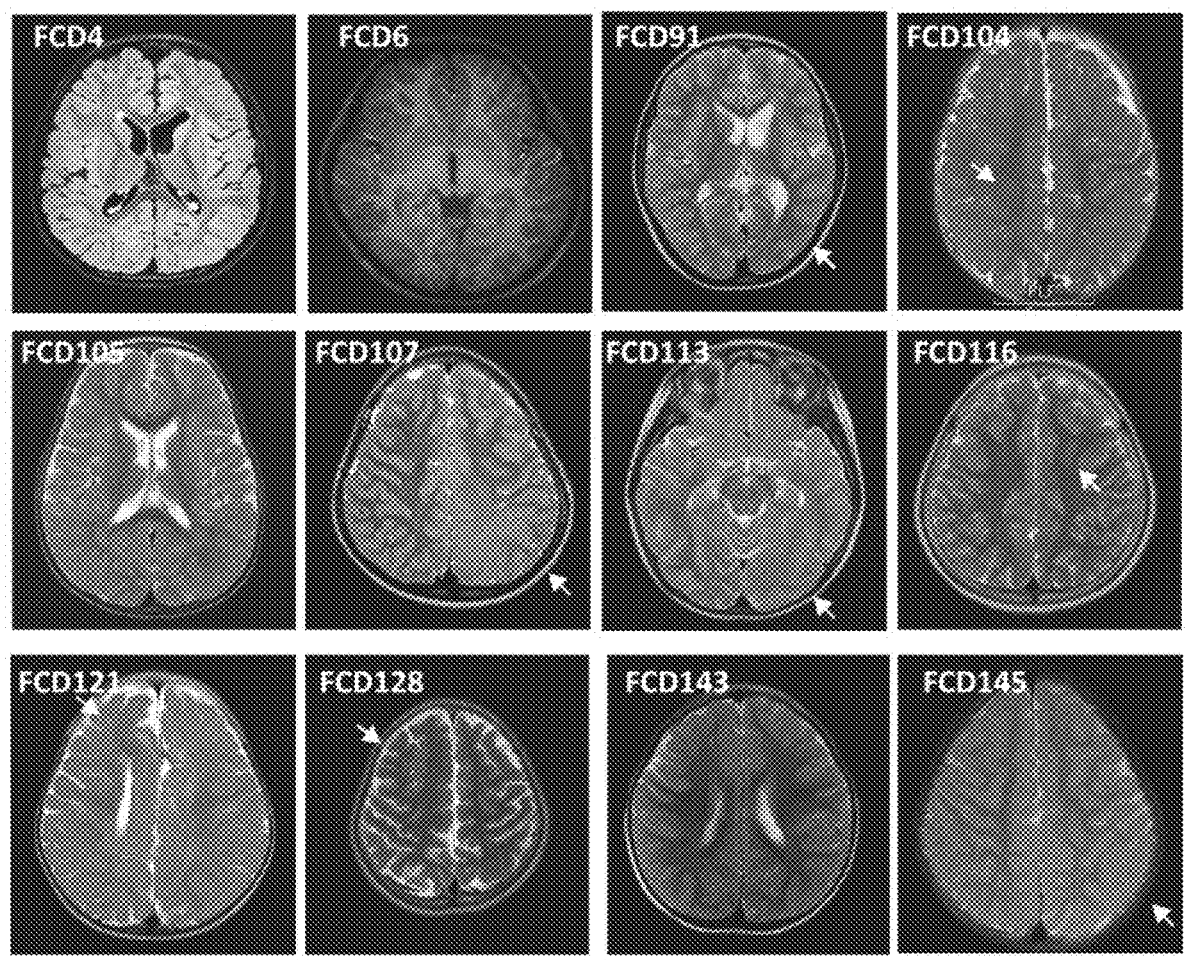

[FIG. 8]
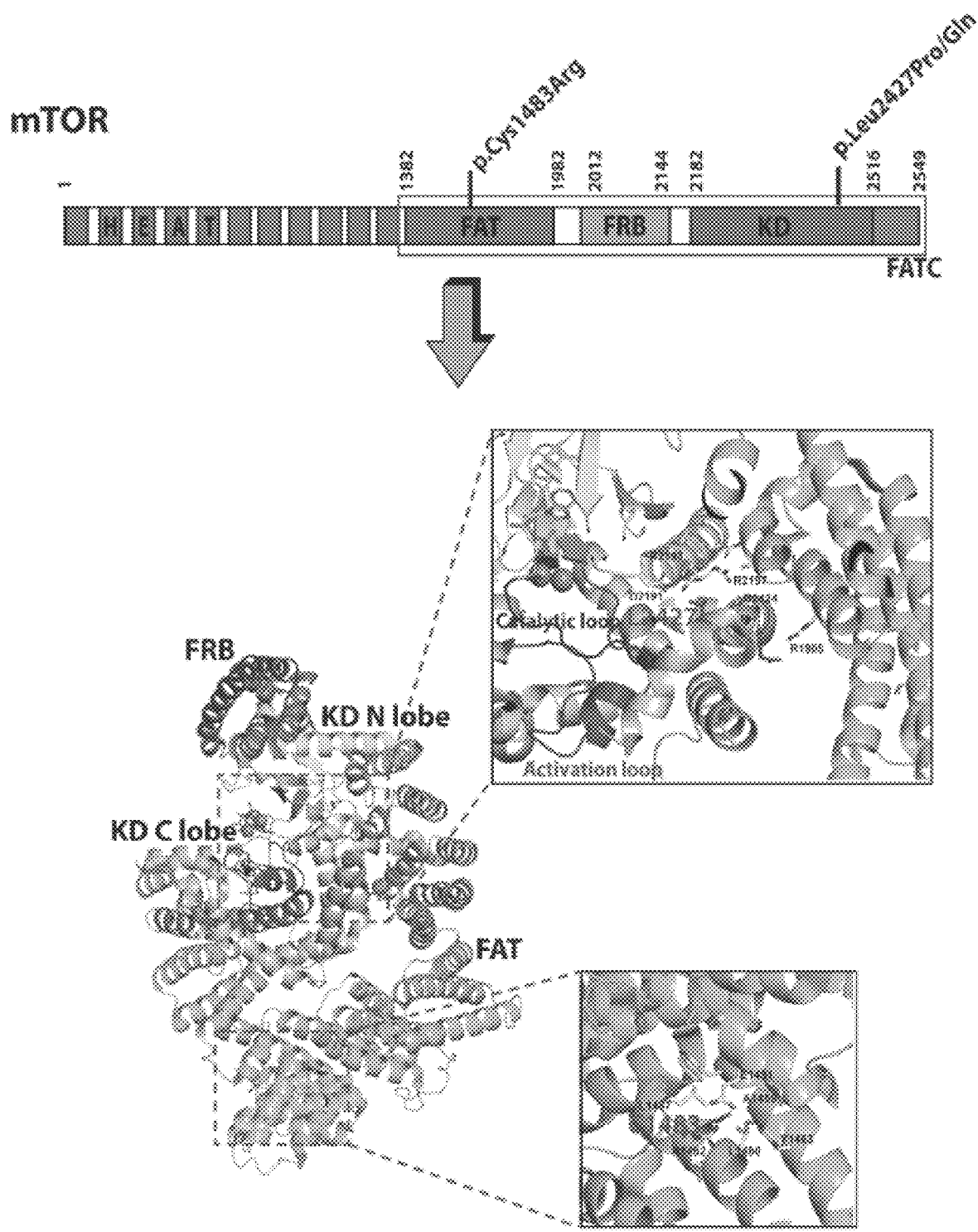

[FIG. 9a]
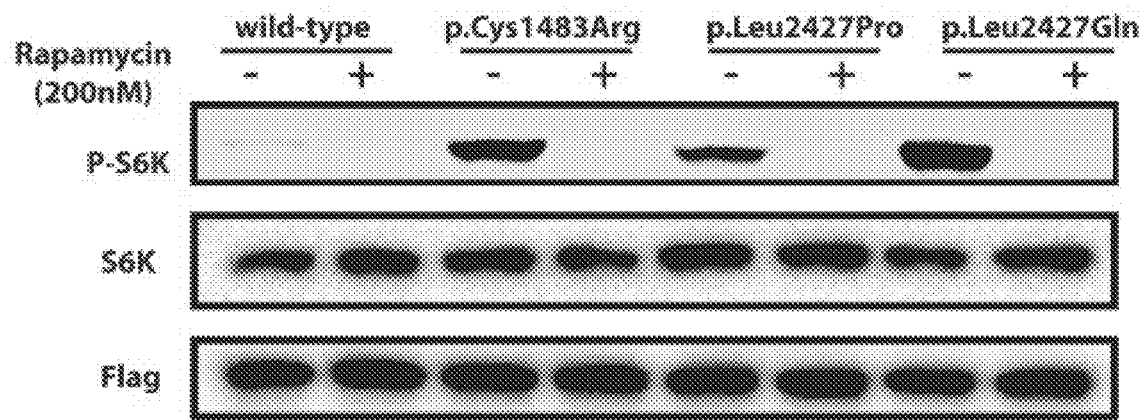
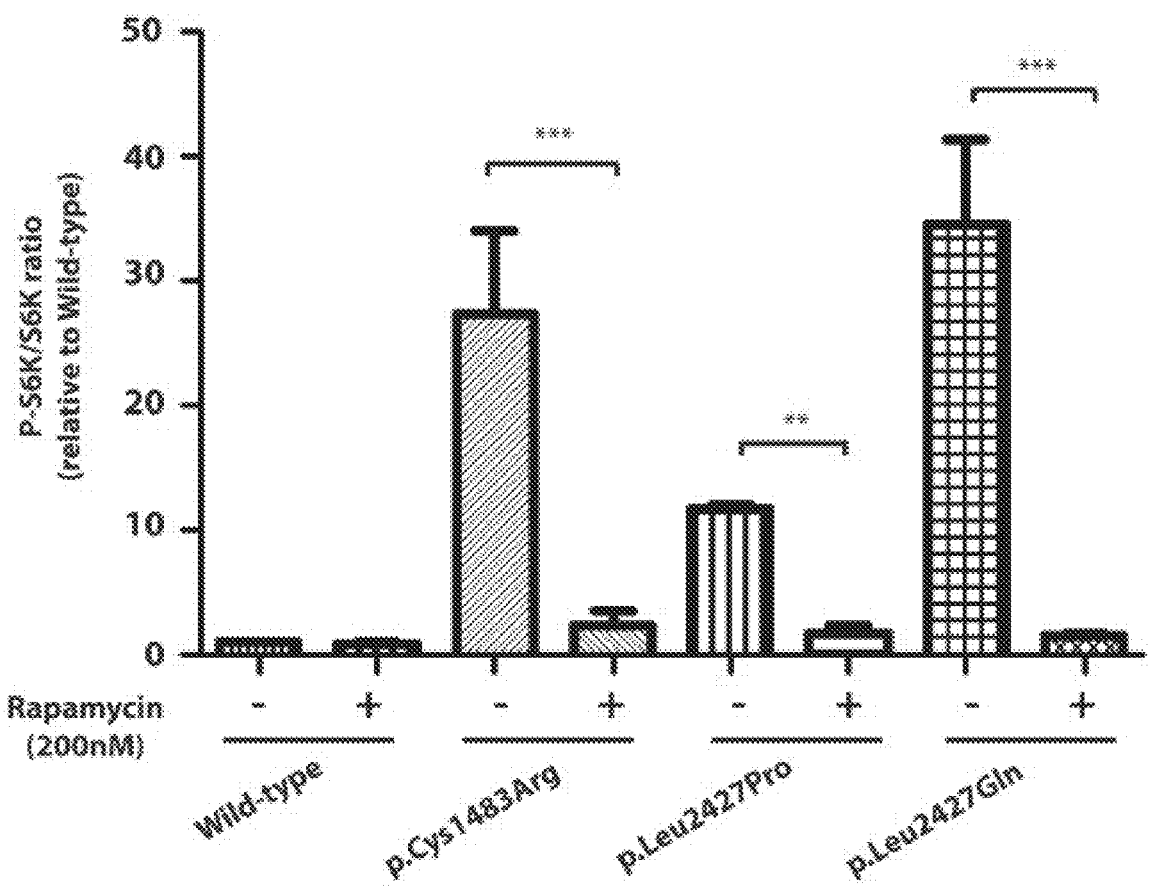

[FIG. 9b]
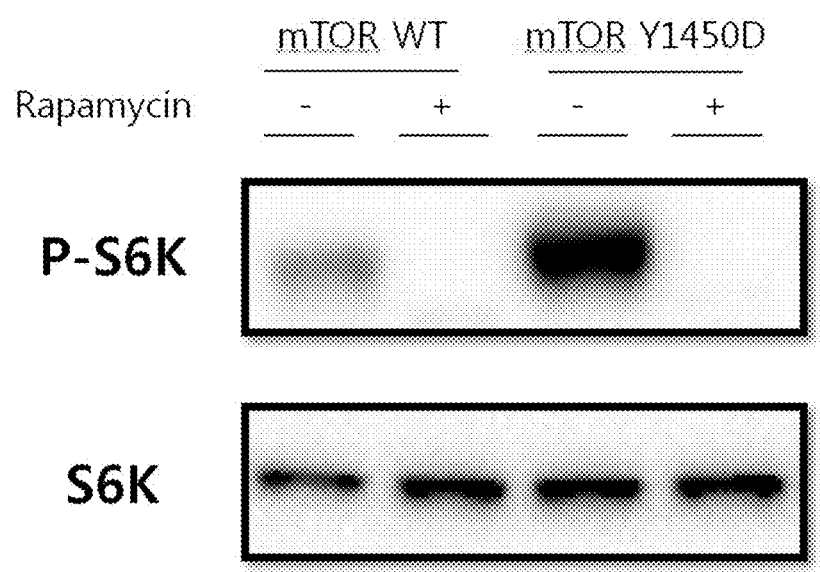

[FIG. 9c]
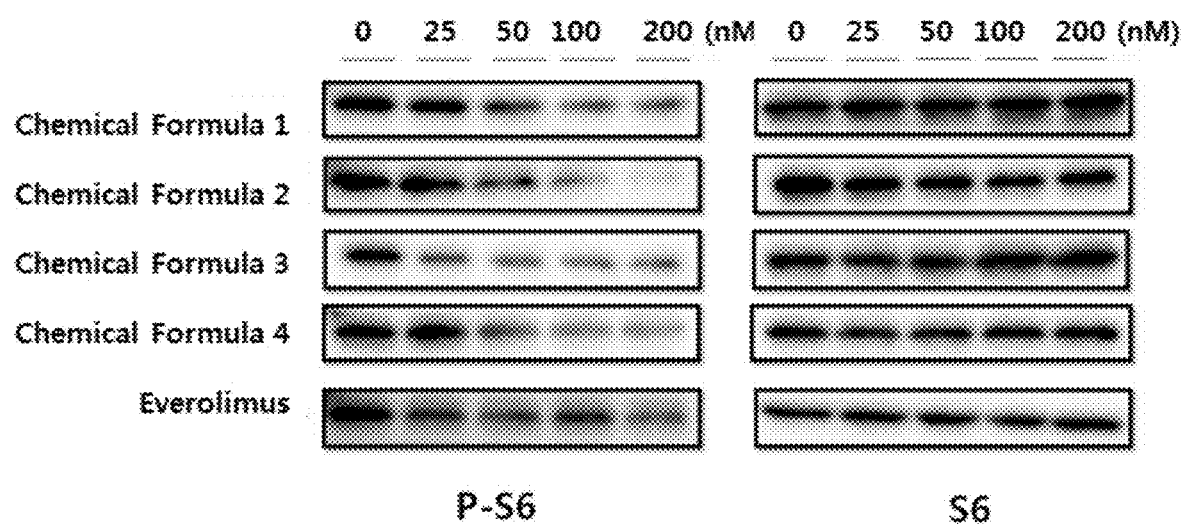

[FIG. 10]
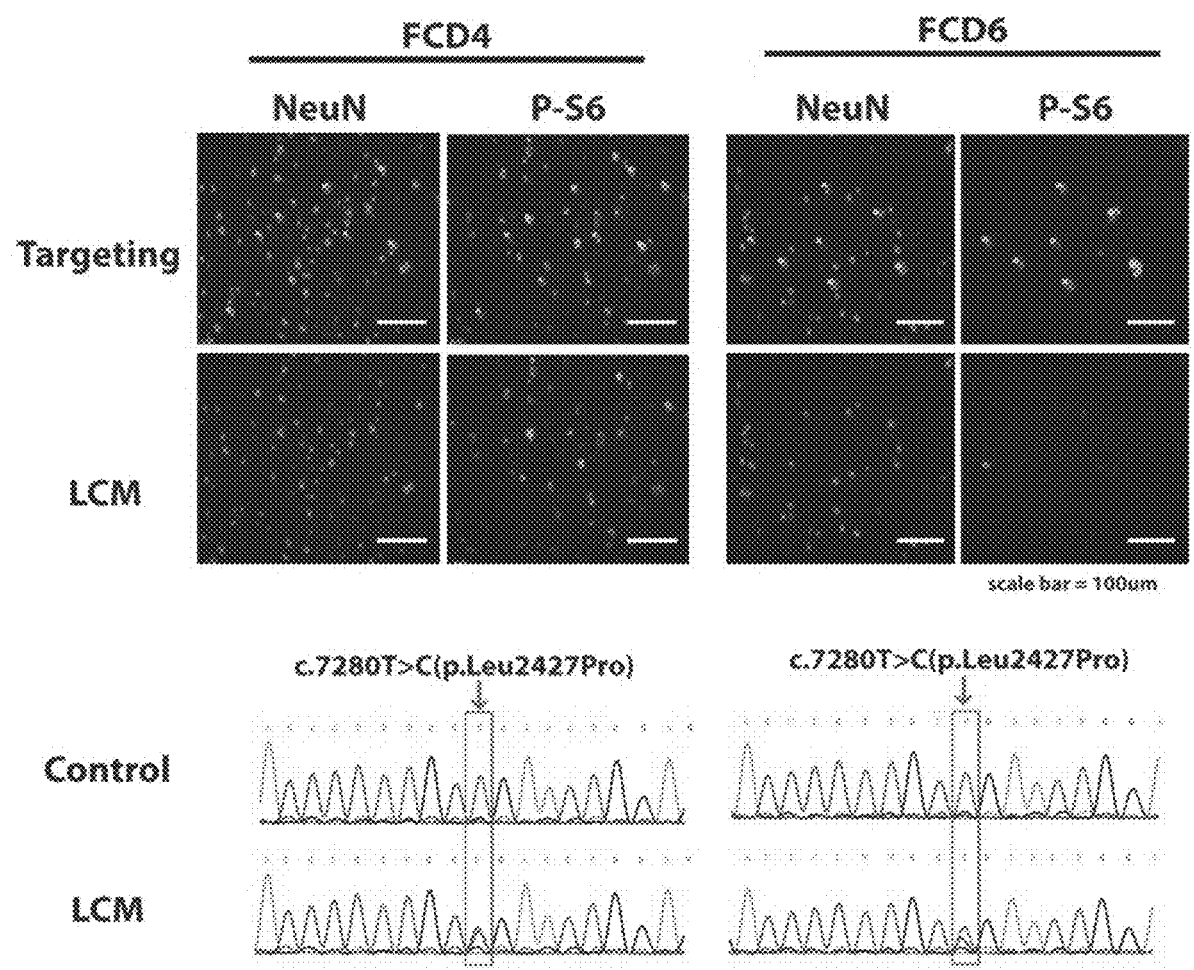

[FIG. 11a]
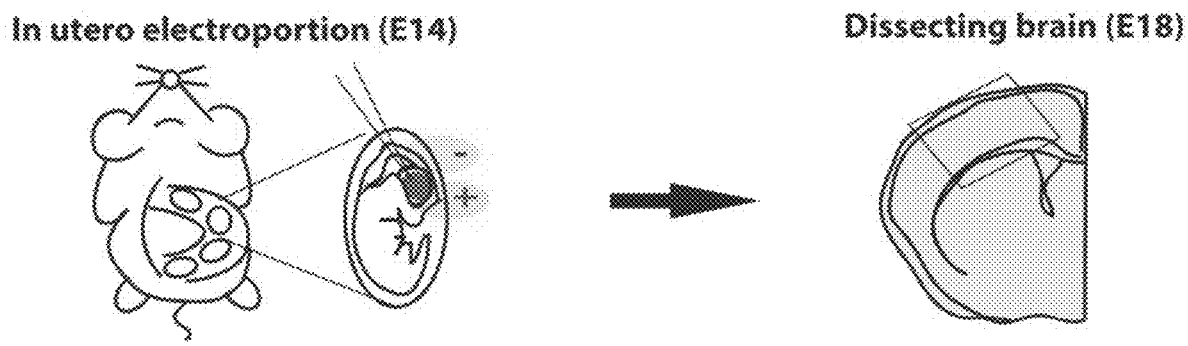
[FIG. 11b]
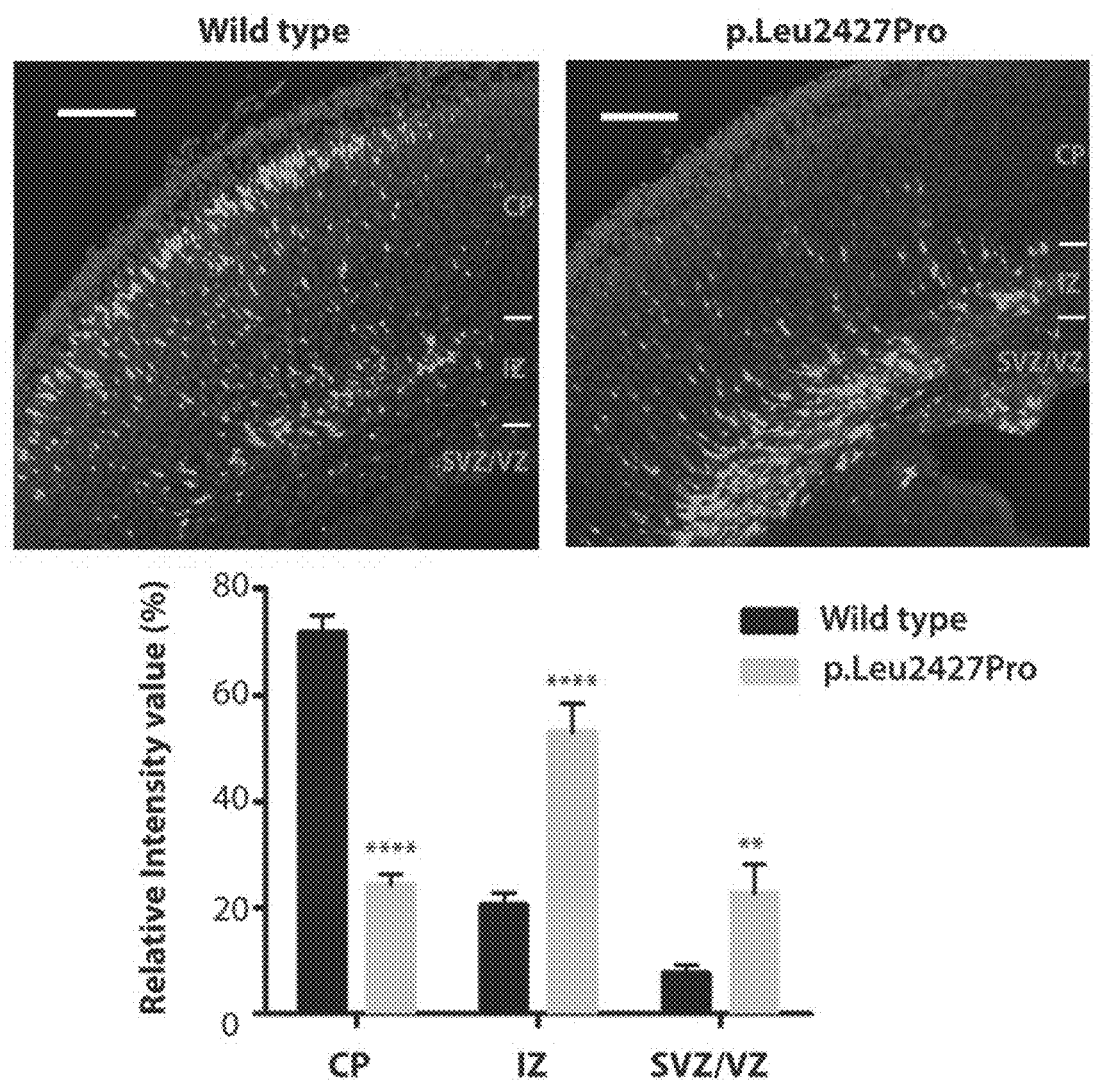

[FIG. 11c]
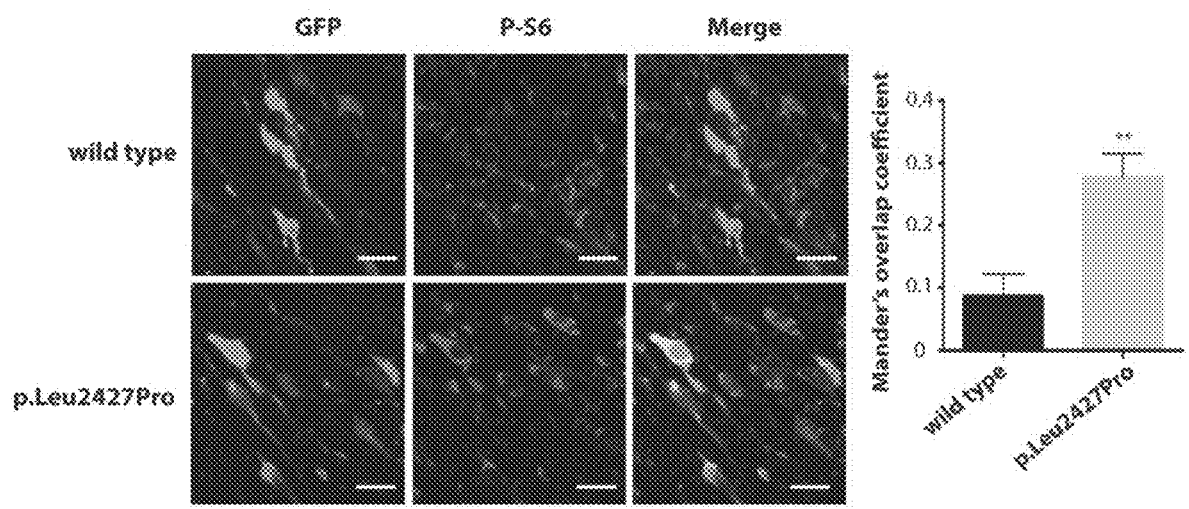
[FIG. 12a]
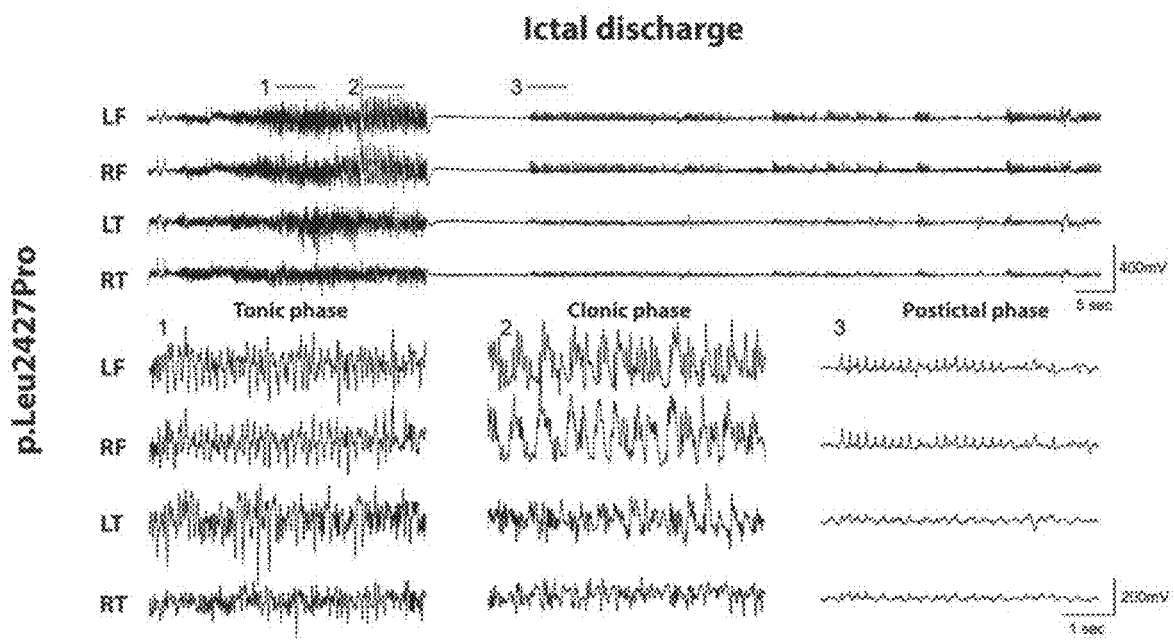

[FIG. 12b]
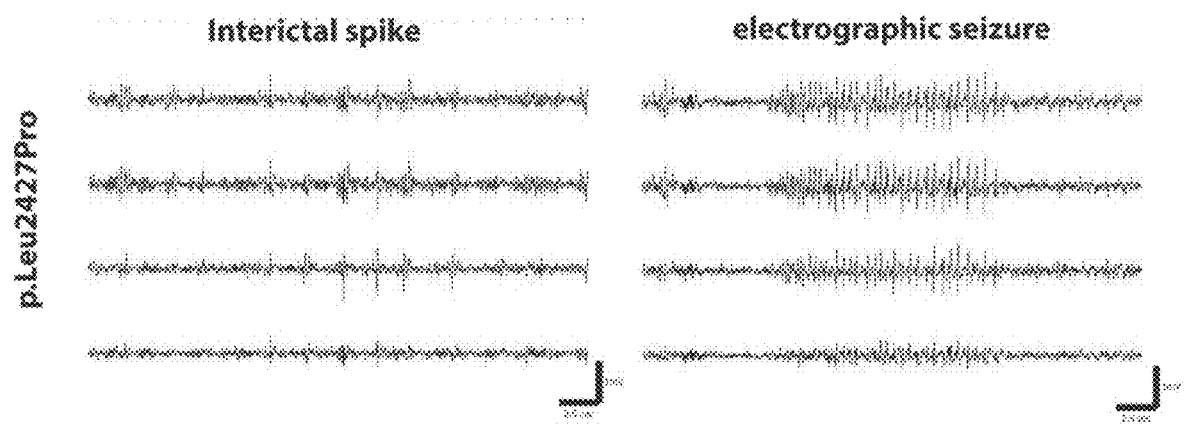
[FIG. 12c]
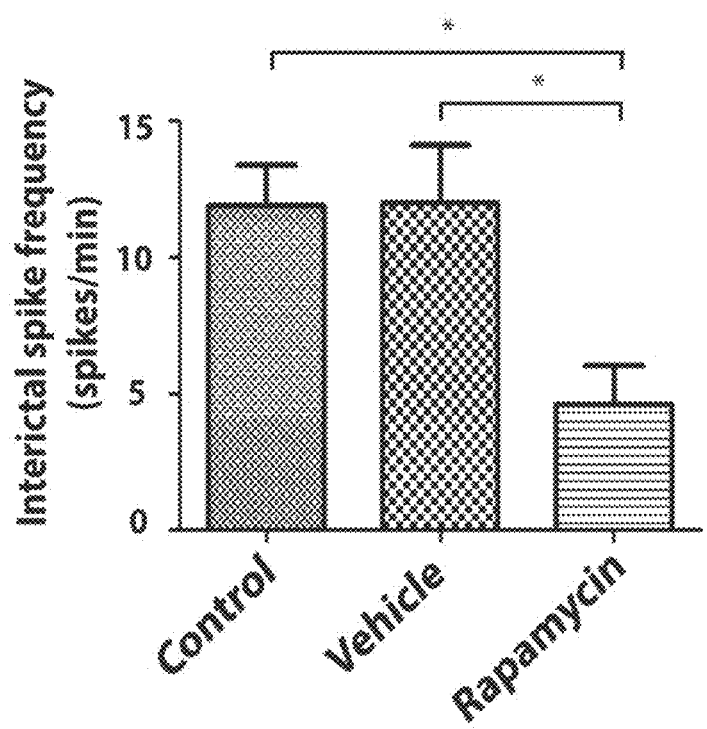

[FIG. 12d]
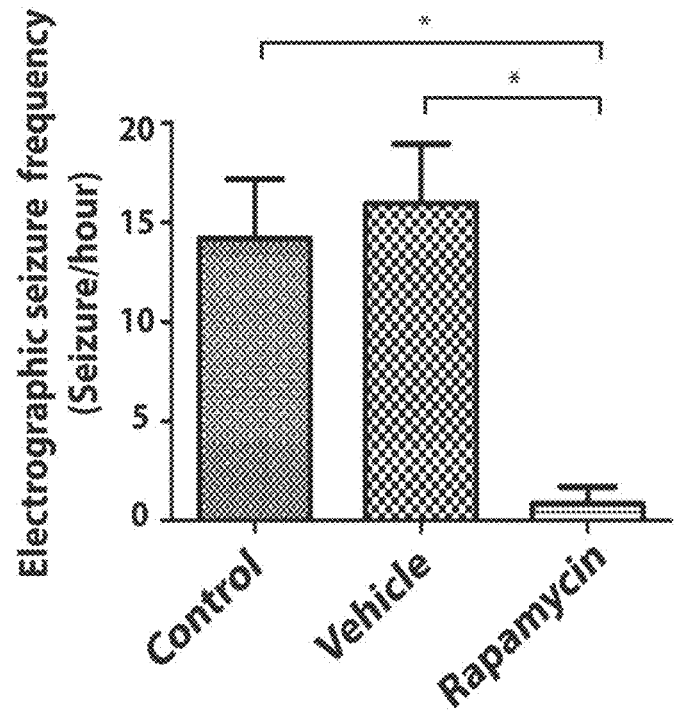
[FIG. 12e]
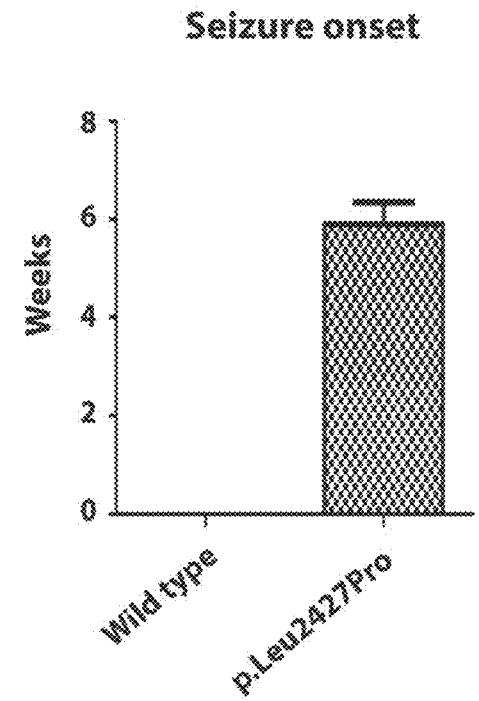

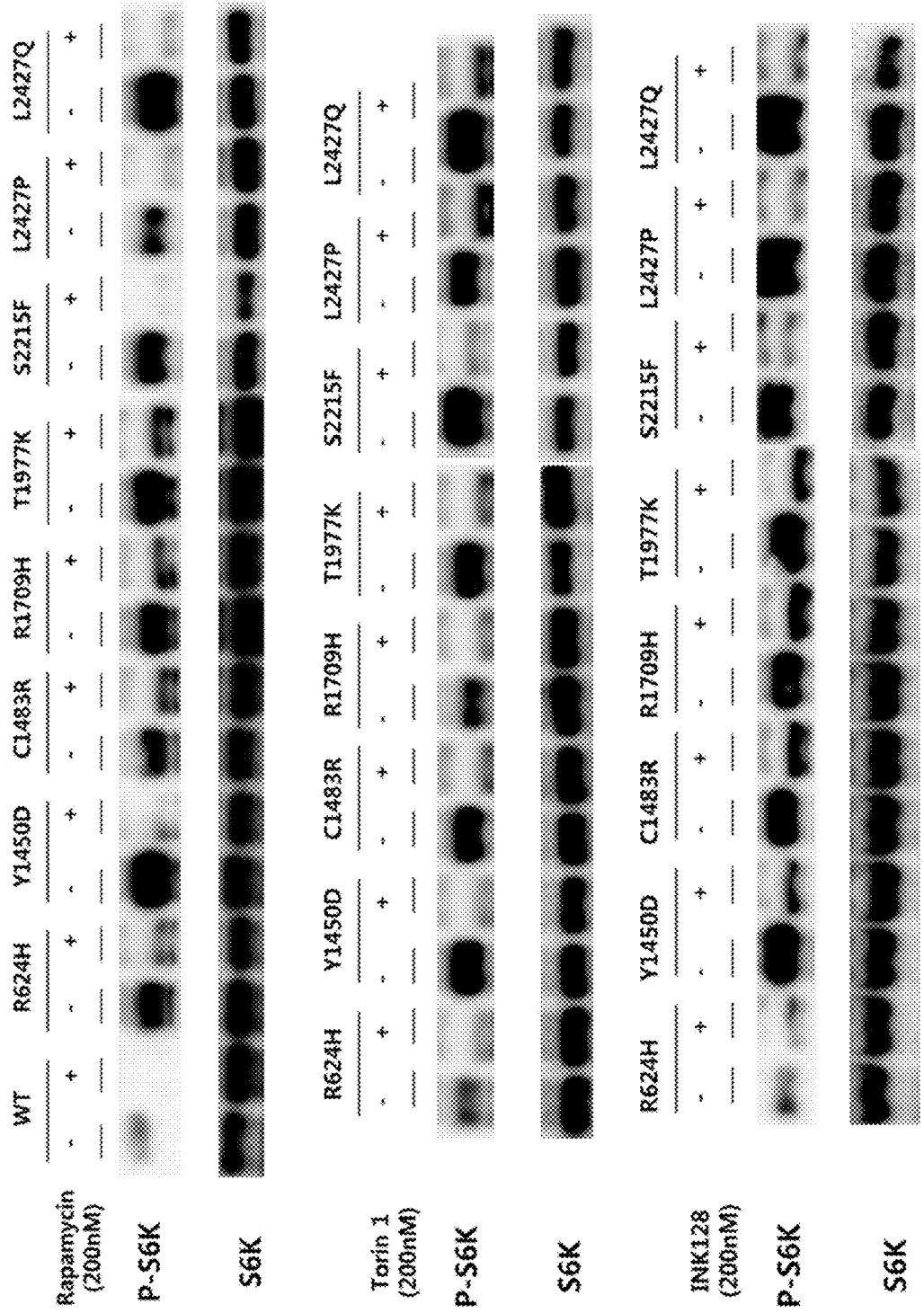
[FIG. 13]

[FIG. 14]

[FIG. 15]
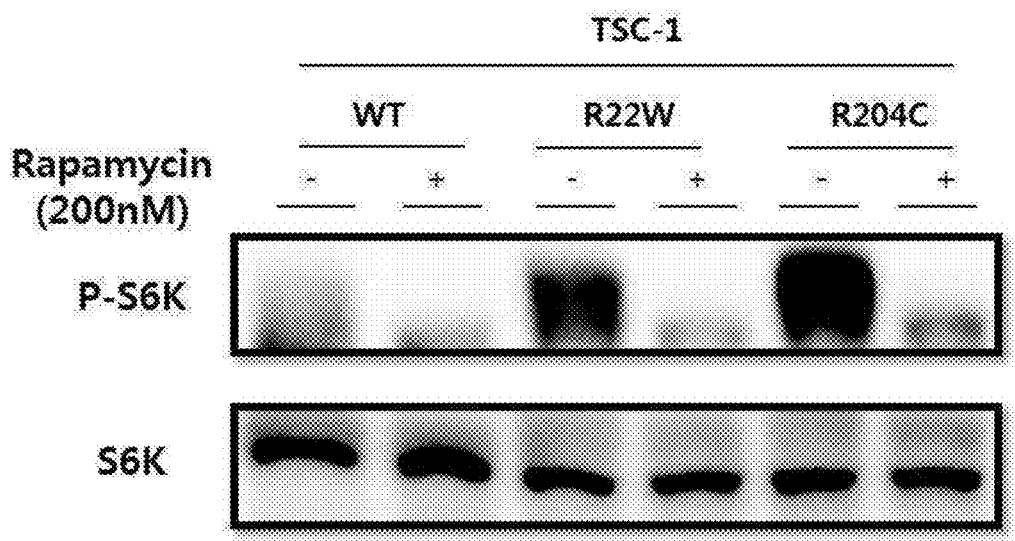
[FIG. 16]
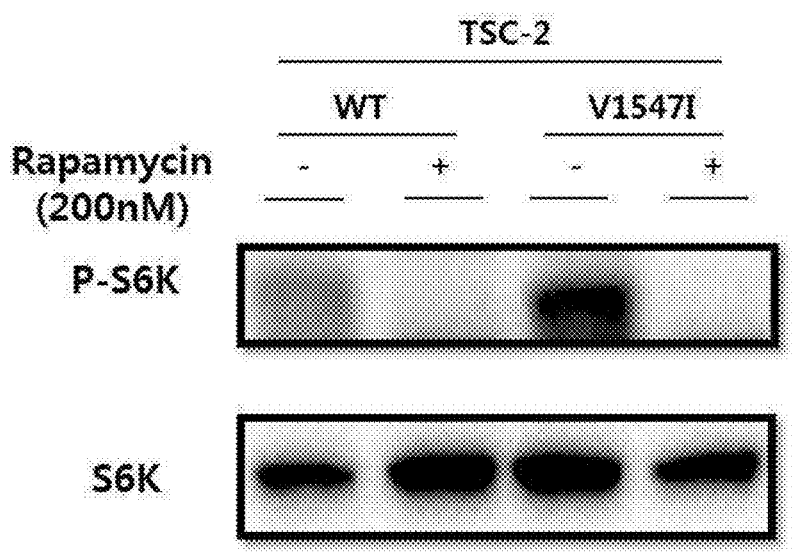

【FIG. 17】
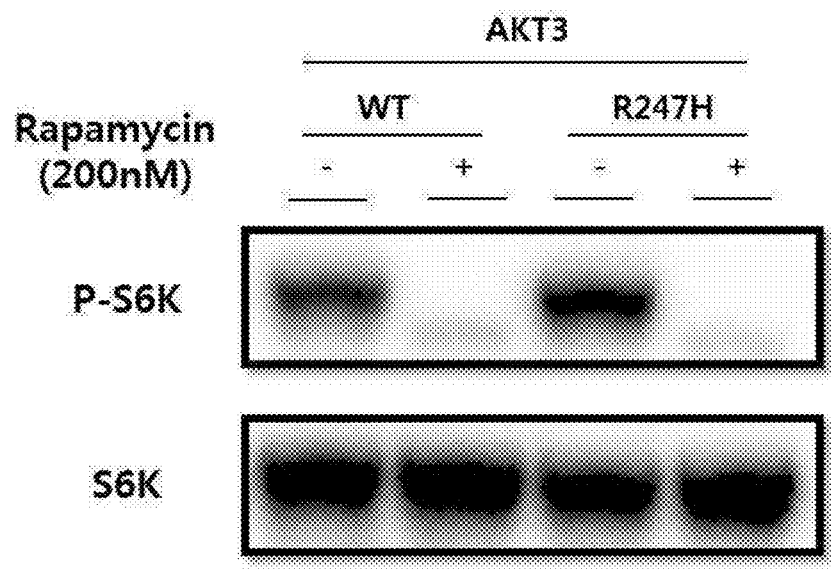
【FIG. 18】
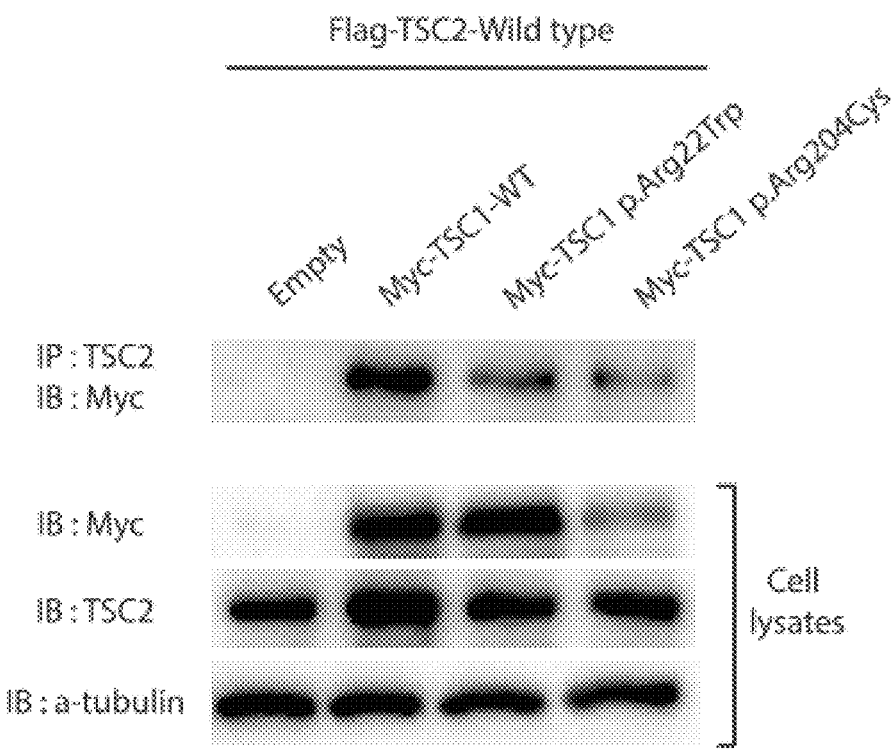

[FIG. 19]
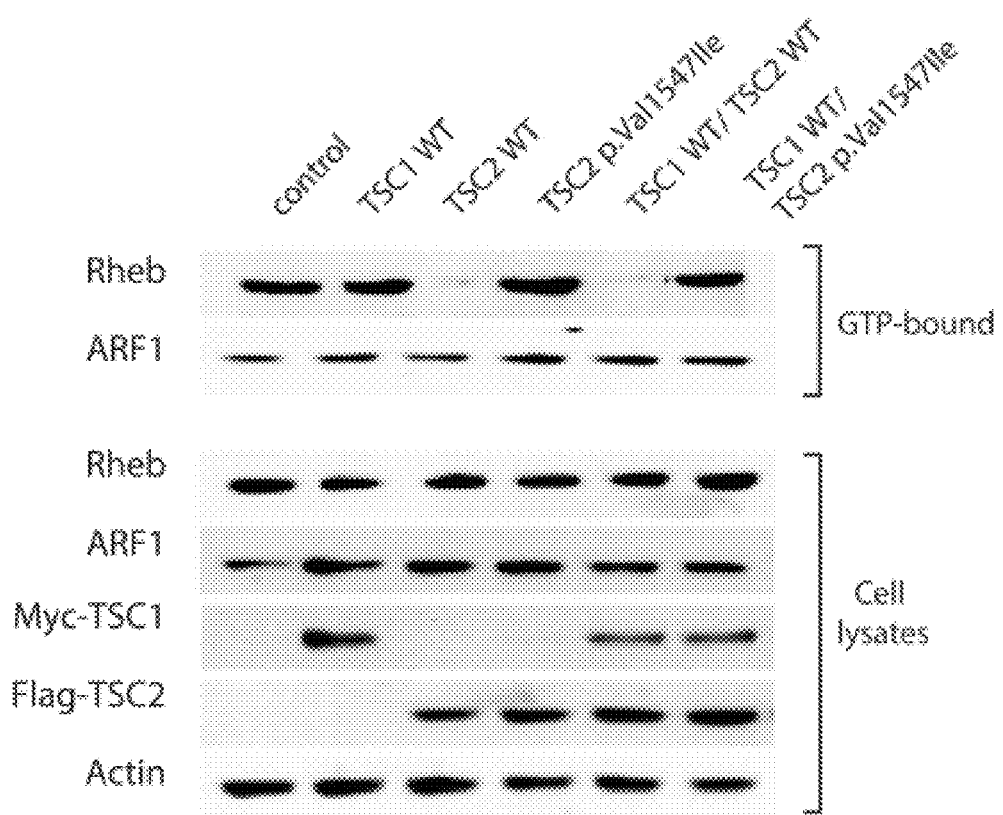

[FIG. 20]
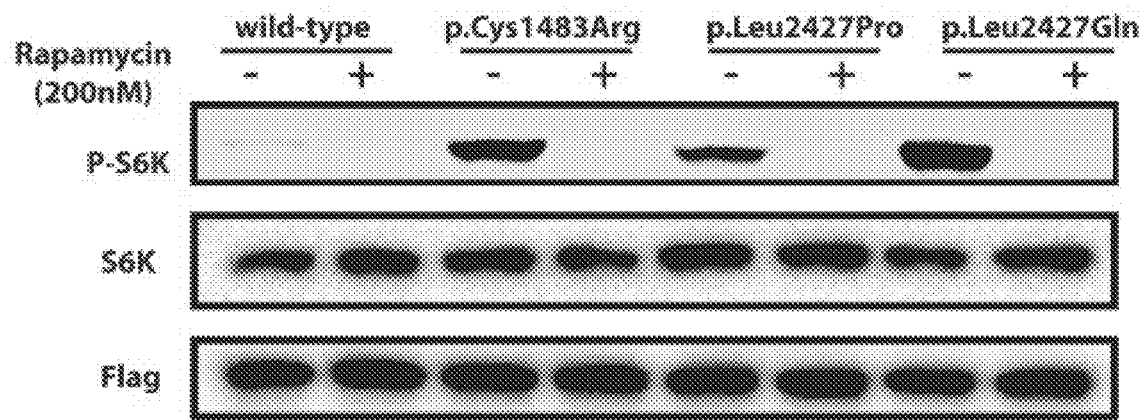
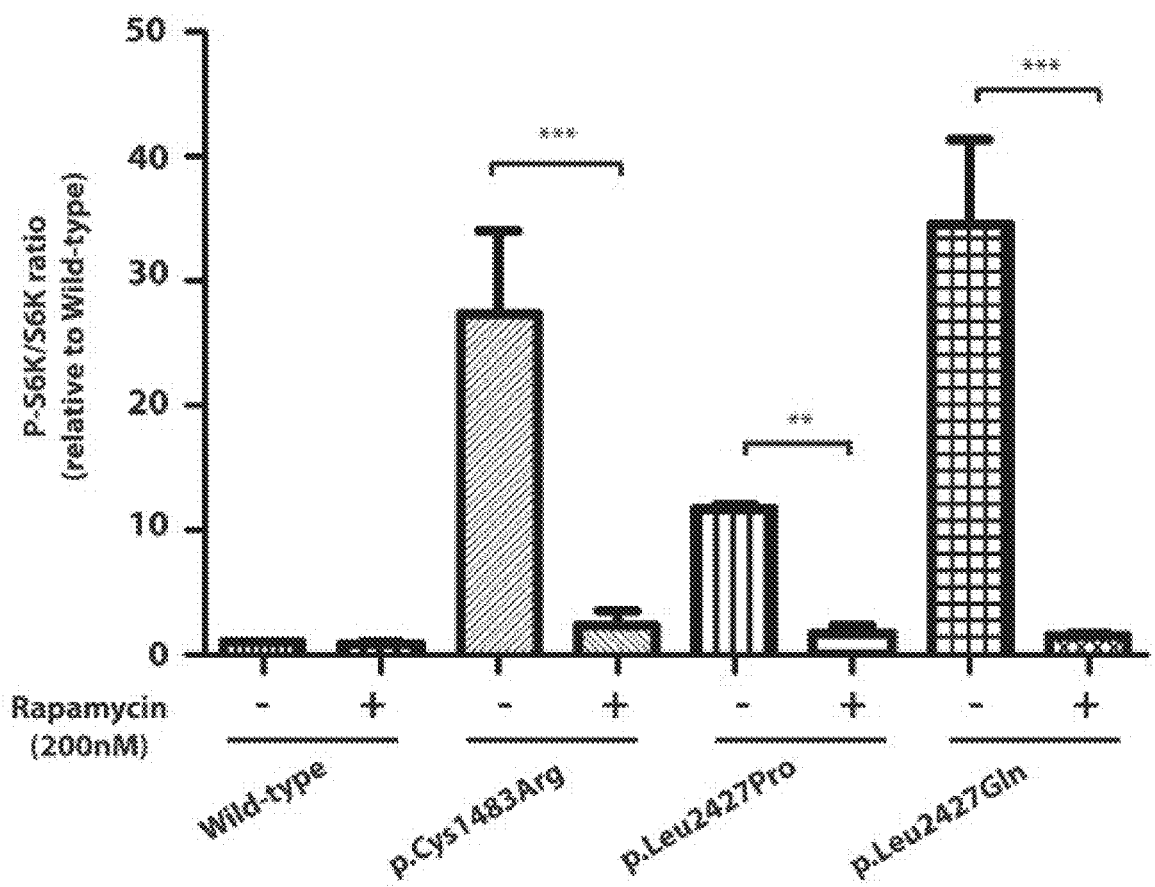

[FIG. 21]
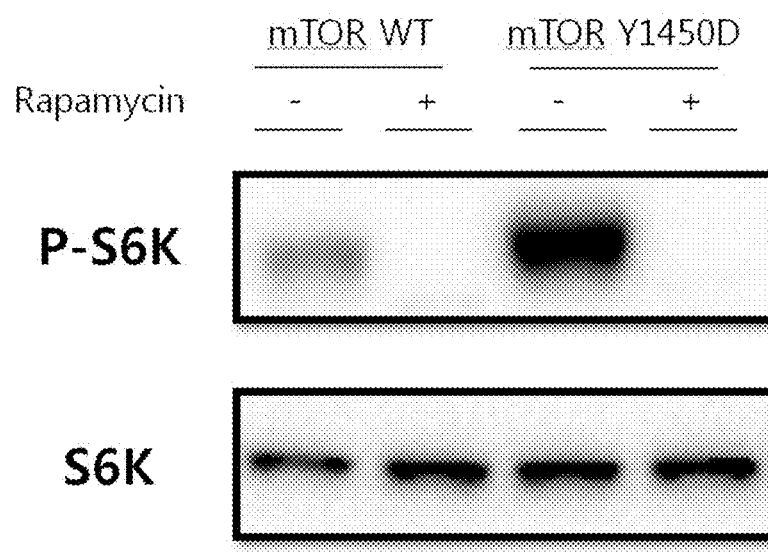
[FIG. 22]
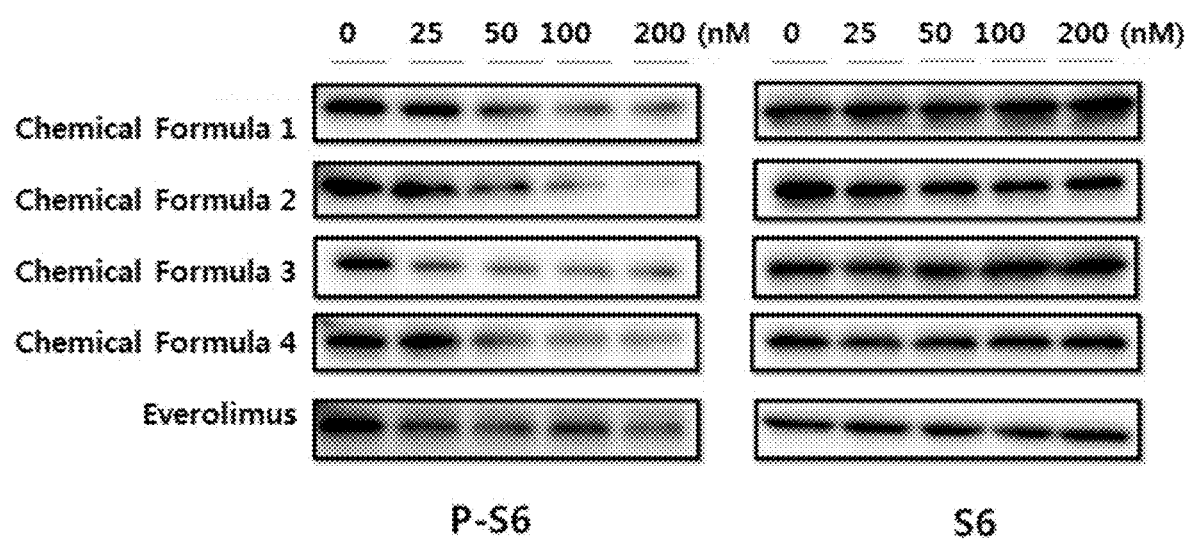

[FIG. 23a]
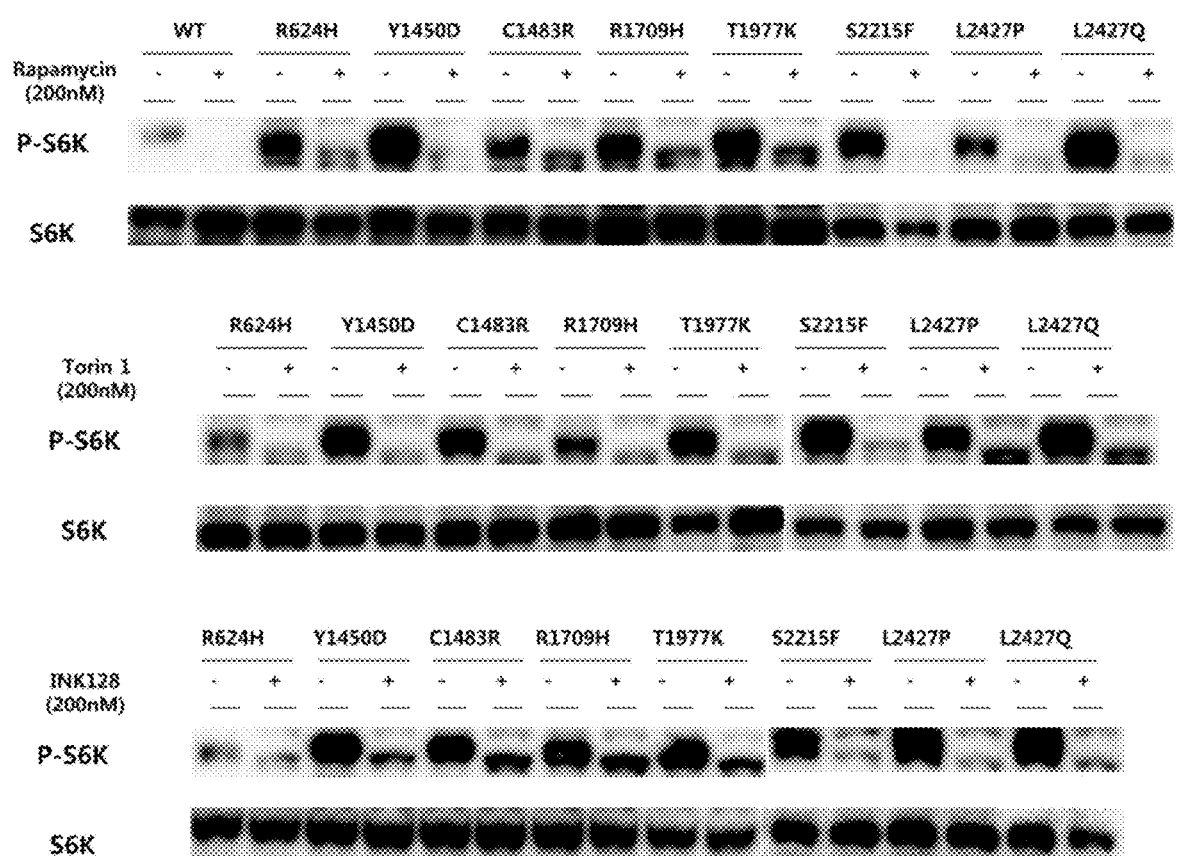

[FIG. 23b]
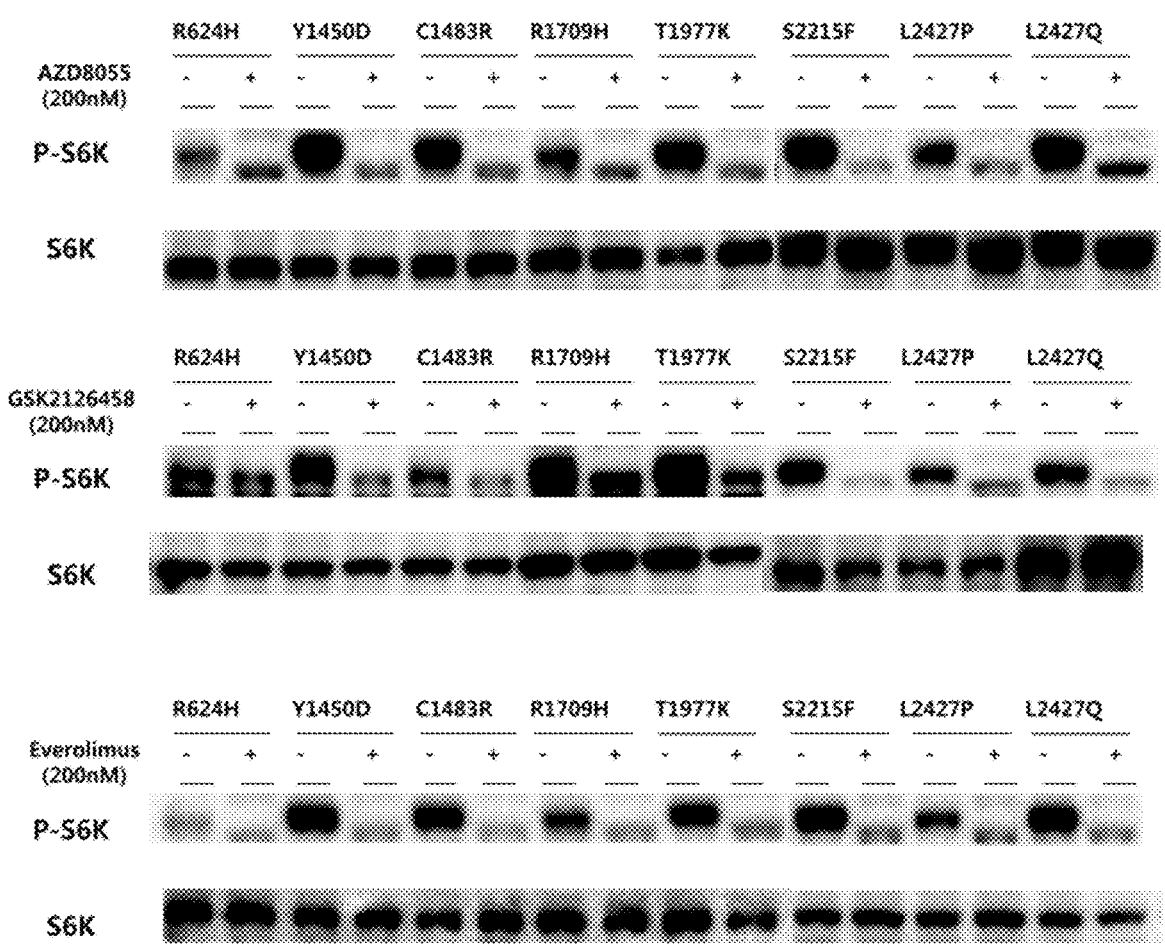

[FIG. 24a]
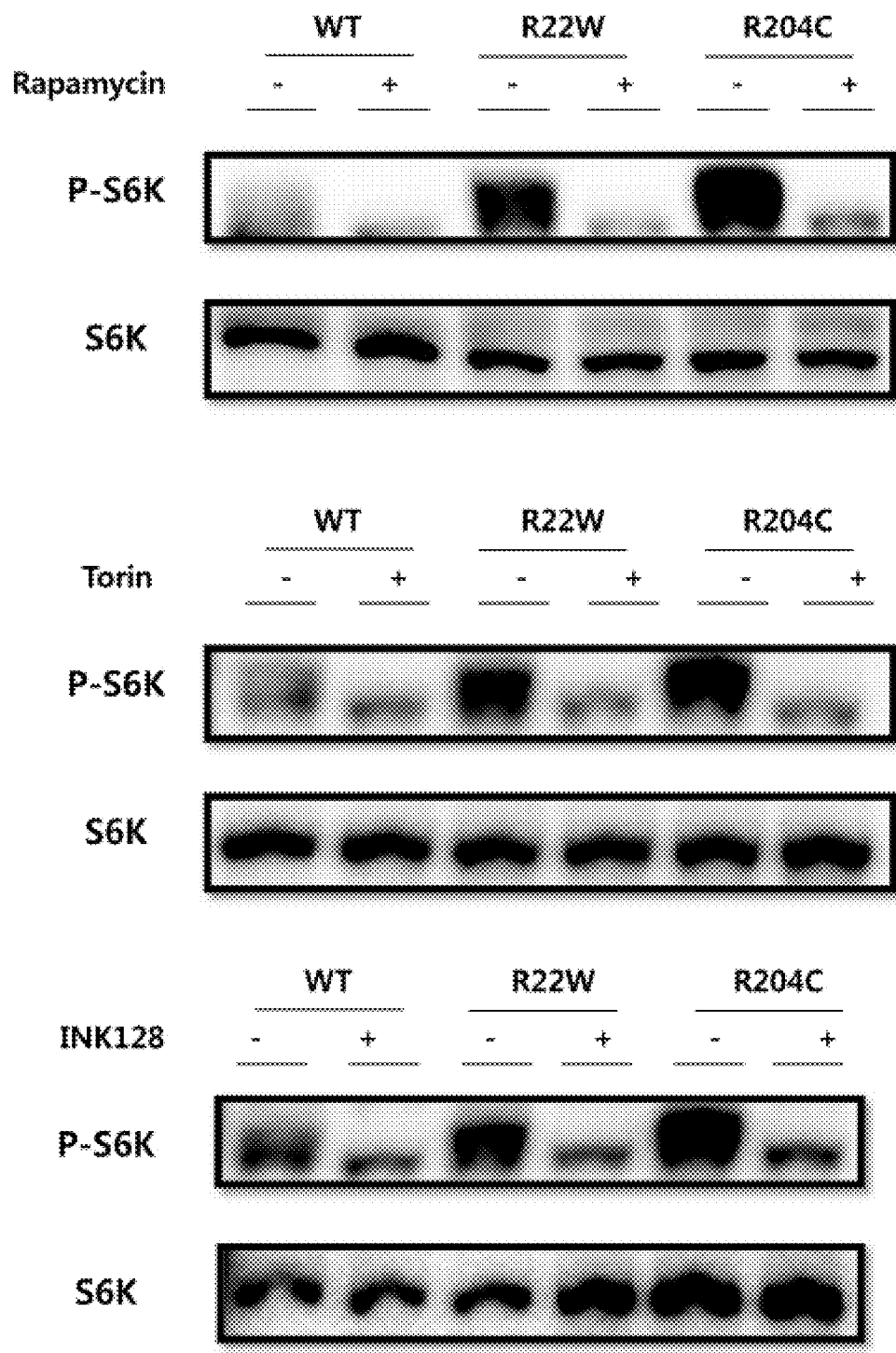

[FIG. 24b]
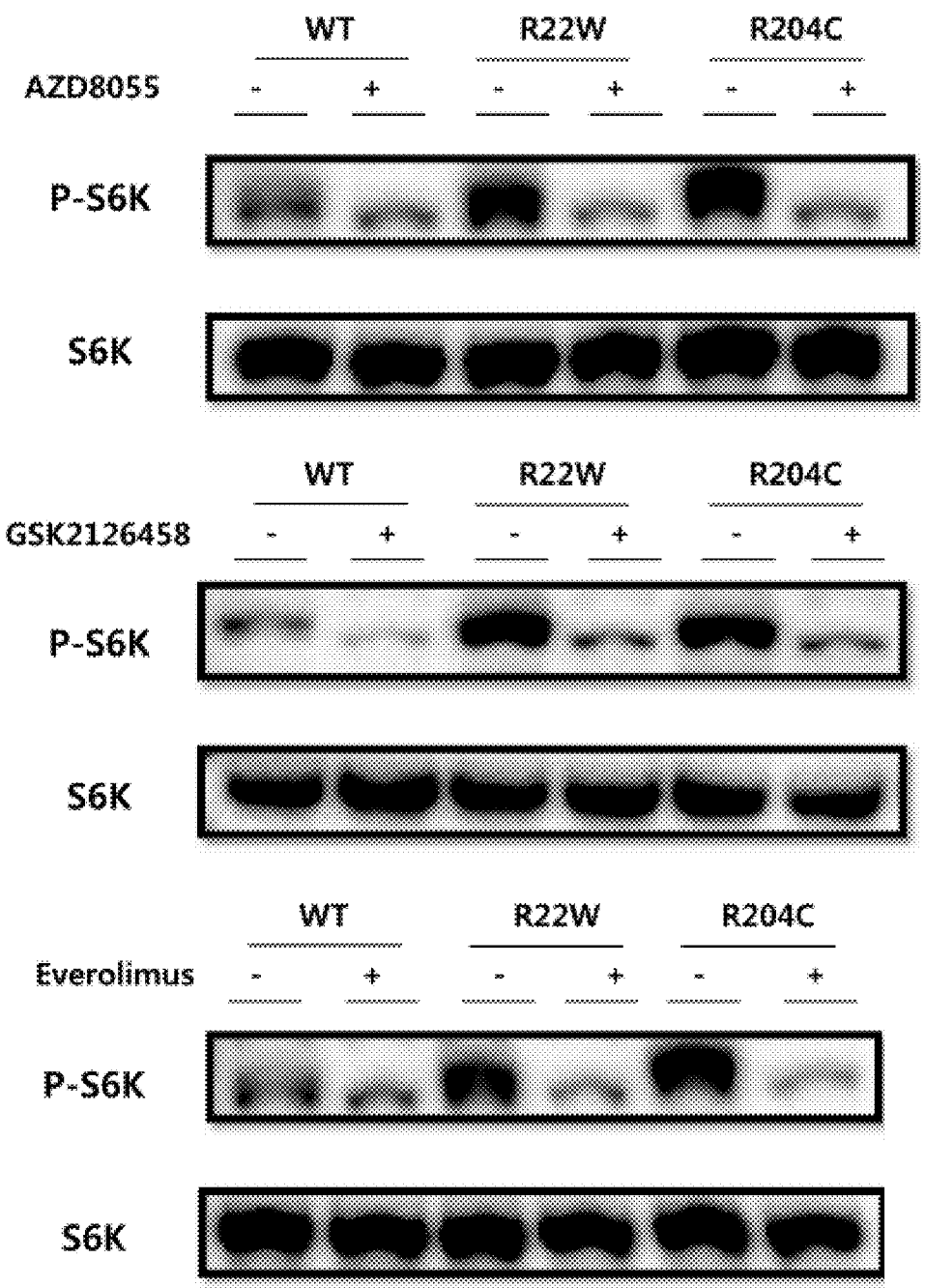

[FIG. 25a]
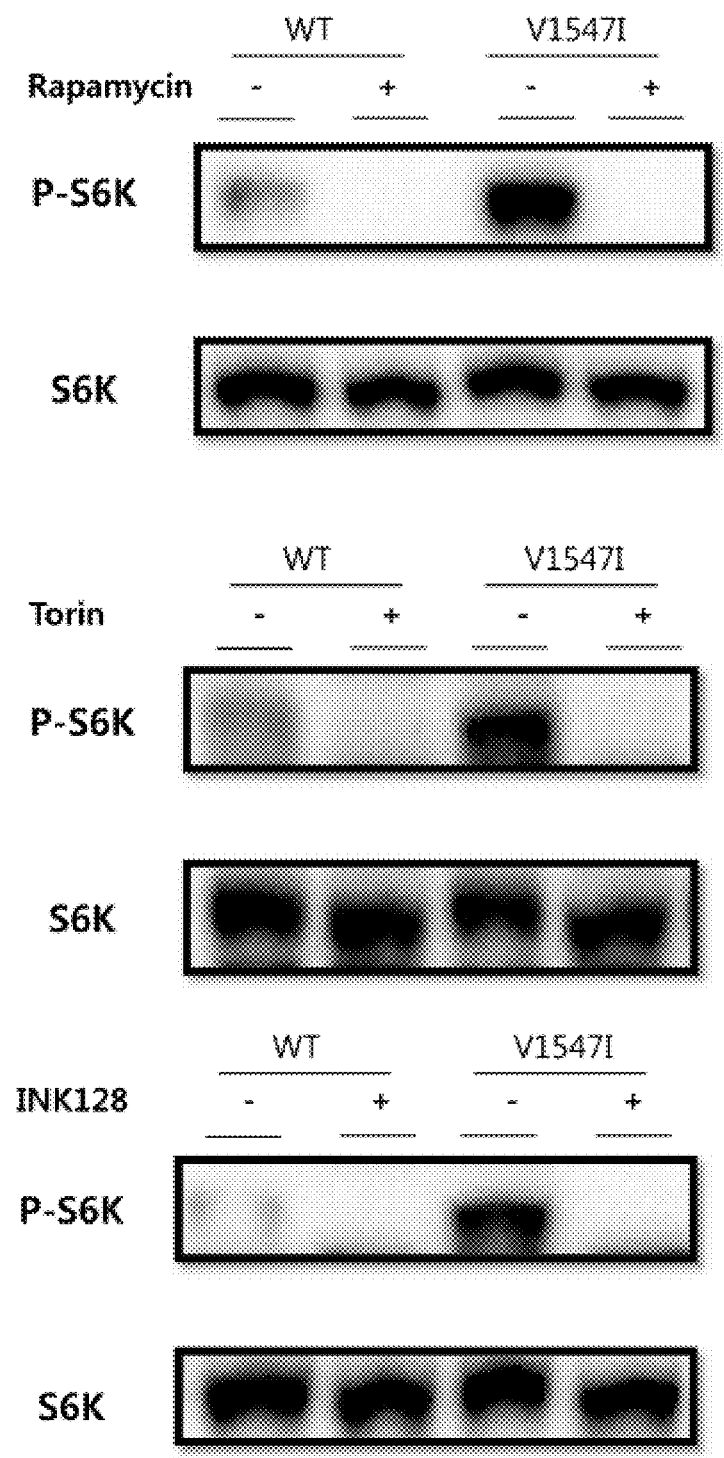

[FIG. 25b]
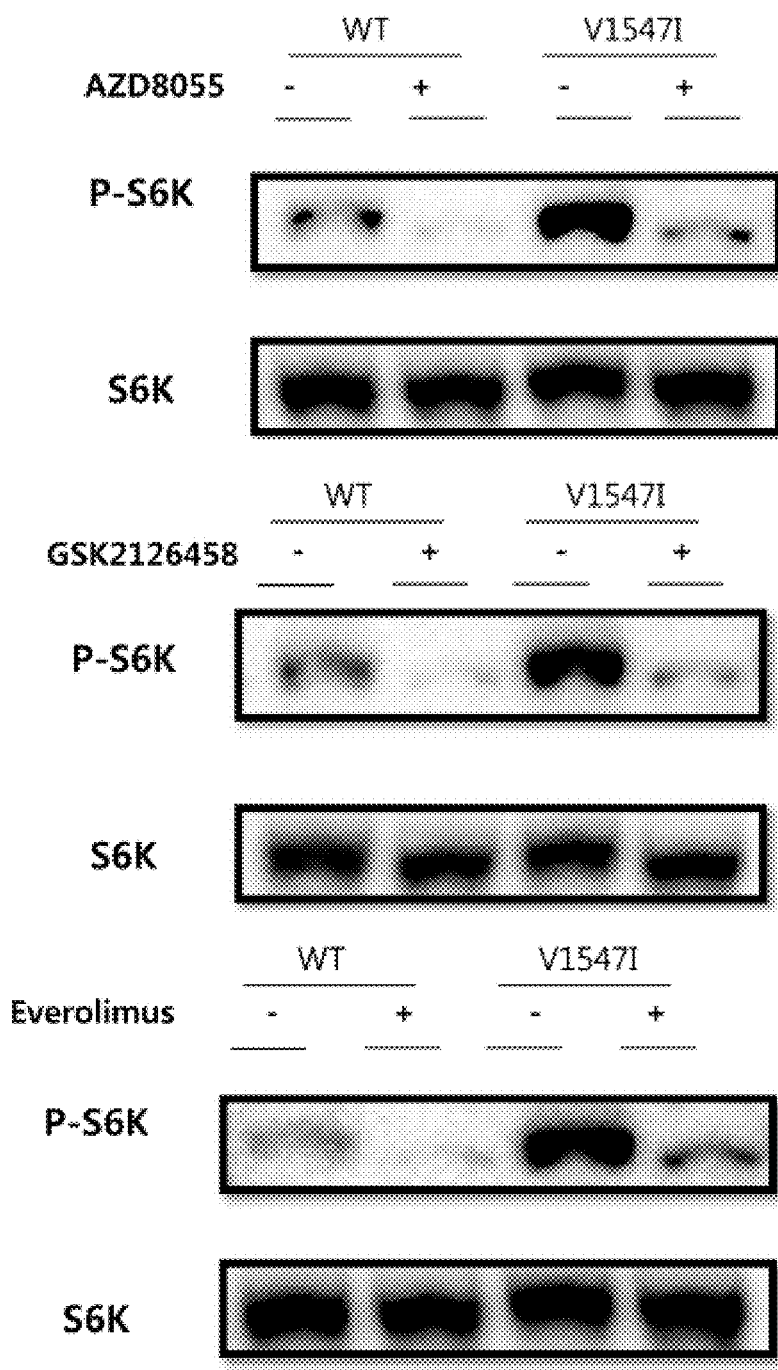

[FIG. 26a]
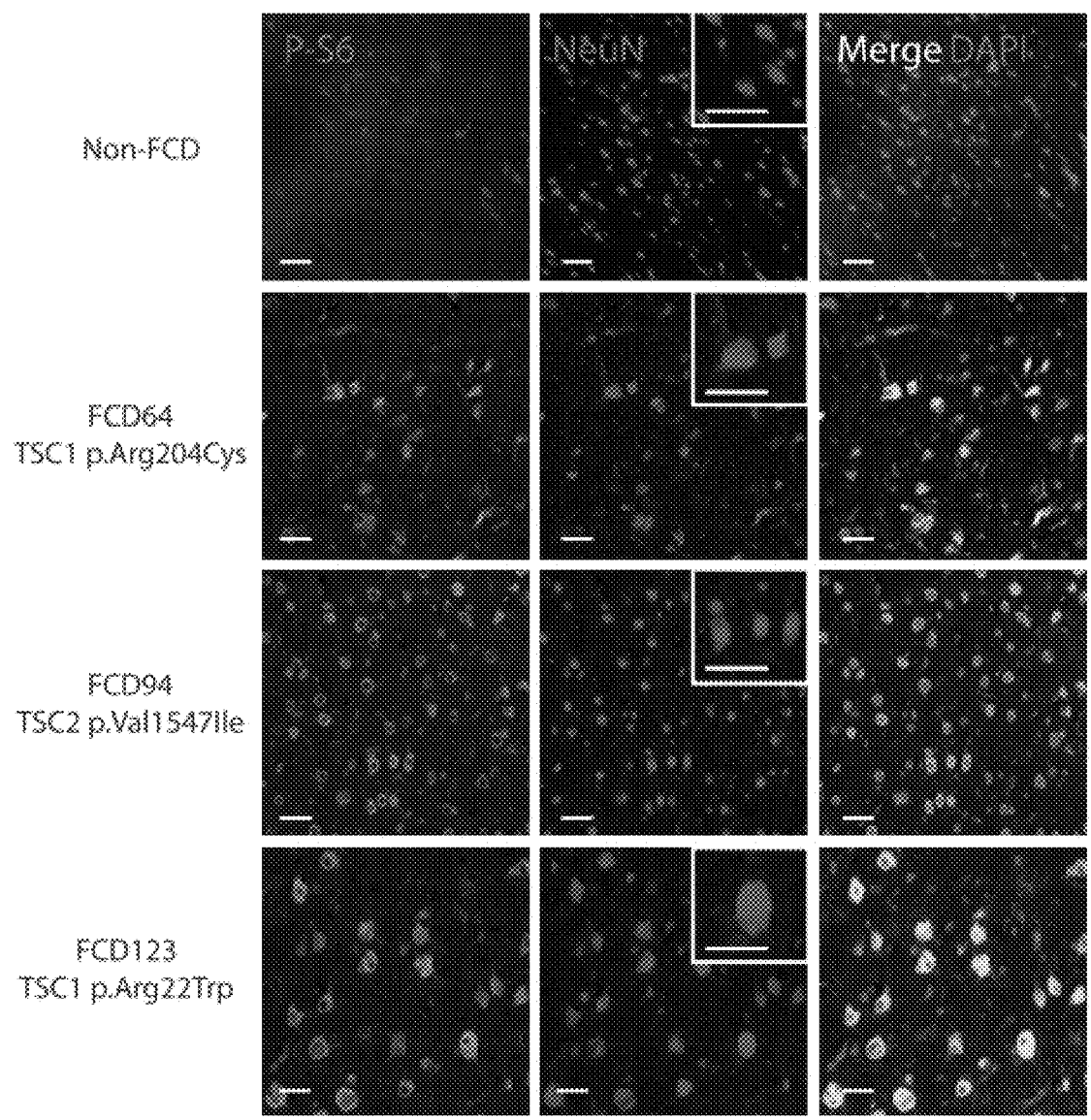

【FIG. 26b】
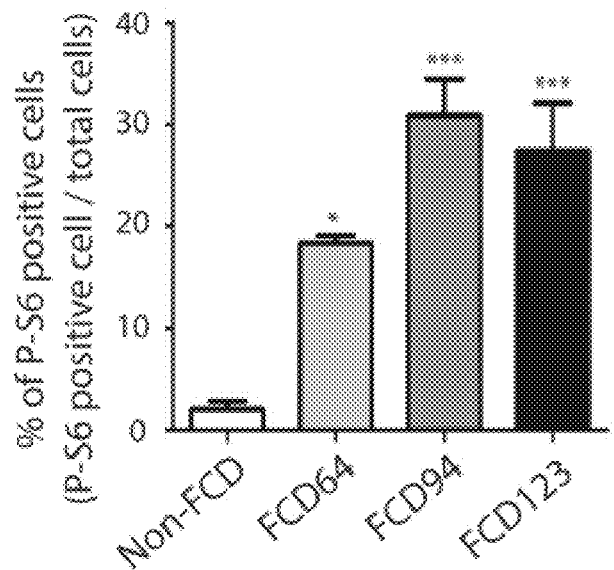
【FIG. 26c】
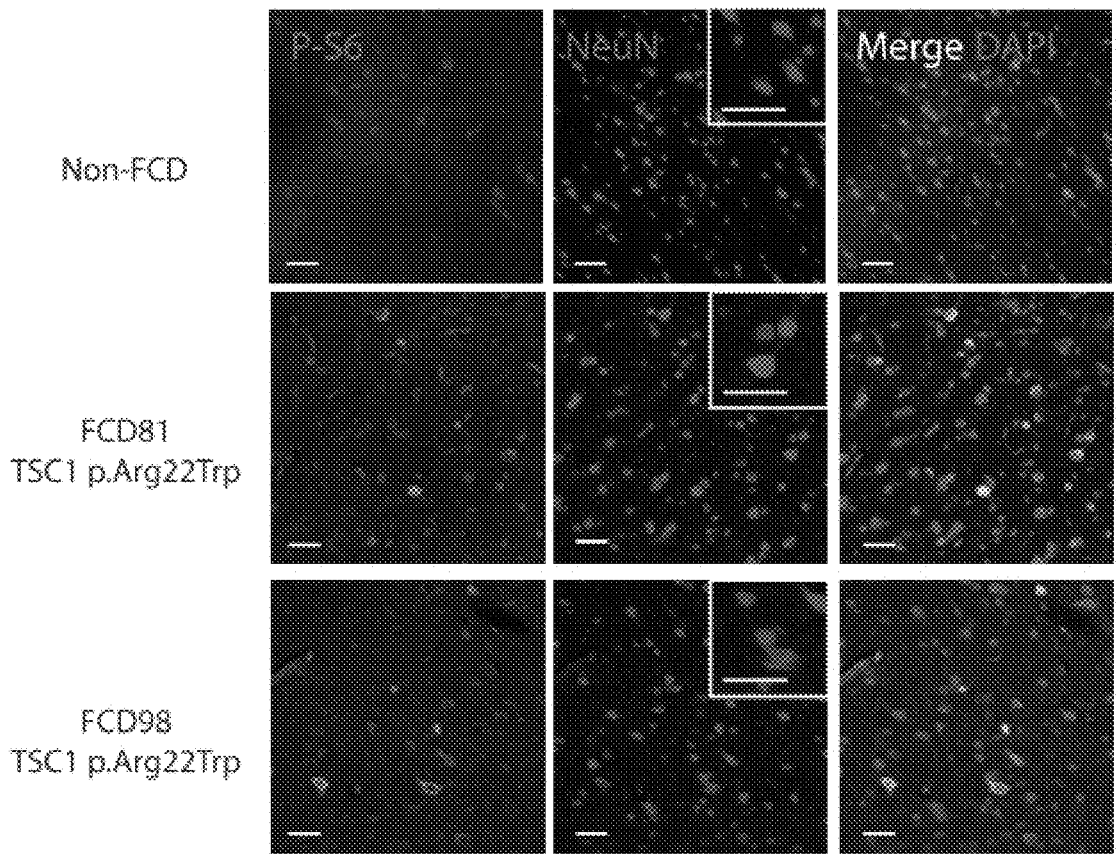

[FIG. 26d]
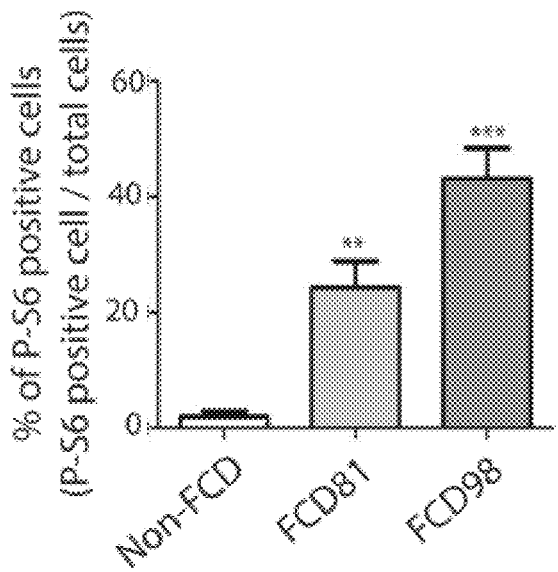
[FIG. 26e]
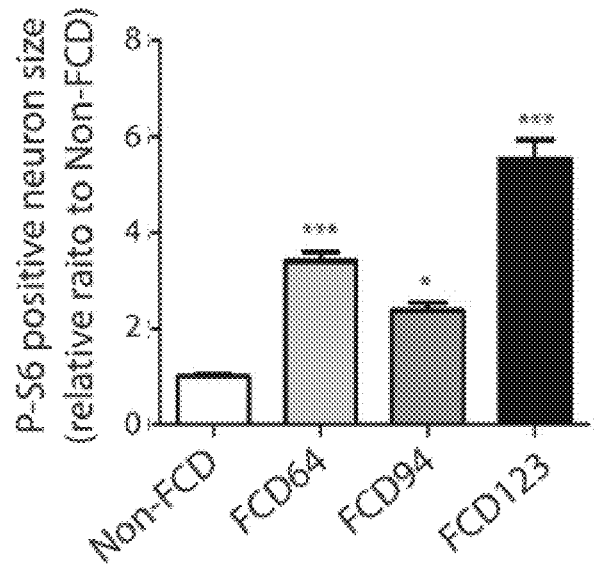

[FIG. 26f]
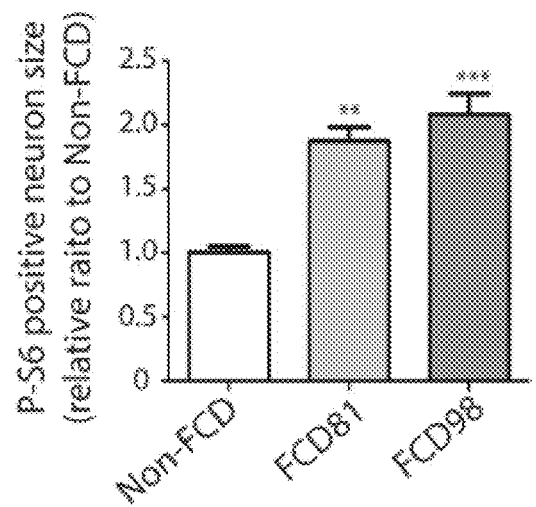
[FIG. 27a]
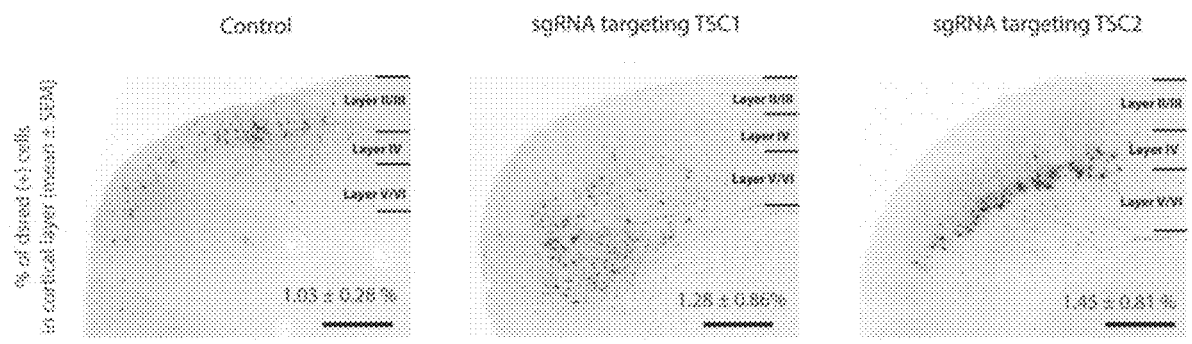

[FIG. 27b]
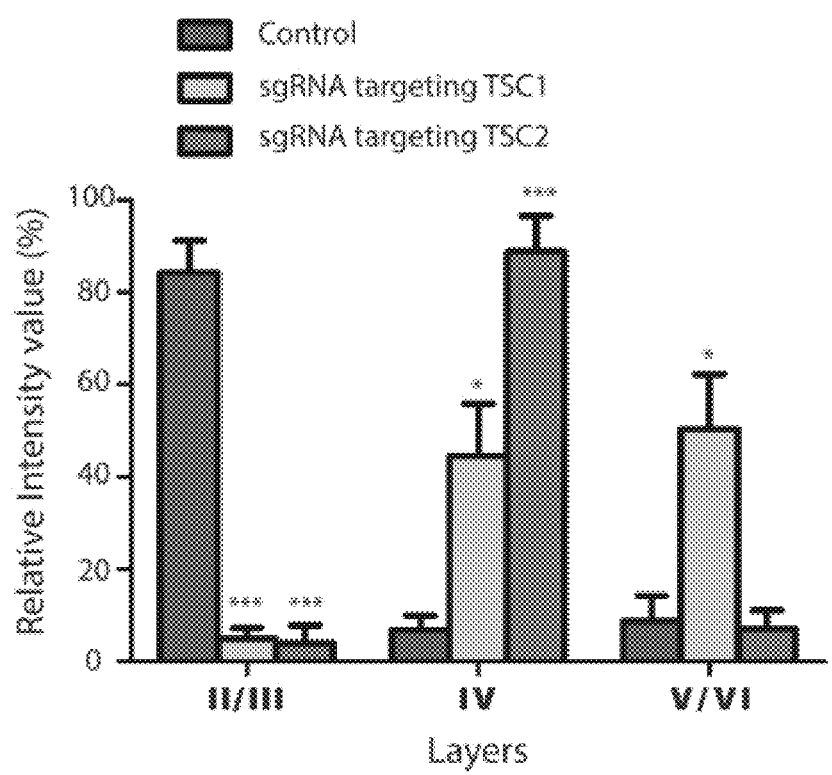

[FIG. 28]
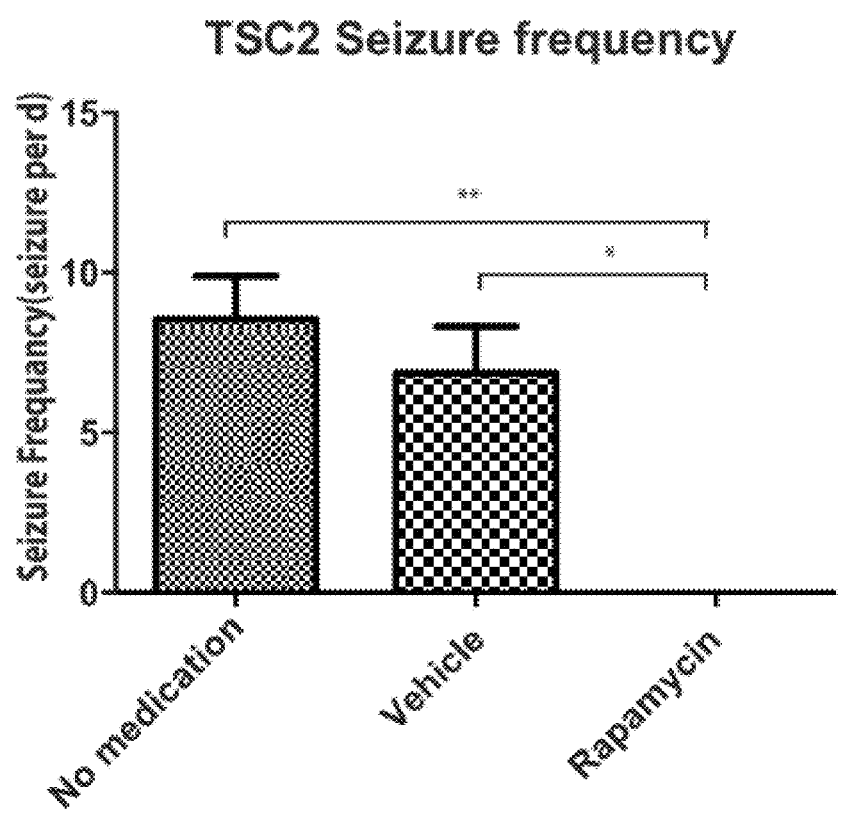

COMPOSITION FOR PREVENTION OR TREATMENT OF INTRACTABLE EPILEPSY COMPRISING mTOR INHIBITOR

CROSS REFERENCE TO RELATED APPLICATIONS

The present application is a continuation of U.S. patent application Ser. No. 15/555,622, which is the national stage of PCT/KR2016/002248 filed on Mar. 7, 2016, and claims priority to KR 10-2015-0031606 filed Mar. 6, 2015, KR 10-2015-0038668 filed Mar. 20, 2015, KR 10-2016-0011747 filed Jan. 29, 2016, and KR 10-2016-0026643 filed Mar. 4, 2016, the disclosures of which are hereby incorporated by reference.

TECHNICAL FIELD

The present invention relates to the prophylaxis, amelioration or therapy of intractable epilepsy, for example, Focal Cortical Dysplasia (FCD). Also, the present invention relates to a biomarker panel for diagnosing intractable epilepsy, especially pediatric intractable epilepsy, and a method for diagnosing intractable epilepsy using the same.

BACKGROUND ART

Epilepsy is a group of chronic neurological diseases characterized by repetitive seizures induced by excessive electric activity in some neurons within a short time, with the consequent incurrence of neurobiological, mental, perceptual, and social changes.

Epilepsy that is insensitive to anti-epileptic drugs developed thus far is called intractable epilepsy, and accounts for about 20% of all epilepsy cases diagnosed each year. Malformations of cortical developments (MCD) such as Focal Cortical Dysplasia (FCD), Hemimegalencephaly (HME) and Tuberous Sclerosis Complex (TSC), Hippocampal Sclerosis (HS), and Sturge-Weber Syndrome (SWS) are known as common causes of intractable epilepsy.

Insensitive to available antiepileptic drugs, intractable epilepsy requires neurosurgical treatment to resect a brain lesion to control epilepsy. Hence, there is a need for a technique for molecular biological diagnosis specific for malformations of cortical development or Hippocampal Sclerosis, both causative of intractable epilepsy.

FCD is an important cause of epilepsy that is difficult to control with available antiepileptic drugs, and this condition accounts for as much as 50% of juvenile patients undergoing epilepsy surgery. FCD is a sporadic developmental malformation of the cerebral cortex and is characterized by the disorganized structure of the cerebral cortex or cytological abnormalities of the neurons in focally affected regions.

Although surgical resection of FCD renders approximately 60% of patients seizure free, a significant portion of Focal Cortical Dysplasia patients continues to have seizures. Due to the lack of understanding of the molecular genetic etiology, the development of novel and more effective FCD therapies remains elusive. A long-held but unproven hypothesis is that FCD is caused by somatic mutations occurring in affected brain regions during brain development. However, no such mutations have been identified.

FCD can be classified into several types based on histopathology. In particular, FCD type II (FCDII) shows a homogenous pathology, characterized by disrupted cortical lamination, and dysmorphic neurons or balloon cells (Epilepsia 52, 158-174 (2011)). FCDII is diagnosed in 29-39% of all FCD patients who undergo epilepsy surgery (Brain 129, 1907-1916 (2006)). Although an association between human papilloma virus and FCDII has been reported, the molecular genetic etiology of FCDII remains poorly understood. Interestingly, the brain MRIs of FCDII patients are occasionally reported to be normal; however, microscopic examinations of surgical specimens reveal scattered dysmorphic cells surrounded by an abundance of normally appearing cells. These radiological and histopathological findings suggest that only a small fraction of cells containing somatic mutations exist in surgically resected tissue, and that these mutations might not be efficiently detected through capillary Sanger sequencing or typical whole exome sequencing (WES) with an average read depth of 100-150×.

Against this background, the present inventors have identified FCD-specific somatic mutations in the brain tissues of FCD patients undergoing epilepsy surgery, using deep sequencing strategies such as deep whole exome sequencing, hybrid capture sequencing, and amplicon sequencing, established a transgenic animal with FCD, using the somatic mutations, and found that the administration of an mTOR inhibitor to the transgenic animal restrains FCD symptoms, leading to the present disclosure.

DISCLOSURE

Technical Problem

An object of the present disclosure is to provide a kit or method for preventing, ameliorating or treating intractable epilepsy caused by the brain somatic mutations in components of the PI3K-AKT-mTOR pathway, or by Focal Cortical Dysplasia (FCD), Hemimegalencephaly (HME), Hippocampal Sclerosis (HS) or Sturge-Weber Syndrome (SWS), using an mTOR inhibitor as an active ingredient.

Another object of the present disclosure is to provide the use of an mTOR in preventing, ameliorating, or treating intractable epilepsy or a disease causing intractable epilepsy. Here, the intractable epilepsy may be caused by FCD. In particular, FCD may be associated with cerebral somatic mutation.

A further object of the present disclosure is to provide a pharmaceutical or food composition for preventing, ameliorating or treating intractable epilepsy caused by brain somatic mutations in components of the PI3K-AKT-mTOR pathway or by Focal Cortical Dysplasia (FCD), Hemimegalencephaly (HME), Hippocampal Sclerosis (HS) or Sturge-Weber Syndrome (SWS), comprising an mTOR inhibitor as an active ingredient.

A still further object of the present disclosure is to provide a diagnostic kit for intractable epilepsy, comprising an agent capable of detecting a mutation present in a gene or protein involved in a PI3K-AKT-mTOR pathway.

Still another object of the present disclosure is to provide a method for diagnosing intractable epilepsy, comprising detecting a mutation present in a gene or protein involved in the PI3K-AKT-mTOR pathway in a sample from a subject, using the diagnostic kit.

Yet a further object of the present disclosure is to provide a mutant of a gene or protein involved in the PI3K-AKT-mTOR pathway.

Yet another object of the present disclosure is to provide a biomarker panel for the diagnosis of intractable epilepsy, comprising a mutant of a gene or protein involved in the PI3K-AKT-mTOR pathway.

Still yet another object of the present disclosure is to provide a composition for inducing intractable epilepsy, comprising a mutant of a gene or protein involved in the PI3K-AKT-mTOR pathway.

An additional object of the present disclosure is to provide a transgenic animal with intractable epilepsy, into which a gene or protein involved in the PI3K-AKT-mTOR pathway is introduced.

Another additional object of the present disclosure is to provide a method for inducing intractable epilepsy, comprising introducing a gene or protein involved in the PI3K-AKT-mTOR pathway into cells, ex vivo.

Technical Solution

The present disclosure addresses use of an mTOR inhibitor in the prophylaxis, amelioration or therapy of intractable epilepsy or a causative disease of intractable epilepsy. Here, the intractable epilepsy may be caused by FCD. More particularly, the FCD may be FCD associated with brain somatic mutation.

Also, the present disclosure addresses a biomarker panel for the diagnosis of intractable epilepsy, and a diagnostic method of intractable epilepsy using the same. Within the scope of diseases causative of intractable epilepsy. Malformations of cortical developments (MCD) such as Focal Cortical Dysplasia (particularly, FCD type II), Hemimegalencephaly (HME) and Tuberous Sclerosis Complex (TSC), Hippocampal Sclerosis (HS), and Sturge-Weber Syndrome (SWS) fall Hereinafter, a detailed description will be given of the present invention.

Intensive and thorough research and analysis of tissue samples resected from brains of patients with intractable epilepsy caused by Focal Cortical Dysplasia (FCD), Hemimegalencephaly (HME), Hippocampal Sclerosis (HS), or Sturge-Weber Syndrome (SWS) resulted in the finding that brain somatic mutations specific for components of the PI3K-AKT-mTOR pathway exist and that the mutations can be used as a biomarker panel for diagnosing intractable epilepsy. Also, the present inventors discovered the fact that cells into which the mutations are introduced overexpress mTOR, inducing intractable epilepsy, and succeeded in developing a method useful in preventing, ameliorating or treating Focal Cortical Dysplasia (FCD), Tuberous Sclerosis Complex (TSC), Hemimegalencephaly (HME), Hippocampal Sclerosis (HS) or Sturge-Weber Syndrome (SWS), and the intractable epilepsy caused by Focal Cortical Dysplasia (FCD), Tuberous Sclerosis Complex (TSC), Hemimegalencephaly (HME), Hippocampal Sclerosis (HS) or Sturge-Weber Syndrome (SWS).

In the present disclosure, brain tissue, saliva and blood samples were obtained from FCD-caused intractable epilepsy patients undergoing epilepsy surgery, and nucleotide sequencing revealed nine different mTOR gene mutations specifically present in patients with FCD-caused intractable epilepsy, nine mTOR protein mutations corresponding thereto, and six different genetic mutations in components of the PI3K-AKT-mTOR pathway and six corresponding protein mutations corresponding thereto (Table 1).

TABLE 1

| | | Mutation on | | |
|---|---|---|---|---|
| No. | Gene | mTOR Gene | mTOR Protein | Remark |
| 1 | mTOR | C616T | R206C | Cytosine (C) at position 616 → Thymine (T) Arginine (R) at position 206→ Cysteine (C) |
| 2 | mTOR | G1871A | R624H | Guanine(G) at position 1871 → Adenine(A) Arginine(R) at position 624 → Histidine (H) |
| 3 | mTOR | T4348G | Y1450D | Thymine (T) at position 4348 → Guanine(G) Tyrosine (Y) at position 1450 → Aspartic acid (D) |
| 4 | mTOR | T4447C | C1483R | Thymine(T) at position 4447 → Cytosine(C) Cysteine(C) at position 1483 → Arginine(R) |
| 5 | mTOR | G5126A | R1709H | Guanine(G) at position 5126 → Adenine(A) Arginine(R) at position 1709→ Histidine(H) |
| 6 | mTOR | C5930A | T1977K | Cytosine(C) at position 5930→ Adenine(A) Threonine (T) at position 1977 → Lysine (K) |
| 7 | mTOR | C6577T | R2193C | Cytosine(C) at position6577 → Thymine(T) Arginine(R) at position 2193→ cysteine(C) |
| 8 | mTOR | C6644T | S2215F | Cytosine(C) at position 6644→ Thymine(T) Serine (S) at position2215 → Phenylalanine (F) |
| 9 | mTOR | T7280C | L2427P | Thymine(T) at position 7280→Cytosine(C) Leucine (L) at position 2427 → Proline (P) |
| 10 | mTOR | T7280A | L2427Q | Thymine(T) at position 7280→ Adenine(A) Leucine (L) at position 2427→ Glutamine (Q) |
| 11 | TSC1 | C64T | R22W | Cytosine(C) at position 64→ Thymine(T) Arginine(R) at position 22→ Tryptophan (W) |
| 12 | TSC1 | C610T | R204C | Cytosine(C) at position 610→ Thymine(T) Arginine(R) at position 204→ cysteine(C) |
| 13 | TSC1 | G2432T | R811L | Guanine(G) at position 2432→ Thymine(T) Arginine(R) at position 811→ Leucine (L) |
| 14 | TSC2 | G4639A | V1547I | Guanine(G) at position 4639 → Adenine(A) Valine (V) at position 1547→ Isoleucine (I) |
| 15 | AKT3 | G740A | R247H | Guanine(G) at position 740 → Adenine(A) Arginine(R) at position 247 → Histidine(H) |
| 16 | PIK3CA | G3052A | D1018N | Guanine(G) at position 3052→Adenine(A) Aspartic acid (D) at position 1018→ Asparagine (N) |

The identified mutations were specifically detected in the brain tissue samples, but were negative for all available saliva and blood samples from mutation-positive patients. In addition, at least one of the nine different mTOR mutations was found in all FCD patients, with an allelic frequency of 1.26 to 12.6%.

In the present disclosure, mTOR mutant constructs expressing the mutations were obtained, and cells, after transfection of the mTOR mutant constructs thereinto, were analyzed for mTOR protein activation in terms of the phosphorylation of an S6 protein and the activity of mTOR kinase. As a result, an increase in the phosphorylation of S6 phosphorylation (FIG. 2a) and the activation of mTOR kinase (FIG. 2n) was identified, indicating that the hyperactivation of the mTOR pathway induces the phosphorylation of S6.

In addition, treatment with rapamycin, everolimus, or compounds of Chemical Formulas 1 to 4 was discovered to reduce the phosphorylation of S6 in the cells with the hyperactivated mTOR pathway due to the transfection of the mTOR mutant constructs thereinto (FIGS. 9a to 9c).

Meanwhile, the induction of FCD by the mTOR mutations provided by the present disclosure was confirmed by observing a significantly elevated level of phosphorylated S6 protein and an increased soma size of neurons in pathological brain samples of patients with FCD-caused intractable epilepsy (mTOR gene mutation) (FIGS. 2c to 2e), and by significant disruption of neuronal migration and a significantly increased level of phosphorylated S6 in the cortex of mTOR mutant construct-injected mice at embryonic day 14 (FIGS. 11b and 11c).

In the present disclosure, the lateral ventricles of embryonic mice were electroporated with mTOR mutant constructs carrying the genetic mutations at embryonic day 14 (E14), and video-electroencephalographic (video-EEG) monitoring of the mice was performed starting 3 weeks after birth. As a result, spontaneous seizure with epileptic discharge was detected in mice transfected with plasmids carrying the mTOR mutant genes of the present disclosure (FIGS. 12a and 12b). Further, it was observed that the soma sizes of GFP-positive neurons were greatly increased in affected cortical regions of electroporated mice carrying mTOR mutant constructs, showing an abnormal neuronal morphology similar to cytomegalic neurons. (FIG. 3d).

In addition, the animal models with spontaneous seizures or abnormal neurons, when administered with rapamycin, were observed to significantly decrease in the onset frequency of behavioral and electrographic seizures (FIG. 3c) and in the soma size of abnormal neurons (FIG. 3d).

In the present disclosure, it is revealed not only that the genetic or protein mutations are specifically detected in FCD patient samples, but also that the mutations can induce FCD. Further, an mTOR inhibitor, for example, rapamycin, everolimus, and compounds of Chemical Formulas 1 to 4, is found to suppress intractable epilepsy associated with the mTOR mutations, such as mTOR hyperactivation, spontaneous seizures, behavioral seizures, electrographic seizures and generation of abnormal neurons in FCD.

In the following Example section, mTOR mutant constructs carrying the somatic mutations were obtained and transfected into cells, with the consequence of an increased level of S6K phosphorylation, which explains the activation of mTOR Rapamycin decreased the phosphorylation. The data suggest that given the mutations, mTOR, TSC1, TSC2, AKT3 and PIK3CA genes or proteins activate the mTOR pathway, thus inducing epilepsy.

According to another embodiment thereof, the present disclosure addresses a biomarker panel for the diagnosis of intractable epilepsy, comprising mTOR, TSC1, TSC2, AKT3 and PIK3CA genes or proteins carrying the mutations. Further, the present disclosure provides a diagnostic kit for detecting the biomarker panel genes or proteins in a sample from a subject, and a diagnostic method using the same. Moreover, the present disclosure provides a technique for constructing an epilepsy model, comprising inducing intractable epilepsy with the genetic or protein mutations.

Also, the present disclosure addresses the prophylaxis, amelioration or therapy of intractable epilepsy, and a composition, a kit or a method for preventing, ameliorating or treating malformations of cortical developments, Hippocampal Sclerosis, or Sturge-Weber Syndrome, such as FCD, Hemimegalencephaly, and Tuberous Sclerosis Complex, which are common causes of intractable epilepsy. A particular embodiment of the present disclosure relates to the prophylaxis, therapy and/or amelioration of brain somatic mutation-associated intractable epilepsy.

In detail, the intractable epilepsy of the present disclosure includes epilepsy caused by the brain somatic mutation of genes involved in the PI3K-AKT-mTOR pathway, and epilepsy caused by malformations of cortical developments, Hippocampal Sclerosis, or Sturge-Weber Syndrome, such as FCD, Hemimegalencephaly and Tuberous Sclerosis Complex.

As used herein, the term "epilepsy" refers to a group of chronic neurological diseases characterized by repetitive seizures induced by excessive electric discharge in some neurons within a short time. The term "intractable epilepsy" means epilepsy that is insensitive to available antiepileptic drugs. Forms of intractable epilepsy may be those that are caused by Malformations of Cortical Developments (MCD), Hippocampal Sclerosis (HS), or Sturge-Weber Syndrome (SWS), such as Focal Cortical Dysplasia (FCD), Hemimegalencephaly (HME), and Tuberous Sclerosis Complex (TSC).

In the normal development of the cerebral cortex, neurons migrate from one region of the brain to another to form a laminar structure. The term "Focal Cortical Dysplasia" or "FCD", as used herein, is a congenital abnormality of brain development where the neurons in one area of the brain fail to migrate in the proper formation in utero and thus fail to form a normal laminar structure. Etiologically, FCD is accounted for by the failure of normal development in some region of the cerebrum or by the generation of some dysmorphic neurons even in a region that seems to develop normally, as observed in radiographic images. FCD occurs sporadically and is characterized by dysmorphic neurons and disrupted cortical lamination in affected cortical regions.

The brain somatic mutations associated with FCD may be mutations on mTOR genes or protein.

mTOR (mammalian target of rapamycin) protein, encoded by the FRAP1 gene in humans, is a serine/threonine protein kinase, which is functionally involved in cell growth, cell proliferation, cell death, cell survival, protein synthesis, and transcription, and belongs to the phosphatidylinositol 3-kinase-related kinase protein family. In the present disclosure, nucleotide and protein sequences of wild-type mTOR genes are represented by SEQ ID NOs. 1 and 2, respectively.

As used herein, the term "brain somatic mutation" means an alteration at one or more positions of the nucleotide sequence of a wild-type gene. In this context, it may be a nucleotide mutation of mTOR, TSC1, TSC2, AKT3 and PIK3CA genes or an amino acid mutation of proteins corresponding to the genes. By way of example, an alteration may occur on the nucleotide sequence of the wild-type mTOR gene represented by SEQ ID NO. 1. As shown in Table 1, the brain somatic mutation may be a substitution at one or more selected from the group consisting of positions 616, 1871, 4348, 4447, 5126, 5930, 6577, 6644, 7280 and 7280 of the nucleotide sequence of SEQ ID NO. 1.

Alternatively, the brain somatic mutation of the present disclosure may be an alteration at one or more positions of the amino acid sequence of the wild-type mTOR protein of SEQ ID NO. 2. On the amino acid sequence of SEQ ID NO. 2, for example, the mutation may include at least one selected from the group consisting of substitutions from arginine (R) at position 206 to cysteine (C), from R at position 624 to H, from Y at position 1450 to D, from C at position 1483 to R, from Rat position 1709 to H, from T at position 1977 to K, from Rat position 2193 to C, from S at position 2215 to F, from L at position 2427 to P, and from L at position 2427 to Q. The substituted amino acids may be encoded by the genetic codes resulting from mutations at corresponding positions on the nucleotide sequence of SEQ ID NO. 1. The base mutations and corresponding amino acid mutations are listed in Table 1.

As used herein, the term "TSC1 mutant gene" refers to a TSC1 gene in which a mutation occurs on the wild-type TSC1 nucleotide sequence of SEQ ID NO. 3. Particularly, it may be a gene containing at least one mutation selected from substitutions from cytosine (C) at position 64 to thymine (T), from cytosine (C) at position 610 to thymine (T), and from guanine (G) at position 2432 to thymine (T) on the nucleotide sequence of SEQ ID NO. 3.

As used herein, the term "TSC1 mutant protein" refers to a TSC1 protein in which a mutation occurs on the wild-type TSC1 amino acid sequence of SEQ ID NO. 4. Particularly, it may be a protein containing at least one mutation selected from substitutions from arginine (R) at position 22 to tryptophan (W), from arginine (R) at position 204 to cysteine (C), and from arginine (R) at position 811 to leucine (L) on the amino acid sequence of SEQ ID NO. 4.

The term "TSC2 mutant gene", as used herein, refers to a gene in which a mutation occurs on the wild-type TSC2 nucleotide sequence of SEQ ID NO. 5. Particularly, it may be a gene containing a substitution from guanine (G) at position 4639 to adenine (A) on the nucleotide sequence of SEQ ID NO. 5.

The term "TSC2 mutant protein", as used herein, refers to a TSC2 protein in which a mutation occurs on the wild-type TSC2 amino acid sequence of SEQ ID NO. 6. Particularly, it may be a protein containing a mutation from valine (V) at position 1547 to isoleucine (I) on the amino acid sequence of SEQ ID NO. 6.

The term "AKT3 mutant gene", as used herein, refers to a gene in which a mutation occurs on the wild-type AKT3 nucleotide sequence of SEQ ID NO. 7. Particularly, it may be a gene containing a substitution from guanine (G) at position 740 to adenine (A) on the nucleotide sequence of SEQ ID NO. 7.

The term "AKT3 mutant protein", as used herein, refers to a TSC2 protein in which a mutation occurs on the wild-type AKT3 amino acid sequence of SEQ ID NO. 8. Particularly, it may be a protein containing a mutation from arginine (R) at position 247 to histidine (H) on the amino acid sequence of SEQ ID NO. 8.

The term "PIK3CA mutant gene", as used herein, refers to a gene in which a mutation occurs on the wild-type TSC2 nucleotide sequence of SEQ ID NO. 9. Particularly, it may be a gene containing a substitution from guanine (G) at position 3052 to adenine (A) on the nucleotide sequence of SEQ ID NO. 9.

The term "PIK3CA mutant protein", as used herein, refers to a TSC2 protein in which a mutation occurs on the wild-type TSC2 amino acid sequence of SEQ ID NO. 10. Particularly, it may be a protein containing a mutation from aspartic acid (D) at position 1018 to asparagine (N) on the amino acid sequence of SEQ ID NO. 10.

In addition, the mutated proteins may contain additional mutations, so long as they do not entirely alter the activity of the molecules. Amino acid substitutions of proteins or peptides that preserve all of the activity of the molecules are known in the art (H. Neurath, R L. Hill, The Proteins, Academic Press, New York, 1979). If necessary, the mTOR mutant proteins may be modified by, for example, phosphorylation, sulfation, acrylation, glycosylation, methylation, and/or farnesylation.

Examples of the mTOR inhibitor available in the present disclosure include those listed in the disclosures of the following Patent Application Nos. Danaferber cancer institute의 |PCT/US09/005656; Dolcetta, Diego의 |U.S. Ser. No. 14/400,469; Exelixis의 |PCT/US10/030354, U.S. Ser. Nos. 13/989,366, 12/784,254, 13/322,160, 13/988,948, 13/988, 903, 13/989,156, 13/989,330, PCT/US12/042582, PCT/US10/035638, PCT/US10/035639; Sanofi의 |U.S. Ser. Nos. 13/381,571, 14/374,838; Infinity Pharmaceuticals의 |U.S. Ser. No. 12/199,689, 11/965,688, KR20097015914; Intellikine의 |U.S. Ser. No. 12/586,241, PCT/US09/005958, PCT/US09/005959, PCT/US09/049983, PCT/US09/049969, U.S. Ser. Nos. 14/238,426, 12/920,970, 12/920,966, 14/619,556; Takeda Pharmaceutical Company Limited의 |PCT/US10/000234, U.S. Ser. Nos. 12/841,940, 12/657,853, 12/657,854; S*Bio Pte Ltd의 |U.S. Ser. No. 13/001,099; Schering Corporation의 |PCT/US10/030350; The Reagents of The University of California의 |EP2012175019; Xuanzhu Pharma Corporation Limited의 1 EP2013836950; KR20130049854; Signal RX Pharmaceuticals EP2009703974; Semafore Pharmaceuticals U.S. Ser. Nos. 11/962,612, 11/111,201, 10/818,145; Kudos Pharmaceuticals U.S. Ser. Nos. 13/014,275, 13/307,342, 11/842,927, 11/361,599, 11/817,134, PCT/GB06/000671; AstraZeneca의 |U.S. Ser. Nos. 11/667,064, 11/842,930, 11/844,092, 12/160,752, 12/170,128, 12/668,056, 12/668, 059, 12/252,081, 12/301,722, 12/299,369, 12/299,359, 12/441,298, 12/441,305, 12/441,299, 12/441,301, 12/668, 060, PCT/GB07/003414, PCT/GB07/003417, PCT/GB07/003454, PCT/GB07/003493, PCT/GB07/003497; Mad Pharmaceuticals U.S. Ser. Nos. 10/862,149, 13/463,951, 14/266,291; Merck Sharp & Dohme Limited U.S. Ser. Nos. 13/263,193, 13/379,685, 13/520,274, 13/818,153, 13/818, 177, 13/876,192, 14/234,837, PCT/US12/047522; Wyeth의 |U.S. Ser. Nos. 12/251,712, 12/354,027, 12/470, 521, 13/950,584, 13/718,928, 14/477,650, 12/470,525, 12/050,445, 12/044,500, 12/473,605, 12/276,459, 12/363, 013, 12/361,607, 12/397,590, 12/473,658, 12/506,291, 12/556,833, 12/558,661; Norvartis U.S. Ser. Nos. 12/599, 131, 12/792,471, 12/792,187, 13/073,652; F. Hoffmann-La-Roche AG EP2012177885, U.S. Ser. Nos. 13/738,829, 12/890,810, 13/568,707, EP2010769036, PCT/EP10/067162; Genentech Inc U.S. Ser. Nos. 11/951,203, 12/821, 998, 12/943,284.

In detail, mTOR inhibitors useful for the present disclosure may be as follows: AMG954, AZD8055, AZD2014, BEZ235, BGT226, rapamycin, everolimus, sirolimus, CC-115, CC-223, LY3023414, P7170, DS-7423, OSI-027, GSK2126458, PF-04691502, PF-05212384, temsirolimus, INK128, MLN0128, MLN1117, ridaforolimus, Metformin, XL765, SAR245409, SF1126, VS5584, GDC0980, and GSK2126458. Further examples of the mTOR inhibitors includes those listed in WO2012/104776, KR 10-1472607B, WO2010/039740, U.S. Pat. Nos. 8,846,670, 8,263,633, and WO2010/002954.

According to some embodiments of the present disclosure, the mTOR inhibitor may be at least one selected from the group consisting of rapamycin or a salt thereof, everolimus or a salt thereof, a compound of Chemical Formula 1 or a salt thereof, a compound of Chemical Formula 2 or a salt thereof, a compound of Chemical Formula 3 or a salt thereof, and a compound of Chemical Formula 4 or a salt thereof.

As used herein, the term "rapamycin" refers to a macrolide lactone compound, known as sirolimus, which has immunosuppressant functions. Rapamycin is commercialized as a drug for preventing rejection of transplanted organs. Also, it is used as a therapeutic agent for pneumonia, immunoinflammatory skin disorders such as systemic lupus erythematosus and psoriasis, immunoinflammatory bowel disorders, orbital inflammation, restenosis, and rheumatoid arthritis, and as an anti-cancer agent. However, nowhere has the application of rapamycin to the prevention or treatment of brain somatic mutation-associated FCD been reported in previous documents.

As used herein, the term "everolimus" refers to a drug for treating kidney cancer. It is used when the antiangiogenic drug SUNItinib or sorafenib is no longer effective. Also, everolimus is approved for the treatment of subependymal giant cell astrocytoma associated with Tuberous Sclerosis (TS) in patients who are not suitable candidates for surgical intervention. However, to date there have been no reports on the use of everolimus in the prevention or treatment of brain somatic mutation-associated FCD.

The compounds of Chemical Formulas 1 to 4 are known as inhibitors active against mTOR; however, applicability to the prevention or treatment of brain somatic mutation-associated FCD has not been known at all.

Rapamycin, everolimus, and the compounds of Chemical Formulas 1 to 4 are useful in the present disclosure, and their derivatives or mimics, pharmaceutically acceptable salts thereof, and hydrates are also fall within the scope of drugs available for the present disclosure The pharmaceutically acceptable salts or hydrates may be salts or hydrates derived from inorganic acids or organic acids. Examples of pharmaceutically acceptable salts include salts of hydrochloric acid, hydrobromic acid, sulfuric acid, phosphoric acid, nitric acid, acetic acid, glycolic acid, lactic acid, pyruvic acid, malonic acid, succinic acid, glutaric acid, fumaric acid, malic acid, mandelic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methane sulfonic acid, benzene sulfonic acid, and toluene sulfonic acid, but are not limited thereto. The hydrates may refer to those formed by binding rapamycin, everolimus or the compounds of Chemical Formulas 1 to 4 with water molecules.

As used herein, the term "treatment" or "therapy" refers to any action resulting in improvement or mitigation in the symptoms of a disease of interest, a reduction in affected area, the suppression or delay of the onset or progression of disease, the amelioration, mitigation, or stabilization of a disease state, partial or complete recovery, prolonged survival, and other beneficial alterations. In this regard, the term is intended to include the mitigation, amelioration, reduction or cure of symptoms of brain somatic mutation-associated FCD thanks to the administration of the mTOR inhibitor of the present disclosure into patients.

The symptoms of brain somatic mutation-associated FCD occur as neurons in an area of the brain fail to migrate in the proper formation during brain development, and are exemplified by spontaneous seizures, behavioral seizures, electrographic seizures, and the generation of abnormal neurons in the cerebral cortex.

Accordingly, the treatment according to the present disclosure may mean a significant decrease in the onset frequency of spontaneous seizures, behavioral seizures, and electrographic seizures and in the number or soma size of abnormal neurons in the cerebral cortex thanks to the administration of an mTOR inhibitor, for example, rapamycin, everolimus, and/or the compounds of Chemical Formulas 1 to 4, into patients with brain somatic mutation-associated FCD.

Depending on modalities and regimens of the pharmaceutical composition of the present disclosure, an effective amount of the mTOR inhibitor may be suitably determined by those skilled in the art.

For example, the pharmaceutical composition may comprise the mTOR inhibitor in an amount of 0.1 to 10% by weight based on the total weight of the composition, and particularly in an amount of 0.5 to 5% by weight.

The pharmaceutical composition of the present disclosure may comprise the mTOR inhibitor alone or in combination with a pharmaceutically acceptable additive. The pharmaceutically acceptable additive is an additive that is typically useful for formulations, examples of which include lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, and mineral oil. Examples of pharmaceutically acceptable excipients available in the present disclosure include a lubricant, a humectant, a sweetener, an aromatic, an emulsifier, a flavoring agent, a suspending agent, and a preservative, but are not limited thereto. That is, pharmaceutically acceptable additives available in the pharmaceutical composition of the present disclosure may be selected according to the purpose of use by those skilled in the art without difficulty, and their amounts may be determined within the range that does not hinder the purpose and effect of the present disclosure.

The therapeutically effective amount of the pharmaceutical composition of the present disclosure may vary depending on various factors including a patient's state, and weight, the severity of disease, the dosage form of drug, the route of administration, the time of administration, etc. For a preferable effect, the active ingredient of the present disclosure may be administered in an amount of from 1 to 1000 mg/kg a day, preferably in an amount of from 50 to 500 mg/kg, and more preferably in an amount of 150 to 300 mg/kg. The composition of the present disclosure may be administered in a single dose or may be divided into multiple doses. Accordingly, the dosage does not limit the present disclosure in any aspect.

The pharmaceutical composition of the present disclosure may be administered to mammals such as rats, mice, livestock and humans via various routes. All of the administration methods are known, and, for example, the dosage may be administered orally, rectally, intravenously, intramuscularly, subcutaneously, or intracerebroventricularly.

Another embodiment of the present disclosure pertains to a food composition for preventing or ameliorating brain somatic mutation-associated FCD, comprising at least one selected from the group consisting of the mTOR inhibitors, for example, rapamycin or a salt thereof, everolimus or a salt thereof, the compound of Chemical Formula 1 or a salt thereof, the compound of Chemical Formula 2 or a salt thereof, the compound of Chemical Formula 3 or a salt thereof, and the compound of Chemical Formula 4 or a salt thereof. The compounds of Chemical Formulas 1 to 4 are as defined above.

The food composition may be added to foods, without change or together with other food or food ingredients, and used properly according to typical modalities. The mTOR inhibitor useful in the present disclosure may be determined suitably according to the purpose of use (prevention, health or therapeutic treatment). For a general food composition, the active ingredient may be contained in an amount of 0.01 to 10 parts by weight, based on 100 parts by weight of the composition, and particularly in an amount of 0.05 to 1 parts by weight. However, the content of the mTOR inhibitor may be below the range in a food composition that is intended for long-term ingestion with the aim of improving or controlling health.

The food composition may be applied to a health food for the prevention or amelioration of brain somatic mutation-associated FCD. There are no particular limitations on the kind of health food to which the composition of the present invention can be added. Examples of such a health food include meats, sausages, breads, chocolates, candies, snacks, confectionery, pizzas, ramen noodles, other noodles, gums, dairy products such as ice cream, various soups, beverages, teas, drinks, alcoholic beverages, vitamin complexes, etc., and all kinds of commonly accepted health foods. In addition, the food composition of the present disclosure may further comprise a cytologically acceptable additive. Although not significantly important, the content of the sitologically acceptable additive may generally be determined within a range of 0.01 to 0.1 parts by weight, based on 100 parts by weight of the composition of the present disclosure.

Another embodiment of the present disclosure addresses a kit or composition for the diagnosis of intractable epilepsy or a causative disease thereof, comprising an agent capable of detecting a mutation in a gene or protein involved in the PI3K-AKT-mTOR pathway, or a method for the diagnosis of intractable epilepsy or a causative disease thereof, using the same.

Another embodiment of the present disclosure addresses a biomarker panel for the diagnosis of intractable epilepsy, comprising a mutant of a gene or protein involved in the PI3K-AKT-mTOR pathway. A further embodiment of the present disclosure addresses a composition for inducing intractable epilepsy, comprising a mutant of a gene or protein involved in the PI3K-AKT-mTOR pathway.

The term "diagnosis", as used herein, refers to identifying the presence or characteristics of a pathological condition. For the purpose of the present disclosure, "diagnosis" may mean identifying the onset of intractable epilepsy, and furthermore, the progression or aggravation of the disease.

As used herein, the terms "diagnostic marker" "marker for diagnosis" and "diagnosis marker" are intended to indicate a substance that is found specifically in a sample of a patient with intractable epilepsy and the detection of which accounts for the onset of intractable epilepsy. For the purpose of the present disclosure, the diagnostic marker of the present disclosure may mean mutant genes or proteins of mTOR, TSC1, TSC2, AKT3 and PIK3CA, which are present specifically in the affected brain regions of intractable epilepsy patients.

As used herein, the term "biomarker panel" is intended to include one or more of the biomarkers disclosed in the present disclosure. The biomarker panel can be detected using a detection agent (or reagent) that can directly or indirectly associate with or bind to a biomarker protein or gene present in a sample.

The brain somatic mutant associated with intractable epilepsy in accordance with the present disclosure may be a mutant of a gene or protein involved in the PI3K-AKT-mTOR pathway. For example, mutants of mTOR, TSC1, TSC2, AKT3 and PIK3CA genes or proteins may be available. These mutant genes or proteins are as described above.

In a particular embodiment, the agent capable of detecting a substitution may be a primer, a probe or an antisense nucleic acid that is specific for a substitution region.

Another embodiment of the present disclosure addresses a method for providing information on the diagnosis of intractable epilepsy, comprising:
  (a) treating a sample of a subject with the diagnostic kit;
  (b) detecting in the sample a biomarker panel containing at least one selected from the group consisting of the substitutions listed in Table 1; and
  (c) determining the onset of intractable epilepsy if the biomarker panel containing one or more of the substitutions is detected.

Also, contemplated in accordance with another aspect of the present disclosure is a diagnostic kit for intractable epilepsy, comprising an agent capable of detecting the amino acid substitutions listed in Table 1.

In a particular embodiment, the agent capable of detecting the substitutions may be an antibody or aptamer specific for a substitution region.

According to another aspect, the present disclosure relates to a method for providing information on the diagnosis of intractable epilepsy, comprising:
  (a) treating a sample of a subject with the diagnostic kit;
  (b) detecting in the sample a biomarker panel containing at least one selected from the group consisting of the mutations listed in Table 1; and
  (c) determining the onset of intractable epilepsy if the biomarker panel containing one or more of the substitutions is detected.

In a particular embodiment, the sample may be a brain tissue sample from the subject.

Another aspect of the present disclosure addresses a biomarker panel for the diagnosis of intractable epilepsy, comprising the mutant protein or the mutant gene.

The term "agent capable of detecting a substitution", as used in the context of the detection of substitutions on nucleotide sequences, means a substance useful for detecting a substitution (mutation) on the nucleotide sequences of mTOR, TSC1, TSC2, AKT3 or PIK3CA in the sample. For example, the agent may be a primer, probe, or an antisense oligonucleotide capable of binding specifically or complementarily to a nucleotide sequence carrying a substitution. Particularly, the primer, the probe or the antisense oligonucleotide may specifically bind to the stretch carrying a substitution, but not to a wild-type sequence.

The term "complementary" as used herein means a level of complementarity sufficient to selectively hybridize with the nucleotide sequence under certain particular hybridization or annealing conditions, and particularly under physiological conditions, and is intended to include both substantial complementarity and perfect complementarity, particularly perfect complementarity.

In some embodiments of the present disclosure, the agent for detecting a substitution region of a gene may be an antisense oligonucleotide. The term "antisense oligonucleotide", as used herein, encompasses a nucleic acid-based molecule complementary to a target mutation region to form a duplex with the mutation region. It is applicable to the detection of the gene biomarker panel of the present disclosure.

In other embodiments of the present disclosure, the agent for detecting a substitution region of a gene may be a primer or a probe. Because nucleotide sequences of mTOR, TSC1, TSC2, AKT3 and PIK3CA mutant genes useful in the present disclosure are revealed, a primer or a probe for specifically amplifying a predetermined region of the gene can be designed on the basis of the nucleotide sequences.

As used herein, the term "primer" refers to a short nucleic acid strand, typically 7 to 50 bases long, having a free 3' hydroxyl group, which forms a base pair with a complementary template so as to serve as a starting point for the production of a new template strand. Primers are typically synthesized, but may be naturally occurring nucleic acids. The sequence of a primer need not be completely consistent with that of a target template, and may be accepted if it is sufficiently complementary to hybridize with the template. DNA synthesis or replication requires a suitable buffer, proper temperatures, polymerizing enzymes (DNA polymerase or reverse transcriptase), and four kinds of nucleotide triphosphates, in addition to primers. In the present disclosure, sense and antisense primers specific for mTOR polynucleotide can be used for PCR amplification so that the PCR products can be used to diagnose epilepsy. The length of the sense and antisense primers may be suitably altered depending on the information known in the art. Particularly, the primers useful in the present disclosure may be those applicable to the amplification of a mutant region of the gene provided by the present disclosure.

In other embodiments of the present disclosure, the agent for detecting a substitution region of a gene may be a probe. The term "probe", as used herein, is intended to refer to a fragment of a nucleotide sequence, such as RNA or DNA, ranging in length from ones to hundreds of bases, which can bind specifically to an mRNA of interest and which is tagged with a label for detecting the mRNA of interest. The probe useful in the present disclosure may be constructed in the form of oligonucleotide probes, single-stranded DNA probes, double-stranded DNA probes, or RNA probes. In an embodiment of the present disclosure, the diagnosis of epilepsy may be achieved by determining whether a probe complementary to the mTOR mutant polynucleotide of the present disclosure hybridizes with the nucleotide sequence of interest. The selection of suitable probes and hybridization conditions may be modified according to information known in the art.

The primers or probes useful in the present disclosure may be chemically synthesized using a phosphoramidite solid support method or other well-known techniques. Their nucleotide sequences may be modified using various means known in the art, so long as their fundamental properties remain unchanged. Illustrative, non-limiting examples of the modification include methylation, capping, substitution of natural nucleotides with one or more homologues, and alternation between nucleotides.

The term "agent for detecting a substitution", as used in the context of the detection of a substitution on an amino acid sequence, refers to a substance useful for detecting a mutant region of a biomarker panel protein in a sample of a patient. Particularly, the agent may be an antibody or aptamer specific for a protein composed of an amino acid sequence carrying a mutation provided by the present disclosure. In some embodiments, the antibody may be monoclonal or polyclonal.

The term "antibody", as used herein, refers to a specific protein molecule that indicates an antigenic region. With respect to the purposes of the present invention, the antibody binds specifically to a mutant region of the biomarker panel protein of the present disclosure. This antibody can be produced from a protein that is encoded by the mutant gene, typically cloned into an expression vector using a conventional method. Also, partial peptides being producible from the protein which is encoded by the mutant gene fall within the scope of the antibody. To function as an antibody, the partial peptide is required to contain at least 7 amino acid residues, preferably 9 or more amino acid residues, and more preferably 12 or more amino acid residues. No particular limitations are imposed on the form of the antibodies of the present disclosure. Among them are polyclonal antibodies, monoclonal antibodies and fragments thereof which contain a paratope, and all immunoglobulin antibodies. Further, special antibodies such as humanized antibodies are also within the scope of the present invention.

In addition, the antibodies of the present disclosure which are used to detect the marker diagnostic of intractable epilepsy include functional fragments of antibody molecules as well as complete forms having two full-length light chains and two full-length heavy chains. The functional fragments of antibody molecules refer to fragments retaining at least an antigen-binding function, and include Fab, $F_{(ab')}$, $F_{(ab')2}$, Fv and the like.

The agent for detecting a biomarker panel gene or protein in accordance with the present disclosure may be embodied into a kit. The kit according to the present disclosure is capable of detecting a biomarker panel gene or a protein. The kit of the present invention may comprise a primer, a probe or an antisense oligonucleotide for detecting a biomarker panel gene, or an antibody or an aptamer for detecting a biomarker panel protein, and one or more compositions, agents or devices suitable for analysis.

For instance, the kit for detecting a biomarker panel gene in accordance with the present disclosure may be a kit for diagnosing intractable epilepsy comprising elements necessary for DNA chip function. The DNA chip kit may comprise a substrate to which an agent for detecting a biomarker panel gene is immobilized, and a reagent, an agent and an enzyme for constructing a fluorescence-labeled probe. In addition, the substrate may contain an agent for quantitatively detecting a control gene or a fragment thereof. In addition, the kit designed to detect a biomarker panel gene may be a kit comprising elements necessary for PCR Such a PCR kit may comprise a pair of primers specific for each of the mTOR mutant genes, test tubes or other suitable containers, reaction buffers (various pH and magnesium concentrations), deoxynucleotides (dNTPs), enzymes such as Taq-polymerase, a DNase inhibitor, an RNase inhibitor, DEPC-water, sterile water, and so on. In addition, the kit may further comprise a pair of primers specific for a gene useful as a quantitative control. Particularly, the kit may be a multiple PCR kit for simultaneously amplifying and analyzing biomarker panel genes through multiple PCR Alternatively, the kit for detecting a biomarker panel protein may comprise antibodies and elements necessary for the immunological detection of the antibodies, including a support, a suitable buffer, a coloring enzyme- or fluorescent-labeled secondary antibody, and a coloring substrate. Examples of the support include a nitrocellulose membrane, a 96-well plate made of polyvinyl resin or polystyrene resin, and slide glass. Among the coloring enzymes are peroxidase and alkaline phosphatase. FITC or RITC may be used as a fluorescent. ABTS (2,2'-azino-bis-(3-ethylbenzothiazoline- 6-sulfonic acid)) or OPD (o-phenylenediamine), or TMB (tetramethyl benzidine) is suitable as the coloring substrate.

Genomic DNA or total protein available in the method for detecting a biomarker panel in a sample of a subject according to the present disclosure may be separated using a process known in the art.

The term "a sample of a subject", as used herein, is intended to encompass specimens including tissues and cells in which the biomarker panel gene or protein can be detected. Particularly, the sample may be a brain tissue sample, but is not limited thereto.

According to some embodiments of the present disclosure, the method for detecting a biomarker panel gene in a sample of a subject comprises amplifying a nucleic acid from the sample and determining the base sequence of the amplified nucleic acid.

The amplification of the nucleic acid may be achieved by polymerase chain reaction (PCR), multiplex PCR, touchdown PCR, hot start PCR, nested PCR, booster PCR, real-time PCR, differential display PCR (DD-PCR), rapid amplification of cDNA ends (RACE) PCR, inverse PCR, vectorette PCR, thermal asymmetric interlaced PCR (TAIL-PCR), ligase chain reaction, repair chain reaction, transcription-mediated amplification, self-sustained sequence replication, or selective amplification of target polynucleotide sequences.

To determine the base sequence of the amplified nucleic acid, Sanger sequencing, Maxam-Gilbert sequencing, Shotgun sequencing, pyrosequencing, hybridization by microarray, allele-specific PCR, dynamic allele-specific hybridization (DASH), PCR extension assay, TaqMan technique, automated DNA sequencing, or next-generation DNA sequencing may be used. The next-generation DNA sequencing may be performed using a DNA analyzing system widely known in the art, for example, 454 GS FLX manufactured by Roche, Genome Analyzer manufactured by Illumina, SOLid Platform manufactured by Applied Biosystems, etc.

The detection of a biomarker panel protein in a sample of a patient may be performed by Western blotting, ELISA, radioimmunoassay, radioimmunodiffusion, ouchterlony immunodiffusion, rocket immunoelectrophoresis, immunohistostaining, immunoprecipitation assay, complement fixation assay, FACS, or protein chip assay using an antibody or aptamer specifically detecting the corresponding amino acid mutation. With the analysis methods, an antigen-antibody complex between the mTOR mutant protein and the antibody thereof can be identified, and intractable epilepsy can be diagnosed by examining the antigen-antibody complex between the mutant protein and the antibody thereof.

As used herein, the term "antigen-antibody complex" is intended to refer to a product formed by the binding of a mutant protein to an antibody specific thereto. The antigen-antibody complex thus formed may be quantitatively determined by measuring the signal intensity of a detection label.

The detection label may be selected from a group consisting of enzymes, fluorescents, ligands, luminescents, microparticles, redox molecules, and radioactive isotopes, but not strictly limited thereto. If an enzyme is used as the detection label, available enzymes may include β-glucuronidase, β-D-glycosidase, β-D-galactosidase, urease, peroxidase or alkaline phosphatase, acetylcholinesterase, glucose oxidase, hexokinase and GDPase, RNase, glucose oxidase and luciferase, phosphofructokinase, phosphoenolpyruvate carboxylase, aspartate aminotransferase, phosphoenolpyruvate decarboxylase, β-lactamase or the like, but are not limited thereto. Examples of the fluorescents may include fluorescein, isothiocyanate, rhodamine, phycoerythrin, phycocyanin, allophycocyanin, o-phthalaldehyde, fluorescamine or the like, but are not limited thereto. The ligand may be exemplified by biotin derivatives, but is not limited thereto. Among the luminescents may be acridinium ester, luciferin, and luciferase. Representative of the microparticles are colloidal gold and colored latex, without limitation thereto. The redox molecules may include ferrocene, ruthenium complex, biologen, quinone, Ti ion, Cs ion, diimide, 1,4-benzoquinone, hydroquinone, $K_4W(CN)_8$, $[Os(bpy)_3]^{2+}$, $[RU(bpy)_3]^{2+}$, $[MO(CN)_8]^{4-}$ or the like, but are not limited thereto. The radioactive isotope may be exemplified by, but are not limited to, $^3H$, $^{14}C$, $^{32}P$, $^{35}S$, $^{36}Cl$, $^{57}CO$, $^{58}CO$, $^{59}Fe$, $^{90}Y$, $^{125}I$, $^{131}I$, $^{186}Re$ or the like.

In one exemplary embodiment, the measurement of an antigen-antibody complex between a biomarker panel protein and an antibody thereof may be achieved through an ELISA assay. In this regard, various kinds of ELISA assay may be employed, including direct ELISA using a labeled antibody that recognizes antigen attached to a solid support, indirect ELISA using a labeled antibody that recognizes a capture antibody from the complex of the antibody that recognizes an antigen attached to the solid support, direct sandwich ELISA using a labeled antibody that recognizes the antigen of an antigen-antibody complex attached to the solid support, and indirect sandwich ELISA, in which an antibody recognizing the antigen of an antigen-antibody complex attached to a solid support is detected by a labeled secondary antibody.

Most useful is a sandwich ELISA assay in which an antibody attached to a solid support is reacted with a sample and then captured by a labeled antibody recognizing the antigen of an antigen-antibody complex to perform enzymatic staining or by a labeled secondary antibody recognizing the antigen of an antigen-antibody complex to perform enzymatic staining. The onset of intractable epilepsy can be determined by identifying the formation of a complex between the biomarker panel and the antibody.

In another embodiment, Western blotting may be carried out using one or more antibodies active against the biomarker panel. For example, total proteins are isolated from a sample and separated according to size via electrophoresis. The electrophoresed proteins are then transferred onto a nitrocellulose membrane and reacted with the antibody. Quantitative analysis of the formed antigen-antibody complex with a labeled antibody makes it possible to determine the onset of intractable epilepsy, based on the expression level of the mutant protein encoded by the mutant gene. Such detection may be carried out by investigating an antigen-antibody complex between a mutant protein and an antibody thereof.

Also, available in accordance with still another embodiment of the present disclosure is a protein chip in which an array of antibodies against biomarker panel proteins is immobilized at predetermined loci and high density on a substrate. The protein chip assay may comprise isolating total proteins from a sample, hybridizing the isolated proteins with the protein chip to form an antigen-antibody complex, reading the information displayed on the protein chip to identify the presence of a protein of interest, and determining the onset of intractable epilepsy.

When an mTOR mutant gene or protein is detected using any of the detection methods, diagnosis can be made of the onset of intractable epilepsy caused by malformations of cortical developments.

According to another aspect thereof, the present disclosure addresses a technique of constructing an epilepsy model, comprising inducing intractable epilepsy with the genetic mutation and protein mutation.

A particular embodiment pertains to a composition for inducing intractable epilepsy, comprising at least one selected from among mTOR, TSC1, TSC2, AKT3, and PIK3CA mutant genes or proteins.

Also, contemplated in accordance with another aspect of the present disclosure is an intractable epilepsy-induced animal into which a mutant gene or protein of at least one selected from among mTOR, TSC1, TSC2, AKT3 and PIK3CA is introduced.

In accordance with another aspect thereof, the present disclosure pertains to a method for inducing intractable epilepsy, comprising introducing a mutant gene or protein of at least one selected from among mTOR, TSC1, TSC2, AKT3 and PIK3CA into a cell, ex vivo.

As used herein, the term "induction" means effecting a change from a normal state into a pathological state. For the purpose of the present disclosure, the term "induction" as used in conjunction with epilepsy refers to induction of the onset of intractable epilepsy from a healthy state.

In some embodiments, epilepsy-induced cells can be prepared by introducing a mutant gene or protein of at least one of mTOR, TSC1, TSC2, AKT3, and PIK3CA into cells. The cells include brain cells or embryos. The cells into which the mutant gene or protein is introduced may be developed into an intractable epilepsy-induced animal. When the mutant gene or protein is introduced, mTOR hyperactivation may occur, causing a failure in neuronal migration and a significant increase in S6K phosphorylation, with the consequent induction of epilepsy.

mTOR, TSC1, TSC2, AKT3, and PIK3CA mutant proteins with mutations on their wild-type amino acid sequences may be obtained from natural sources by extraction and purification using a method widely known in the art. Otherwise, the mutant proteins can be prepared by chemical synthesis (Merrifield, J. Amer. Chem. Soc. 85:2149-2156, 1963) or by recombinant DNA technology.

For chemical synthesis, a polypeptide synthetic method widely known in the art may be used. In recombinant DNA technology, a nucleic acid encoding a protein having a mutation on its amino acid sequence is inserted into a suitable expression vector, which is then transformed into host cells. They are cultured to express the mutant protein, followed by recovering the mutant protein, having a mutation on the amino acid sequence thereof, from the host cells. After being expressed in selected host cells, the mutant protein can be isolated and purified using a typical biochemical separation technique, for example, treatment with a protein precipitant (salting-out), centrifugation, sonication, ultrafiltration, dialysis, various chromatographic techniques such as molecular sieve chromatography (gel filtration), adsorption chromatography, ion-exchange chromatography, and affinity chromatography. Typically, the techniques are used in combination to achieve a protein of high purity.

Nucleotide sequences coding for mTOR, TSC1, TSC2, AKT3, and/or PIK3CA proteins with a mutation on their wild-type amino acid sequences can be isolated from natural sources or prepared by chemical synthesis. Nucleic acids having such nucleotide sequences may be single- or double-stranded, and may be DNA molecules (genome, cDNA) or RNA molecules. For the chemical synthesis of nucleic acids, synthetic methods widely known in the art, such as those described in the literature (Engels and Uhlmann, Agnew(?) Chem. Int. Ed. Engl. 37:73-127, 1988) may be used, as exemplified by triester, phosphite, phosphoramidite and H-phosphonate methods, PCR and other autoprimer methods, oligonucleotide synthesis on solid supports or the like.

In a particular embodiment of the present disclosure, the mutant protein or gene may be introduced into cells, embryos or animals with the aid of a recombinant vector.

The term "vector", as used herein, refers to a means for introducing a nucleotide sequence encoding a protein of interest into a host cell. Plasmid vectors, cosmid vectors, and viral vectors fall within the scope of such a vector. A suitable expression vector may include a signal sequence or leader sequence for membrane targeting or secretion, in addition to regulatory elements such as a promoter, an operator, an initiation codon, a termination codon, a polyadenylation signal, and an enhancer, and may be constructed into various structures depending on the purpose. The initiation codon and the termination codon may be generally considered a portion of a nucleotide sequence encoding a protein of interest, necessarily functional in an individual to whom a genetic construct has been administered, and must be in a frame together with the coding sequence. The promoter may be generally constitutive or inducible. Further, the expression vector may include a selectable marker for selecting host cells containing the vector. For a replicable expression vector, a replication origin is necessary. A vector may replicate by itself, or may be incorporated into a host genomic DNA In a particular embodiment, a vector carrying a gene is designed so that the gene is irreversibly incorporated into the genome of a host cell and is stably expressed for a long time in the cell.

The mutant protein or gene of the present disclosure may be introduced into cells, particularly brain cells. In addition, it may be introduced into embryos, preferably embryos at the stage of brain formation and development.

No particular limitations are imposed on the method of introducing proteins or genes. For example, a vector may be inserted into cells, using a method such as transformation, transfection or transduction. The vector introduced into cells continuously expresses a gene inserted thereinto in the cells so as to produce a mutant protein having a mutation on its wild-type amino acid sequence.

As used herein, the term "epilepsy-induced animal" is intended to refer to a non-human animal that is transformed to exhibit increased intracellular mTOR protein activity compared to normal cells. The transformation may be induced by introducing a vector expressing at least one mutant protein of mTOR, TSC1, TSC2, AKT3 and/or PIK3CA into cells. The transgenic animal with intractable epilepsy can be effectively used as an intractable epilepsy animal model.

As used herein, the term "animal model" or "disease model" is intended to refer to an animal that suffers from a disease similar to a specific human disease and thus can be used as a model for the study of etiology and pathogenesis. For use as an animal model, an animal should support prediction of the same effect as in humans and should be easily and reproducibly constructed. In addition, the disease of the animal model should have the same etiology as in humans, or should progress in a pattern similar to that in humans. Accordingly, mammalian vertebrates, which are similar in body structure to humans, for example with respect to the internal organs, immune system, and body temperature, and which suffer from diseases such as hypertension, cancer, immunodeficiency, etc. are suitable as animal models. The animals are particularly mammals, such as horses, sheep, pigs, goats, camels, antelopes, dogs, rabbits, mice, rats, guinea pigs, and hamsters, and more particularly rodents such as mice, rats, guinea pigs, and hamsters. A mouse is most frequently used in studying human diseases because of its various advantages including small size, potent fertility, easy feeding management, high resistance to disease, hereditary uniformity, and variety of strains. Another advantage for acceptance for use as an animal model is that mice can be transformed to exhibit diseases or symptoms identical or similar to those in humans.

The animal model of the present disclosure is an epilepsy model constructed by gene manipulation to express at least one of mutant proteins of mTOR, TSC1, TSC2, AKT3 and/or PIK3CA. Exhibiting the ability to induce intractable epilepsy, the mutant protein or gene of the present disclosure can be introduced into cells or embryos to construct an intractable epilepsy model.

In the present disclosure, for example, at least one of mutant proteins or genes of mTOR, TSC1, TSC2, AKT3 and PIK3CA is introduced into an animal embryo which can then be developed into an animal in which intractable epilepsy is induced. The mutant protein or gene can be introduced into embryos with the aid of a vector carrying the gene. No particular limitations are imposed on the technique of introducing the vector into an embryo. Particularly, the vector may be introduced into an embryo at the stage of cerebral cortex formation.

The animal model with epilepsy according to the present disclosure can be effectively applied to the study of gene functions, molecular mechanisms of epilepsy, and novel anti-epileptic drugs.

Another aspect of the present disclosure addresses a composition, a kit and a method for preventing, ameliorating or treating intractable epilepsy or a disease causative of intractable epilepsy. The disease causative of intractable epilepsy includes malformations of cortical developments (MCD) such as FCD, Hemimegalencephaly and Tuberous Sclerosis Complex, Hippocampal Sclerosis (HS), and Sturge-Weber Syndrome (SWS).

Advantageous Effects

As described above, the administration of an mTOR inhibitor, for example, rapamycin, everolimus, and/or the compounds of Chemical Formulas 1 to 4, into patients with brain somatic mutation-associated FCD can bring about a significant decrease in the frequency of onset of brain somatic mutation-associated intractable epilepsy or its causes, for example, spontaneous seizures, behavioral seizures, and electrographic seizures, and in the number or soma size of abnormal neurons in the cerebral cortex. In addition, the present disclosure provides a biomarker panel effective for the diagnosis of intractable epilepsy and a technique for the diagnosis of intractable epilepsy using the same. Moreover, intractable epilepsy can be induced in accordance with the present disclosure, and epilepsy animal models thus constructed make it possible to study genetic functions, the molecular mechanisms of epilepsy, and novel anti-epileptic drugs.

DESCRIPTION OF DRAWINGS

FIG. 1a shows post-operative brain MRI images of patients carrying mTOR mutations (FCD4, FCD6), and H&E staining of pathological samples from the patients. The arrowheads (white) indicate resected brain regions and the arrows (black) indicate cytomegalic neurons (Scale bar=50 um).

FIG. 1b shows sites of mTOR-associated somatic mutations as found in FCD patients through deep sequencing.

FIG. 1c shows evolutionarily conserved amino acid residues responsible for the mTOR-associated somatic mutations on the mTOR sequences.

FIG. 2a shows the results of Western blot analysis of S6 phosphorylation in mTOR mutation-expressing HEK293T cells. "P-S6" stands for phosphorylated S6 proteins, "S6" for S6 proteins, and "Flag" for flag proteins. "20% serum" represents a positive control with mTOR activity after exposure to 20% serum for 1 hr.

FIG. 2b shows the results of an in-vitro kinase assay for mTOR proteins in HEK293 cells expressing the mTOR mutations of the present disclosure.

FIG. 2c shows the results of an immunohistochemical assay for S6 phosphorylation level and soma size in pathological samples from patients with FCD-caused intractable epilepsy.

FIG. 2d shows the mean numbers of phosphorylated S6 proteins in representative cortical regions of patients with FCD-caused intractable epilepsy (number of counted cells=197-1182 per case).

FIG. 2e shows the mean soma sizes of neurons in representative cortical regions of patients with FCD-caused intractable epilepsy.

FIG. 3a shows schematic views of a procedure for electroporating embryos in utero at embryonic day 14 (E14) with a plasmid carrying mTOR mutations, followed by screening only mice exhibiting fluorescence with a flashlight (Electron Microscopy Science, USA) after birth, monitoring the mice for seizures through video-electroencephalography (video-EEG), and examining the effect of rapamycin after the onset of seizures. The "in-utero electroporation (E14)" schematically shows the electroporation of a plasmid carrying mTOR mutations at embryonic day 14, the "GFP screening at birth (P0)" schematically shows monitoring only of fluorescence-exhibiting mice with a flashlight (Electron Microscopy Science, USA) after the electroporated embryos are delivered, and the "Video-EEG monitoring (>3 weeks)" schematically shows recording video-EEG with implanted electrodes after video monitoring of seizure onset from the time of weaning (>3 weeks).

FIG. 3b shows the presence of spontaneous seizures in mice carrying mTOR mutations of the present disclosure, based on video-EEG recording. The "No. of GFP+pups" represents the number of mice that expressed GFP as a result of the introduction of mTOR mutations thereinto, and the "No. of mice with seizure" represents the number of mice that underwent seizures as a result of the introduction of mTOR mutations thereinto.

FIG. 3c shows frequencies of spontaneous seizures in mice carrying mTOR mutations of the present disclosure before and after rapamycin treatment. *$p<0.05$ and **$p<0.01$ (n=7-17 for each group, one-way ANOVA with Bonferroni's post test).

FIG. 3d shows changes in the soma size of GFP-positive neurons in mice carrying mTOR mutations of the present disclosure before and after rapamycin treatment.

FIG. 4 is a schematic view of the experimental design of the present disclosure, showing deep sequencing analysis in tissues from FCD patients, and in-vitro and in-vivo functional analysis.

FIG. 5a shows algorithms used to exploit brain-specific mutations using both Virmid (Genome Biology, 14(8), R90 (2013)) and MuTect software (Nature Biotechnology, 31, 213 (2013)) with regard to the deep sequencing results.

FIG. 5b shows sequencing counts of reference (Ref) and mutant (Mut) alleles, and percentages of mutated alleles from deep whole exome sequencing and amplicon sequencing of FCD patient samples.

FIG. 6 shows somatic mutations of FCD, found by deep whole exome sequencing, as colored bars in the collapsed mode of an Integrative Genomic Viewer (IGV).

FIG. 7 shows brain MRI images from FCD patients. Arrows highlight the affected cortical regions.

FIG. 8 shows domain organizations and 3-D structures of the mTOR kinase prepared using PyMol1 (the PyMOL Molecular Graphics System, Schrodinger, LLC). "FAT" stands for FRAP, ATM, and TRRAP domains of mTOR, "FRB" for FKBP12-rapamycin binding domain, and "KD" for N and C lobes of the kinase domain. The activation and catalytic loops are indicated in red and blue, respectively. ATPrS and $Mg^{2+}$ are shown as sticks and spheres, respectively. Identified mutation sites in FCD patients are labeled in red.

FIG. 9a shows the effects of rapamycin on HEK293K cells expressing mTOR mutations.

FIG. 9b shows the effects of rapamycin on HEK293K cells expressing mTOR mutations. "P-56K" represents phosphorylated S6 proteins and "S6K" represents S6 proteins.

FIG. 9c shows the effects of the compounds of Chemical Formulas 1 to 4 and everolimus on HEK293K cells expressing mTOR mutations. "P-S6K" represents phosphorylated S6 proteins and "S6K" represents S6 proteins.

FIG. 10 shows the enrichment of the mTOR mutant allele of the present disclosure, as analyzed by Sanger sequencing after cytomegalic neurons with increased S6 phosphorylation, obtained from pathological tissues of patients with FCD-caused intractable epilepsy, are micro-dissected. NeuN-positive cytomegalic neurons with increased S6 phosphorylation are labeled with yellow dots. "LCM" represents cytomegalic cells microdissected through laser capture microdissection. For a control, bulk genomic DNA, extracted from brain samples without enrichment, was used. Scale bar, 100

FIG. 11a is a schematic view of the procedure for in-utero electroporation with a plasmid carrying mTOR mutations of the present disclosure at E14, followed by the analysis of brain coronal sections at E18.

FIG. 11b shows images of coronal sections of mouse brains electroporated with mTOR mutants of the present disclosure, representing the disruption of neuronal migrations and mTOR activity. "CP" stands for cortical plate, "IZ" for intermediate zone, "SVZ" for subventricular zone, "VZ" for ventricular zone, "Wild type" for the insertion of a wild-type mTOR plasmid, and "Relative intensity value" for the relative intensity of a GFP (green fluorescent protein) in each case.

FIG. 11c shows mTOR activity in the developing mouse neocortex after the introduction of the mTOR mutations of the present disclosure (Scale bars, 20 µm, Error bars, s.e.m.).

FIG. 12a shows video-EEG records of spontaneous seizures in mice expressing the mTOR mutations of the present disclosure. "LF" stands for left frontal, "RF" for right frontal, "LT" for left temporal, and "RT" for right temporal.

FIG. 12b shows interictal spikes and nonconvulsive electrographic seizures in mice expressing the mTOR mutations of the present disclosure.

FIG. 12c shows a change in the frequency of interictal spikes in mice expressing the mTOR mutations of the present disclosure before and after rapamycin treatment.

FIG. 12d shows a change in the frequency of nonconvulsive electrographic seizures in mice expressing the mTOR mutations of the present disclosure before and after rapamycin treatment.

FIG. 12e shows the time of seizure onset in mice carrying a wild-type mTOR gene or a mTOR mutant of the present disclosure. (n=8-20 for each group). Error bars, s.e.m.

FIGS. 13 and 14 show the results of the treatment of HEK293T cells, expressing the mTOR mutations of the disclosure, with various mTOR inhibitors. "P-S6K" stands for phosphorylated S6 kinase, and "S6K" for S6 kinase.

FIG. 15 shows the results of Western blot analysis of HEK293T cells carrying wild-type or mutant TSC-1. (−) and (+) indicate a control and rapamycin treatment (200 nM), respectively. "P-S6K" stands for phosphorylated S6 kinase and "S6K" for S6 kinase.

FIG. 16 shows the results of Western blot analysis of HEK293T cells carrying wild-type or mutant TSC-2. (−) and (+) indicate a control and rapamycin treatment (200 nM), respectively. "P-S6K" stands for phosphorylated S6 kinase and "S6K" for S6 kinase.

FIG. 17 shows the results of Western blot analysis of HEK293T cells carrying wild-type or mutant AKT3. (−) and (+) indicate a control and rapamycin treatment (200 nM), respectively. "P-S6K" stands for phosphorylated S6K kinase and "S6K" for S6K kinase.

FIG. 18 shows the association of p.Arg22Trp and p.Arg204Cys mutations of TSC-1 with mTOR hyperactivation, as analyzed in Example 9. Immunoprecipitation assay results are given to identify the mechanism of TSC1 mutant-induced mTOR hyperactivation. "Empty" indicates non-treated cells.

FIG. 19 shows the results of the GTP-agarose pull down assay according to Example 9. The activity level of the TSC complex was analyzed by measuring the level of GTP-bound Rheb, a substrate of the TSC complex.

FIG. 20 shows results of the treatment of mutant mTOR-expressing HEK293T cells with rapamycin. p<0.01 and *p<0.001 (comparison with wild-type, n=3-5 for each group, one-way ANOVA with Bonferroni's post test)

FIG. 21 shows the results of the treatment of mutant mTOR-expressing HEK293T cells with rapamycin. "P-S6K" stands for phosphorylated S6 kinase, and "56K" for S6 kinase.

FIG. 22 shows the results of the treatment of mutant mTOR-expressing HEK293T cells with the compounds of Chemical Formulas 1 to 4, and everolimus. "P-56" stands for phosphorylated S6, and "S6" for S6 protein.

FIGS. 23a and 23b show the results of Western blot analysis of wild-type or mutant mTOR-expressing HEK293T cells before and after treatment with 6 different drugs according to Example 10. (−) and (+) indicate a control and rapamycin treatment (200 nM), respectively. "P-S6K" stands for phosphorylated S6 kinase, and "S6K" for S6 kinase.

FIGS. 24a and 24b show the results of Western blot analysis of wild-type or mutant TSC1-expressing HEK293T cells before and after treatment with 6 different drugs. (−) and (+) indicate a control and rapamycin treatment (200 nM), respectively. "P-S6K" stands for phosphorylated S6 kinase, and "S6K" for S6 kinase.

FIGS. 25a and 25b show the results of Western blot analysis of wild-type or mutant TSC1-expressing HEK293T cells before and after treatment with 6 different drugs. (−) and (+) indicate a control and rapamycin treatment (200 nM), respectively. "P-S6K" stands for phosphorylated S6 kinase, and "S6K" for S6 kinase.

FIGS. 26a and 26c show pathological samples from all FCD patients identified as carrying TSC1 and TSC2 mutations. "Non-FCD" stands for samples with normal brains, "P-56" for phosphorylated S6 proteins, "NeuN" for a neuronal marker, and "Merge" for merged images of P-S6 and NeuN.

FIGS. 26b and 26d show percentages of cells expressing phosphorylated S6 in 4-5 cortical regions.

FIGS. 26e and 26f show the soma sizes of neuronal marker (NeuN)-positive neurons. $*p<0.05$, $P<0.001$, $*P<0.0001$ [relative to Non-FCD samples, one-way ANOVA with Bonferroni posttest]. Error bars, s.e.m. Scale bars, 50 um.

FIG. 27a shows the disruption of neuronal migration in TSC mouse models, resulting in malformations of cortical developments. "Control" indicates the absence of sgRNA, and red letters indicate percentages of cells expressing the plasmids. Scale bars, 250 um. FIG. 27b shows the distribution of electroporated cells in the cortex. $*p<0.05$, $***P<0.0001$ [Two-way ANOVA with Bonferroni posttest]. Error bars, s.e.m.

FIG. 28 shows electrographic seizures measured in TSC mouse models with spontaneous seizures after administration with rapamycin. $*p<0.05$ and $**p<0.01$ (n=7-17 for each group, one-way ANOVA with Bonferroni's post test)

MODE FOR INVENTION

A better understanding of the present invention may be obtained through the following examples which are set forth to illustrate, but are not to be construed as limiting the present invention.

Example 1: Identification of Gene by Whole Exome Sequencing, and Confirmation

Example 1-1: Identification of 3 Candidate mTOR Mutations from 4 Patients Through Whole Exome Sequencing Deep whole exome sequencing (read depth 412-668×) was performed on brain tissue samples from four FCDII patients (designated FCD3, FCD4, FCD6, and FCD23, respectively). Selection was made of three candidate genetic mutations that were found simultaneously using the two algorithms Virmid and Mutect.

To obtain data of the whole exome sequencinge, libraries of sequences were prepared using the Agilent library preparation protocols (Agilent Human All Exon 50 Mb kit) according to the manufacturer's instructions. The libraries were subjected to sequencing on Hiseq2000 (Illumina). For more accurate analysis, sequencing was carried out with a read depth of about 500×, five-times higher than the general sequencing depth. The sequencing data was prepared into a file that can be analyzed using the Best Practices Pipeline suggested by Broad Institute (https://www.broadinstitute.org/gatk/).

Example 1-2: Confirmation of 3 Gene Mutant Candidates by Site-Specific Amplicon Sequencing and Identification of One Genetic Mutation (L2427P)

Site-specific amplicon was performed for the candidate mutations-(read depth, 100-347, 499×). The samples were obtained from the same brain tissue block through biological replication, thereby minimizing any unexpected sequencing artifacts or erroneous calls that can mimic low-frequency somatic mutations. For the site-specific amplicon sequencing, the samples were determined to have a mutation when the percentage of mutated reads exceeded 1%.

Site-Specific Amplicon Sequencing

Two pairs of primers carrying two target regions of mTOR target gene codon sites (amino acids Cys1483 and Leu2427) were designed (Table 2).

TABLE 2

| Target region | | primer | SEQ ID NO |
|---|---|---|---|
| Chr1:11174301~Chr1:11174513 | Forward | 5'-TAGGTTACAGGCCTGGATGG-3' | 11 |
| | Reverse | 5'-CTTGGCCTCCCAAAATGTTA-3' | 12 |
| Chr1:11217133~Chr1:11217344 | Forward | 5'-TCCAGGCTACCTGGTATGAGA-3' | 13 |
| | reverse | 5'-GCCTTCCTTTCAAATCCAAA-3' | 14 |

Each primer had a patient-specific index, and only a single index was assigned to the sample from one patient so as to indicate patient origins of the base sequences upon the analysis of genetic mutations. PCR was performed on the target regions using the primers to amplify the nucleotide sequences of the two target regions. Subsequently, a DNA library was constructed using a Truseq DNA kit (Illumina) and libraries of the target genes were sequenced again on a Miseq sequencer (Illumina) (median read depth 135,424×). Using Bowtie2 (http://bowtie-bio.sourceforge.net/bowtie2/index.shtml), the sequences were aligned to a reference genome to generate analyzable files (bam files).

Example 1-3: Sequencing Analysis Results

The use of two different sequencing platforms in biological replicates, as shown in FIG. 5a, revealed recurrent mTOR c.7280T>C encoding p.Leu2427Pro in two patients. The allelic frequencies in the affected brains, as shown in FIG. 5b, ranged from 9.6 to 12.6% in FCD4 and from 6.9 to 7.3% in FCD6.

In addition, the mutation was negative in blood samples, as shown in FIGS. 5b and 6.

Example 2: Search of mTOR-Specific Gene Mutation in Large Cohort

Based on the data of mTOR-specific genetic mutations obtained from 4 patients in Example 1, deep sequencing of the mTOR gene was performed for a large FCDII cohort including 73 patients.

Example 2-1: Collection of Patient Samples and Extraction of Genomic DNA

From 73 focal cortical dysplasia (FCD)-caused intractable epilepsy patients undergoing epilepsy surgery, surgical brain tissues (1-2 g), saliva (1-2 ml), blood (about 5 ml), and formalin-fixed, paraffin-embedded brain samples were obtained with the consent thereof (Neurosurgery Dept. and Neurology Dept. of Severance Children's Hospital, Seoul, Korea). Genomic DNA was extracted from the freshly frozen brain, blood, saliva, and formalin-fixed, paraffin-embedded brain tissues using the following kits according to the instructions of the manufacturers:

Brain tissue: Qiamp mini DNA kit (Qiagen, USA), blood: Flexigene DNA kit (Qiagen, USA), saliva: prepIT2P purification kit (DNA Genotek, USA), formalin-fixed, paraffin-embedded brain tissue: Qiamp mini FFPE DNA kit (Qiagen, USA).

Example 2-2: Sequencing

Hybrid capture sequencing of brain tissue samples from 73 FCDII patients were performed (read depth, 100-17,700×). PCR-based amplicon sequencing was carried out through site-specific amplicon sequencing (read depth, 100-347,499×, 73 patients) and mTOR amplicon sequencing (read depth, 100-20,210×, 59 patients).

For hybrid capture sequencing, an mTOR-specific probe was designed using SureDesign online tools (Agilent Technologies). Sequencing libraries were prepared using Agilent library preparation protocols according to the manufacturer's instructions. Sequencing was conducted using Hiseq2500 (Illumina) (median read depth 515×). The data obtained from the sequencing was prepared into analyzable files (bam files) using the Broad Institute best practice pipeline (https://www.broadinstitute.org/gatk/).

For mTOR amplicon sequencing, extracted genomic DNA was sequenced using customized MTOR amplicon (Truseq custom amplicon kit, Illumina) designed with illumine design studio (http://designstudio.illumina.com). DNA library preparation was performed according to the manufacturer's instructions. The libraries were sequenced on a Miseq sequencer (Illumina) (median read depth 1,647×). Analyzable barn files were generated using the BWA-MEM algorithm (http://bio-bwasourceforge.net).

Example 2-3: Sequencing Result

In order to find brain-specific, de novosomatic mutations, blood-brain paired whole exome sequencing data sets were analyzed using both Virmid (http://sourceforge.net/projects/virmid/) and Mutect (http://www.broadinstitute.org/cancer/cga/mutect). Only the somatic mutations that were commonly found in the two analytic approaches were used in subsequent experiments.

Of the mutations commonly found in the hybrid capture sequencing and the PCR-based amplicon sequencing, only those meeting selection standards (depth 100 or greater, and 3 or more mutated calls (mapping quality 30 or higher) were selected as disease-related candidates.

For all 2508 CRAM files (compressed files) downloaded from the 1000 Genomes Project FTP, 9 somatic mutation positions were found (chr1:11298590 for c.1871G>A, chr1:11217330 for c.4348T>G, chr1:11217231 for c.4447T>C, chr1:11199365 for c.5126G>A, chr1:11188164 for c.5930C>A, chr1:11184640 for c.6577C>T, chr1:11184573 for c.6644C>T, chr1:11174395 for c.7280T>C and c.7280T>A). All of the 9 genomic positions were negative for the somatic mutations meeting the selection standards. Accordingly, the gene mutations identified in the present disclosure were found to be disease-specific.

Example 2-4: Sequencing Result

Overlapping mutations in both hybrid capture sequencing (73 patients) and mTOR amplicon sequencing (59 patients) were detected in order to obtain a total of 9 true candidate variants (inclusive of mutations found in Example 1).

To rigorously exclude any potential sequence artifacts and erroneous calls, variants were considered as true only when identified variants (>1% mutated reads) were reproducible in both hybrid capture and amplicon sequencing as well as in multi-samples.

This analysis, as shown in FIG. 1b, revealed another 10 FCDII patients carrying 8 different somatic mutations in MTOR: mTOR c.1871G>A (p.Arg624His), c. 4348T>G (p.Tyr1450Asp), c.4447T>C (p.Cys1483Arg), c.5126G>A (p.Arg1709His), c.5930C>A (p.Thr1977Lys), c.6577C>T (p.Arg2193Cys), c.6644C>T (p.Ser2215Phe), and c.7280T>A (p.Leu2427Gln). In total, 15.6% of the participants (12/77) were positive for 9 different brain somatic mutations in mTOR (Table 3).

TABLE 3

| Patient | Age upon Surgery | Sex | Pathology | mTOR gene mutation | mTOR protein mutation |
|---|---|---|---|---|---|
| FCD 4 | 5 years 2 months | F | Consistent with FCDIIa (Cortical dyslamination/Dysmorphic neurons) | c.7280T > C | p.Leu2427Pro |
| FCD 6 | 5 years | F | Consistent with FCDIIa (Cortical dyslamination/Dysmorphic neurons) | c.7280T > C | p.Leu2427Pro |
| FCD 91 | 7 years 1 month | F | Consistent with FCDIIa (Cortical dyslamination/Dysmorphic neurons) | c.6577C > T | p.Arg2193Cys |
| FCD 104 | 1 year 2 months | M | Consistent with FCDIIa (Cortical dyslamination/Dysmorphic neurons) | c.1871G > A | p.Arg624His |
| FCD 105 | 3 years 7 months | M | Consistent with FCDIIa (Cortical dyslamination/Dysmorphic neurons) | c.5126G > A | p.Arg1709His |
| FCD 107 | 7 years 3 months | F | Consistent with FCDIIb (Cortical dyslamination/Dysmorphic neurons/ balloon cells) | c.6644C > T | p.Ser2215Phe |
| FCD 113 | 10 years | F | Consistent with FCDIIb (Cortical dyslamination/Dysmorphic neurons/ balloon cells) | c.7280T > A | p.Leu2427Gln |
| FCD 116 | 7 years 9 months | M | Consistent with FCDIIb (Cortical dyslamination/Dysmorphic neurons/ balloon cells) | c.5930C > A | p.Thr1977Lys |
| FCD 121 | 11 months | M | Consistent with FCDIIb (Cortical dyslamination/Dysmorphic neurons/ balloon cells) | c.4348T > G | p.Tyr1450Asp |

TABLE 3-continued

| Patient | Age upon Surgery | Sex | Pathology | mTOR gene mutation | mTOR protein mutation |
|---|---|---|---|---|---|
| FCD 128 | 4 years 4 months | F | Consistent with FCDIIb (Cortical dyslamination/Dysmorphic neurons/balloon cells) | c.4447T > C | p.Cys1483Arg |
| FCD 143 | 2 years 10 months | F | Consistent with FCDIIb (Cortical dyslamination/Dysmorphic neurons/balloon cells) | c.6644C > T | p.Ser2215Phe |
| FCD 145 | 4 years 1 month | F | Consistent with FCDIIb (Cortical dyslamination/Dysmorphic neurons/balloon cells) | c.5930C > A | p.Thr1977Lys |

All identified mutations were negative for all available saliva and blood samples from mutation-positive patients. 100% of the exomes from the 1000 Genomes database were mutation-negative. Among the mutations, p.Thr1977Lys, p.Ser2215Phe, and p.Leu2427Pro were recurrently found in two patients. All mutation-positive patients were found to have a single mTOR mutation. The allelic frequencies of identified mutations range from 1.26% to 12.6%. As can be seen in FIG. 1c, the affected amino acids are evolutionarily conserved.

Example 3: Identification of mTOR Mutation-Induced mTOR Hyperactivation

To determine whether mTOR p.Tyr1450Asp, p.Cys1483Arg, p.Leu2427Gln, and p.Leu2427Pro lead to mTOR hyperactivation, HEK293T cells were transfected with wild-type or mutant mTOR vectors, and S6 phosphorylation, a well-known biomarker of mTOR activation along with S6K phosphorylation, was subjected to Western blot analysis.

Example 3-1: Mutagenesis and mTOR Mutant Construct

A pcDNA3.1 flag-tagged wild-type mTOR construct was provided from Dr. Kun-Liang Guan at University of California, San Diego. This construct was used to generate mTOR mutant vectors (Y1450D, C1483R, L2427Q and L2427P) with a QuikChange II site-directed mutagenesis kit (200523, Stratagene, USA).

To construct pCIG-mTOR mutant-IRES-EGFP vectors, an annealing primer set [forward primer 5'-AATTCCAAT-TGCCCGGGCTTAAGATCGATACGCGTA-3' (SEQ ID NO. 15) and reverse primer 5'-ccggtacgcgtatcgatct-taagcccgggcaattgg-3' (SEQ ID NO. 16)] were inserted into pCIG2 (CAG promoter-MCS-IRES-EGFP) to generate pCIG-C1 having new restriction enzyme sites MfeI and MluI. Using the primers [hmTOR-MfeI-flag-F; gAT-cACAATTGTGGCCACCATGGACTACAAGGACGAC-GATGACAAGatgc (SEQ ID NO. 17) and hmTOR-MluI-R; tgatcaACGCGTttaccagaaagggcaccagccaatatagc (SEQ ID NO. 18)], PCR fragments corresponding to wild-type and mutated mTOR genes were subcloned into the MfeI and MluI sites of pCIG-C1 to construct pCIG-mTOR wild type-IRES-EGFP and pCIG-mTOR mutant-IRES-EGFP vectors, respectively. Primers for mutagenesis are listed in Table 4, below.

TABLE 4

| Name | | Primer | SEQ ID NO |
|---|---|---|---|
| Y1450D | Forward | 5'-TCGTGCAGTTTCTCATCCCAGGTAGCCTGGATC-3' | 19 |
| | Reverse | 5'-GATCCAGGCTACCTGGGATGAGAAACTGCACGA-3' | 20 |
| C1483R | Forward | 5'-GGCCTCGAGGCGGCGCATGCGGC-3' | 21 |
| | Reverse | 5'-GCCGCATGCGCCGCCTCGAGGCC-3' | 22 |
| L2427Q | Forward | 5'-GTCTATGACCCCITGCAGAACTGGAGGCTGATG-3' | 23 |
| | Reverse | 5'-CATCAGCCTCCAGTTCTGCAAGGGGTCATAGAC-3' | 24 |
| L2427P | Forward | GTCTATGACCCCTTGCCGAACTGGAGGCTGATG | 25 |
| | Reverse | CATCAGCCTCCAGTTCGGCAAGGGGTCATAGAC | 26 |

Example 3-2. Transfection with Wild-Type and Mutant mTOR Vectors and Western Blot HEK293T cells (Thermo Scientific) was cultured in DMEM (Dulbecco's Modified Eagle's Medium) containing 10% FBS at 37° C. and 5% $CO_2$. The cells were transfected with empty flag-tagged vector, flag-tagged mTOR wild type, and flag-tagged mTOR mutants using jetPRIME transfection reagent (Polyplus, France). The cells were serum-starved with DMEM containing 0.1% FBS for 24 hours after transfection and then incubated at 37° C. and 5% $CO_2$ in PBS containing 1 mM $MgCl_2$ and $CaCl_2$ for 1 hour. The cells were lysed with PBS containing 1% Triton X-100 and Halt protease and phosphatase inhibitor cocktail (78440, Thermo Scientific, USA).

Proteins were resolved by SDS-PAGE and transferred to PVDF membranes (Millipore, USA). The membranes were blocked with 3% BSA in TBS containing 0.1% Tween 20 (TBST). They were washed 4 times with TBST. The membranes were each incubated overnight at 4° C. with primary antibodies including a 1/1000 dilution of anti-phospho-S6 ribosomal protein (5364, Cell Signaling Technology, USA), anti-56 ribosomal protein (2217, Cell Signaling Technology, USA), and anti-flag M2 (8164, Cell Signaling Technology, USA) in TBST. After incubation, the membranes were washed 4 times with TBST. They were incubated with a 1/5000 dilution of HRP-linked anti-rabbit or anti-mouse secondary antibodies (7074, Cell Signaling Technology, USA) for 2 hours at room temperature. After washing with TBST, immunodetection was performed using ECL reaction reagents.

Example 3-3. Monitoring of S6 Phosphorylation Level in Mutant mTOR-Expression Cell An in vitro mTOR kinase assay was performed. To this end, the kinase activity of mTOR was assayed using a K-LISA mTOR activity kit (CBA055, Calbiochem, USA) according to the manufacturer's protocol. The transfected cells (HEK293T cells) were lysed with TBS containing 1% Tween 20, Halt protease, and phosphatase inhibitor cocktail. One mg of total lysates was pre-cleared by adding 15 µl of protein G-beads (10004D, Life technologies, USA), and incubated at 4° C. for 15 min. Anti-flag antibodies were added to the pre-cleared lysates and incubated overnight at 4° C. Then, 50 µl of 20% slurry protein G-beads was added and incubated at 4° C. for 90 min. The supernatant was carefully discarded. The pelleted beads were washed 4 times with 500 µl of lysis buffer and once with the 1× kinase buffer of the K-LISA mTOR activity kit (K-LISA mTOR activity kit). The pelleted beads were resuspended in 50 µl of 2× kinase buffer and 50 µl of mTOR substrate (p70S6K-GST fusion protein), followed by incubation at 30° C. for 30 min. The reaction mixture was incubated in a glutathione-coated 96-well plate and incubated at 30° C. for 30 min. The phosphorylated substrate was detected using an anti-p70S6K-pT389 antibody, an HRP antibody-conjugate and a TMB substrate. Relative activities were measured by reading the absorbance at 450 nm.

As is understood from the data of FIGS. 2a and 9b, S6 phosphorylation was robustly increased in mutant mTOR-expressing cells.

Wild-type and mutant mTOR proteins were pulled down from MTOR wild-type and mutant-expressing HEK293T cells, respectively, and assayed in vitro for mTOR kinase activity. As shown in FIG. 2b, pCys1483Arg, p.Leu2427Gln, and p.Leu2427Pro mTOR proteins had constitutively increased kinase activity.

Example 3-4. Change in S6K Phosphorylation after Drug Treatment

After treatment with drugs (rapamycin, everolimus, compounds of Chemical Formulas 1 to 4), the mutant mTOR-expressing cells were analyzed for S6K phosphorylation.

Transfection of mTOR mutants into HEK293T cells was carried out in the same manner as in Example 3-2. Then, the cells were serum-starved with DMEM containing 0.1% FBS for 24 hours and incubated at 37° C. and 5% $CO_2$ in PBS containing 1 mM $MgCl_2$ and $CaCl_2$ for 1 hour, followed by treatment with rapamycin, everolimus, or compounds of Chemical Formulas 1 to 4 (Torinl, INK128, AZD8055, GSK2126458); Torin was purchased from TOCRIS, INK128, AZD8055, and GSK2126458 were provided from Selleckchem, and everolimus was purchased from LC laboratory. Subsequently, Western blotting was performed in the same manner as in Example 9.

As can be seen in FIGS. 9a and 9b, the phosphorylation of S6K in mutant mTOR-expressing cells was inhibited by rapamycin treatment.

In addition, the mutant mTOR-expressing cells were monitored for S6K phosphorylation after treatment with everolimus or the compounds of Chemical Formulas 1 to 4.

Likewise, everolimus or the compounds of Chemical Formulas 1 to 4 inhibited the phosphorylation of S6K in the mutant mTOR-expressing cells, as shown in FIG. 9c.

Example 3-5. Change of S6K Phosphorylation with Various mTOR Inhibitors

Cells expressing various mTOR mutations were treated in the same manner as in Example 3-2 with rapamycin, everolimus, or the compounds of Chemical Formulas 1 to 4 and monitored for S6K phosphorylation. The mTOR mutations were R624H, Y1450D, C1483R, R1709H, Y1977K, S2215F, L2427P, and L2427Q.

Figure 14:
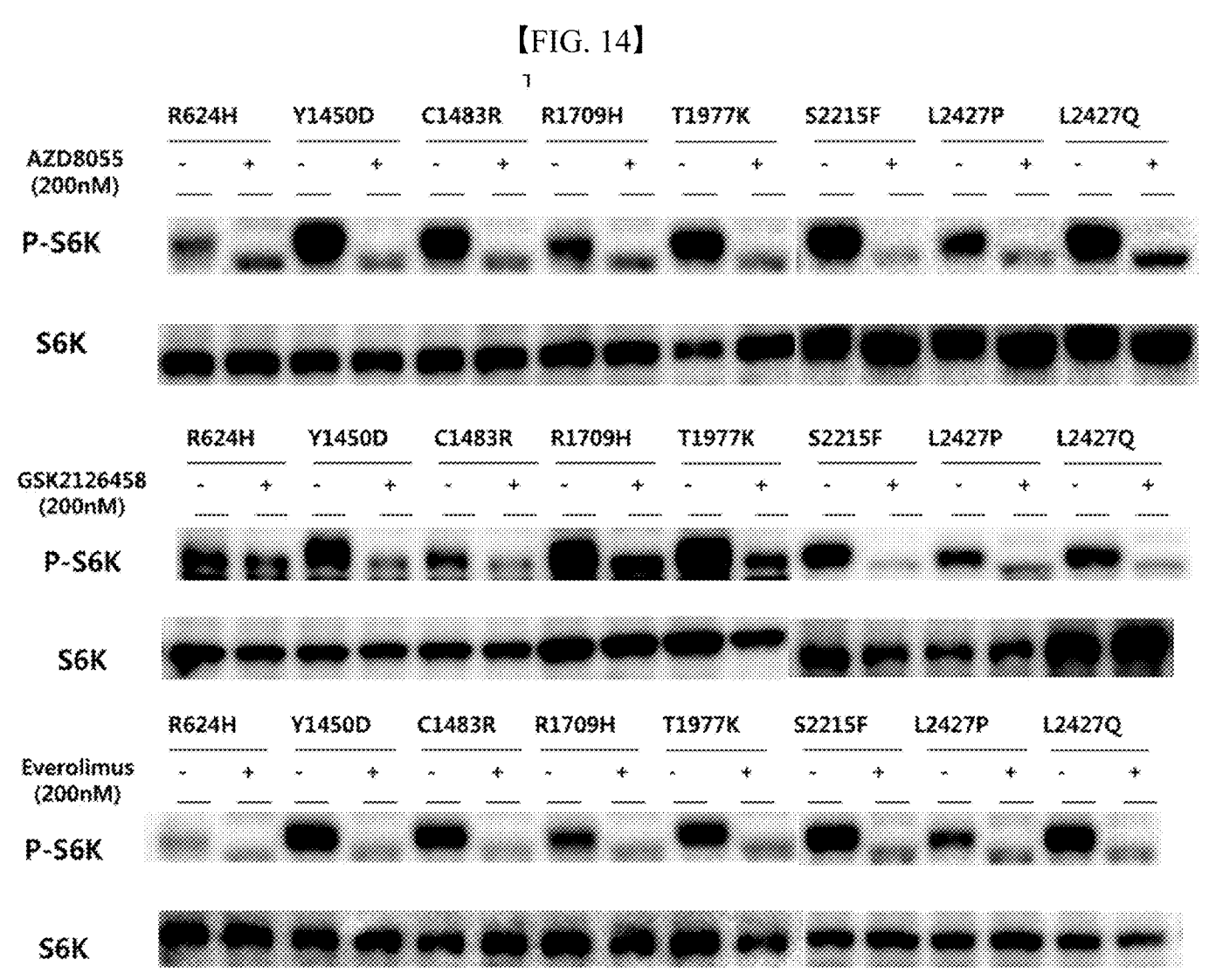

Briefly, the mutant mTOR-expressing cells were monitored for S6K phosphorylation level after treatment with everolimus or the compounds of Chemical Formulas 1 to 4. The results are depicted in FIGS. 13 and 14. As shown, the phosphorylation of S6K in all the mutant mTOR-expressing cells was inhibited by everolimus or the compounds of Chemical Formulas 1 to 4.

Example 4: mTOR Hyperactivation Induced by mTOR Mutation

Example 4-1: Immunostaining of Brain Tissue Section of FCD Patient

To determine whether the affected brains of FCDII patients carrying mutations are associated with mTOR hyperactivation, immunostaining was performed for S6 phosphorylation and NeuN (a neuronal marker) in brain tissue sections obtained from FCDII patients carrying the p.Leu2427Pro mutation.

Brain specimens that did not exhibit any malformations in cortical development (non-MCD) were collected in the operating room from the tumor-free margin of individual patients with glioblastoma as part of a planned resection, and were pathologically conformed to be normal brains without tumors. Surgical tissue blocks were fixed overnight in freshly prepared phosphate-buffered (PB) 4% paraformaldehyde, ciyoprotected overnight in 20% buffered sucrose, and prepared into gelatin-embedded tissues blocks (7.5% gelatin in 10% sucrose/PB) before storage at −80° C. Cryostat-cut sections (10 um thick) were collected, placed on glass slides, and blocked in PBS-GT (0.2% gelatin and 0.2% Triton X-100 in PBS) at room temperature for 1 hr before staining with the following antibodies: rabbit antibody to phosphorylated S6 ribosomal protein (Ser240/Ser244) (1:100 dilution; 5364, Cell signaling Technology), and mouse antibody to NeuN (1:100 dilution; MAB377, Millipore). Subsequently, samples were washed in PBS and stained with the following secondary antibodies: Alexa Fluor 555-conjugated goat antibody to mouse (1:200 dilution; A21422, Invitrogen) and Alexa Fluor 488-conjugated goat antibody to rabbit (1:200 dilution; A11008, Invitrogen). DAPI included in a mounting solution (P36931, Life technology) was used for nuclear staining. Images were acquired using a Leica DMI3000 B inverted microscope. Cells positive for NeuN were counted using a 10× objective lens; 4-5 fields were acquired per subject within neuron-rich regions, and 100 or more cells were scored per region. The number of DAPI-positive cells represents total cell counts. Neuronal cell sizes were measured in NeuN-positive cells using the automated counting protocol of ImageJ software (http://rsbweb.nih.gov/ij/).

As seen in FIG. 2c, the results showed a marked increase in the number of neuronal cells positive for phosphorylated S6 in FCDII patients (FCD4 and FCD6) carrying p.Leu2427Pro mutation, but not in non-FCD brains, as shown in FIG. 2d. In addition, the cell sizes of phosphorylated S6-positive neurons were measured, and a robust increase in the soma size in pathological samples was observed, as shown in FIG. 2e.

Example 4-2: Microdissection of S6 Phosphorylation-Increased, Cytomegalic Neurons in Brain Tissue of FCD Patient and Subsequent Sanger Sequencing Surgical tissue blocks were fixed overnight in freshly prepared phosphate-buffered (PB) 4% paraformaldehyde, cryoprotected overnight in 20% buffered sucrose, and prepared into gelatin-embedded tissue blocks (7.5% gelatin in 10% sucrose/PB) before storage at −80° C. Cryostat-cut sections (10 urn thick) were collected, placed on glass slides, and blocked in PBS-GT (0.2% gelatin and 0.2% Triton X-100 in PBS) at room temperature for 1 hr before staining with the following antibodies: rabbit antibody to phosphorylated S6 ribosomal protein (Ser240/Ser244) (1:100 dilution; 5364, Cell signaling Technology) and mouse antibody to NeuN (1:100 dilution; MAB377, Millipore). Subsequently, samples were washed in PBS and stained with the following secondary antibodies: Alexa Fluor 555-conjugated goat antibody to mouse (1:200 dilution; A21422, Invitrogen) and Alexa Fluor 488-conjugated goat antibody to rabbit (1:200 dilution; A11008, Invitrogen).

DAPI, included in a mounting solution (P36931, Life technology), was used for nuclear staining. After immunofluorescence staining, phosphorylated S6 immunoreactive neurons (n=about 20 per case) were microdissected with a PALM Laser capture system (Carl Zeiss, Germany) and collected in an adhesive cap (Carl Zeiss, Germany).

Thereafter, genomic DNA was extracted from the collected neurons using a QiAamp microkit (Qiagen, USA), and mutation regions (mTOR c.7280T>C) were amplified by PCR using the primers: sense 5'-CCCAGGCACTTGATGATACTC-3' (SEQ ID NO. 27) and antisense, 5'-CTTGCTTTGGGTGGAGAGTT-3' (SEQ ID NO. 28).

The PCR products thus obtained were purified with a MEGAquick spin total fragment purification kit (Intron, Korea), followed by Sanger sequencing with the aid of the BioDye Terminator and an automatic sequencer system (Applied Biosystems).

As shown in FIG. 10, moreover, the microdissection of cytomegalic neurons positive for phosphorylated S6 in the same pathological tissues showed the enrichment of the p.Leu2427Pro mutant allele in Sanger sequencing. These results suggest that the identified mTOR mutations are strongly associated with both the aberrant mTOR activation and the dysregulation of neuronal growth.

Example 5: Effect of mTOR Hyperactivation on Cerebral Development in Animal Model The recurrent mutation p.Leu2427Pro was selected for in vivo functional analysis. in utero electroporation of mTOR mutant constructs was performed to analyze the effect of the mTOR mutations on cortical radial neuronal migration and S6 phosphorylation in mice.

Example 5-1: Construction of Animal Model

Timed pregnant mice (E14) (Damul Science) were anesthetized with isoflurane (0.4 L/min of oxygen and isoflurane vaporizer gauge 3 during surgery).

The uterine horns were exposed, and a lateral ventricle of each embryo was injected using pulled glass capillaries with 2 μg/ml of Fast Green (F7252, Sigma, USA) combined with 2-3 μg of mTOR mutant plasmids, constructed in Example 3-1, carrying mTOR C1483Y, mTOR E2419K, and mTOR L2427P mutants. Plasmids were electroporated on the head of the embryo by discharging 50 V with the ECM830 eletroporator (BTX-Harvard apparatus) in five electric pulses of 100 ms at 900-ms intervals.

Example 5-2: Image Analysis of Mouse Model

Embryonic mice were electroporated at embryonic day 14 (E14). Then, their brains were harvested after 4 days of development (E18) and fixed overnight in freshly prepared phosphate-buffered (PB) 4% paraformaldehyde, ciyoprotected overnight in 30% buffered sucrose, and prepared into gelatin-embedded tissue blocks (7.5% gelatin in 10% sucrose/PB) before storage at −80° C.

Cryostat-cut sections (30 um thick) were collected and placed on glass slides. DAPI, included in a mounting solution (P36931, Life Technology) was used for nuclear staining. Images were acquired using a Leica DMI3000 B inverted microscope or a Zeiss LSM510 confocal microscope. Fluorescence intensities reflecting the distribution of electroporated cells within the cortex were converted into gray values and measured from the ventricular zone (VZ) to the cortical plate (CP, using ImageJ software (http://rsbweb.nih.gov/ij/). Mander's co-localization analysis was carried out using Fiji software (http://fiji.sc/wiki/index.php/Colocalization_Analysis).

Example 5-3: Experiment Result

As shown in FIG. 11a, mTOR wild-type or p.Leu2427Pro constructs containing an IRES-GFP reporter were electroporated into the developing mouse cortex at embryonic day (E) 14, and measured for cortical radial migration and the S6 phosphorylation of GFP-positive neurons at E18.

It was observed, as shown in FIG. 11b, that brain sections expressing the mTOR mutant construct showed a significant decrease in GFP-positive cells in the cortical plate (CP) and an increase in GFP-positive cells in the intermediate zone (IZ), the subventricular zone (SVZ), and the ventricular zone (VZ), thereby indicating the disruption of cortical radial neuronal migration.

In addition, as shown in FIG. 11c, mTOR mutant expressing GFP-positive cells were observed to coexist with cells having an elevated level of S6 phosphorylation in brain sections. These findings suggest that the identified mTOR mutations cause the aberrant activation of mTOR kinase protein and the disruption of proper cortical development in vivo.

Example 6: Identification of mTOR Hyperactivation-Induced Disease Phenotype in Animal Model

Example 6-1. Identification of Spontaneous Seizure and Abnormal Neurons in Animal Model A determination was made to see whether the focal cortical expression of mTOR induces spontaneous seizures in mice after in utero electroporation. Subsequent to in utero electroporation at E14, properly delivered mice pups at birth that showed GFP signals on the electroporated cortical region were selected, as shown in FIG. 3a.

Thereafter, continuous video-electroencephalographic monitoring of the mice was performed starting 3 weeks after birth. After weaning, the mice were monitored by video-recoding for 12 hrs per day until tonic-clonic seizures were observed. Then, mice with seizures were monitored using video-electroencephalography for 6 hrs per day over two days to characterize the spontaneous seizures with epileptic discharge.

Briefly, after weaning (>3 weeks), seizures were observed only through video monitoring. Thereafter, electrodes for recoding electroencephalograms were surgically implanted. A total of five electrodes were located in the epidural layer: based on the bregma, two electrodes on the frontal lobes (AP+2.8 mm, ML±1.5 mm), two electrodes on the temporal lobes (AP-2.4 mm, ML±2.4 mm), and one electrode on the cerebellum. After more than 4 days of recovery from surgery, EGG signals were recorded between 6 p.m. and 2 a.m. for 2-5 days (6 hrs per day). Signals were amplified with an amplifier (GRASS model 9 EEG/Polysomnograph, GRASS technologies, USA), and analyzed with the pCLAMP program (Molecular Devices, USA). Alternatively, a RHD2000 amplifier and board (Intan Technologies, USA) and MATLAB EEGLAB (http://sccn.ucsd.edu/eeglab) were used for analysis.

For EGG analysis, 10-12 h continuous recording data was analyzed for interictal spike and nonconvulsive electrographic seizure counts. 1-min samples were selected from the data at standardized preset time points separated by exactly 1 h.

Each 1-min sample was assessed for the number of interictal epileptiform spikes and nonconvulsive electrographic seizures therein by an observer who was unaware of the treatment of the mice. Interictal spikes were defined as fast (<200 ms) epileptiform wave forms that occurred regularly and were at least twice the amplitude of the background activity. Nonconvulsive electrographic seizure episodes were counted when the EEG recording showed at least two connected spike-wave complexes (1-4 Hz) with amplitudes as at least twice as background, and were observed simultaneously in the majority of the four recording channels per mouse.

Surprisingly, as shown in FIGS. 3b and 12a, more than 90% of the mice expressing mTOR mutant constructs displayed spontaneous seizures with epileptic discharge, including high-voltage fast activity, high-voltage spikes and waves, and low-voltage fast activity. These mutant mice also showed interictal spikes and electrographic seizures (FIG. 12b). The mice in which spontaneous seizures were induced were observed to exhibit systemic tonic-clonic seizures consisting of a tonic phase, a clonic phase, and a postictal phase, similar to those found in FCDII patients. Further, brain waves are characterized by synchronized multi-waves of low-voltage, fast activity in the tonic phase, high-voltage standing waves in the clonic phase, and synchronized attenuated amplitudes in the postictal phase. However, neither spontaneous seizures with epileptic discharges nor electrographic seizure were observed in control mice electroporated with the mTOR wild-type construct, as shown in FIG. 3b.

The average seizure onset of p.Leu2427Pro mice started on average roughly 6 weeks after birth (FIG. 12e), which is approximately equivalent to that of human FCDII patients (~4 years). The seizure frequency was about 6 events per day (FIG. 3c).

After the confirmation of seizures, investigation was made to see whether the mice electroporated with mTOR mutant constructs showed abnormal neuronal morphology, such as cytomegalic neurons.

It was observed that the soma sizes of GFP-positive neurons were greatly increased in affected cortical regions of electroporated mice carrying mTOR mutations (FIG. 3d).

Example 6-2. Effect of Drug on Spontaneous Seizure and Abnormal Neuron

Animal models with spontaneous seizures or abnormal neurons were monitored after administration with rapamycin.

Briefly, rapamycin or everolimus (LC Labs, USA) was dissolved in 100% ethanol to give a 20 mg/ml stock solution and stored at −20° C. Immediately before injection, the stock solution was diluted in 5% polyethyleneglycol 400 and 5% Tween80 to yield final concentrations of 1 mg/ml rapamycin and 4% ethanol. Mice were injected with 1 to 10 mg/kg rapamycin for 2 weeks (10 mg/kg/d intraperitoneal injection, two weeks).

Rapamycin, as shown in FIGS. 3c, 12c and 12d, almost completely freed the mTOR mutant construct-carrying mice from spontaneous seizures, with a simultaneous dramatic decrease in the onset frequency of interictal spikes and nonconvulsive electrographic seizure.

Also, abnormal soma sizes of neurons were reduced in the animal model administered with rapamycin, as shown in FIG. 3d.

Example 7: Identification of Mutation in Intractable Epilepsy Patient by Sequencing Genomic DNA was extracted in substantially the same manner as that of Example 2 from samples from a total of 77 patients, listed in Examples 1 and 2, and subjected to hybrid capture sequencing and PCR-based amplicon sequencing. Of mutations found in both the sequencing analyses, those that met the selection standards (a total read depth of 100 or more, 3 or more mutated calls, and a mapping quality score of 30 or more) were detected in TSC1, TSC2, AKT3, and PIK3CA.

TSC1 c.64C>T (p.Arg22Trp), c.610C>T (p.Arg204Cys), c.2432G>T (p.Arg811Leu); TSC2 c.4639C>T (p.Val1547Ile); AKT3 c.740G>A (p.Arg247His), PIK3CA c.3052G>A (p.Asp1018Asn).

In eight of 51 patients negative for mTOR mutations, TSC1, TSC2, AKT3, and PIK3CA gene mutations were detected only in affected brain regions. Accordingly, 21 of a total of 77 intractable epilepsy patients were found to have mutations only in affected brain regions.

mTOR c.616C>T (p.Arg206Cys) mTOR c.1871G>A (p.Arg624His), c. 4348T>G (p.Tyr1450Asp), c.4447T>C (p.Cys1483Arg), c.5126G>A (p.Arg1709His), c.5930C>A (p.Thr1977Lys), c.6577C>T (p.Arg2193Cys), c.6644C>T (p.Ser2215Phe), and c.7280T>A (p.Leu2427Gln); TSC1 c.64C>T (p.Arg22Trp), c.610C>T (p.Arg204Cys), c.2432G>T (p.Arg811Leu); TSC2 c.4639C>T (p.Val1547Ile); AKT3 c.740G>A (p.Arg247His), PIK3CA c.3052G>A (p.Asp1018Asn).

TABLE 5

| Disease/gender | Age at surgery | phathology | MRI result | protein | Modified nucleotide | Modified Amino acid | Hybrid Capture % Mutated allele | PCR amplicon sequencing % Mutated allele |
|---|---|---|---|---|---|---|---|---|
| FCD 4/female | 5 yr 2 m | Cortical dyslamination, Dysmorphic neurons, consistent with FCDIIa | No abnormal signal intensity | MTOR | c.7280T > C | p.Leu2427Pro | 7.94% | 12.6% |
| FCD 6/female | 5 yr | Cortical dyslamination, Dysmorphic neurons, consistent with FCDIIa | No abnormal signal intensity | MTOR | c.7280T > C | p.Leu2427Pro | 6.90% | 7.28% |
| FCD 64/female | 6 yr 9 m | Cortical dyslamination, Dysmorphic neurons, consistent with FCDIIa | Cortical dysplasia involving left fronto-parietal lobe | TSC1 | c.610C > T | p.Arg204Cys | 1.75% | 1.0% |
| HME 66/male | 2 yr 8 m | Cortical laminar disturbance with large giant neurons | Rt. hemimegalencephDaly | PIK3CA | c.3052G > A | p.Asp1018Asn | 1.03% | 2.30% |
| SWS 77/male | 11 m | Cortical dyslamination, Dysmorphic neurons, consistent with FCDIIa | Difuse brain atrophy, Right hemisphere | MTOR | c.616C > T | p.Arg206Cys | 3.93% | 3.45% |
| FCD 81/female | 12 yr | Cortical dyslamination, Dysmorphic neurons, consistent with FCDIIa | No abnormal signal intensity | TSC1 | c.64C > T | p.Arg22Trp | 2.81% | 2.0% |
| HS86/male | 13 yr 2 m | Hippocampal sclerosis | Suggestive of HS, left. | AKT3 | c.740G > A | p.Arg247His | 1.72% | 10% |
| FCD 91/female | 7 yr 1 m | Cortical dyslamination, Dysmorphic neurons, consistent with FCDIIa | Volume decrease of the left cerebral hemisphere and multifocal lesions in the WM | MTOR | c.6577C > T | p.Arg2193Cys | 2.99% | 1.26% |
| FCD 94/female | 10 yr 3 m | Cortical dyslamination, Dysmorphic neurons, consistent with FCDIIa | Subependymal heterotopia, Rt peri-trigone area | TSC2 | c.4639C > T | p.Val1547Ile | 1.19% | 1.55% |
| FCD 98/male | 14 yr 3 m | Cortical dyslamination, Dysmorphic neurons, consistent with FCDIIa | No abnormal signal intensity | TSC1 | c.64C > T | p.Arg22Trp | 2.52% | 1.98% |
| FCD 104/male | 1 yr 2 m | Cortical dyslamination, Dysmorphic neurons, consistent with FCDIIa | Cortical dysplasia involving right precentral and postcentral gyri, | MTOR | c.1871G > A | p.Arg624His | 1.80% | 4.41% |
| FCD 105/male | 3 yr 7 m | Cortical dyslamination, Dysmorphic neurons, consistent with FCDIIa | No abnormal signal intensity | MTOR | c.5126G > A | p.Arg1709His | 1.63% | 1.52% |
| FCD 107/female | 7 yr 3 m | Cortical dyslamination, dysmorphic neurons, balloon cells, consistent with FCDIIb | Cortical Dysplasia involving left occipitoparietal lobe and precentral gyrus | MTOR | c.6644C > T | p.Ser2215Phe | 2.41% | 2.11% |
| FCD 113/female | 10 yr | Cortical dyslamination, dysmorphic neurons, balloon cells, consistent with FCDIIb | Cortical dysplasia involving left occipital and parietal lobe | MTOR | c.7280T > A | pLeu2427Gln | 3.05% | 5.11% |
| FCD 116/male | 7 yr 9 m | Cortical dyslamination, dysmorphic neurons, balloon cells, consistent with FCDIIb | Cortical dysplasia involving left superior frontal gyrus | MTOR | c.5930C > A | p.Thr1977Lys | 3.25% | 2.93% |
| FCD 121/male | 11 m | Cortical dyslamination, dysmorphic neurons, balloon cells, consistent with FCDIIb | Cortical dysplasia involving entire right lobe and left superior/middle frontal gyrus | MTOR | c.4348T > G | p.Tyr1450Asp | 2.64% | 3.76% |
| FCD 123/female | 12 yr 4 m | Cortical dyslamination, dysmorphic neurons, balloon cells, consistent with FCDIIb | Cortical Dysplasia involving right frontal lobe | TSC1 | c.64C > T | p.Arg22Trp | 2.21% | 1.37% |
| FCD 128/female | 4 yr 4 m | Cortical dyslamination, dysmorphic neurons, balloon cells, consistent with FCDIIb | Cortical dysplasia, right frontal lobe | MTOR | c.4447T > C | p.Cys1483Arg | 6.38% | 9.77% |
| HME141female | 1 yr 9 m | Cortical laminar disturbance with large giant neurons | Lt. hemimegalencephaly | TSC1 | c.2432G > T | p.Arg811Leu | 1.03% | 1.68% |
| FCD 143/female | 2 yr 10 m | Cortical dyslamination, dysmorphic neurons, balloon cells, consistent with FCDIIb | No abnormal signal intensity | MTOR | c.6644C > T | p.Ser2215Phe | 2.82% | 2.33% |

TABLE 5-continued

| Disease/gender | Age at surgery | phathology | MRI result | Modified protein | Modified nucleotide | Modified Amino acid | Hybrid Capture % Mutated allele | PCR amplicon sequencing % Mutated allele |
|---|---|---|---|---|---|---|---|---|
| FCD 145/female | 4 yr 1 m | Cortical dyslamination, dysmorphic neurons, balloon cells, consistent with FCDIIb | Cortical dysplasia involving left precentral gyrus | MTOR | c.5930C > A | p.Thr1977Lys | 1.46% | 1.51% |

Example 8: In Vivo Analysis of mTOR Hyperactivation

8-1. Mutagenesis and Construction of TSC1, TSC2, and AKT3 Mutant Constructs pcDNA3 carrying HA-tagged wild-type TSC1, TSC2 or AKT3 (pcDNA3 HA-tagged wild-type TSC1, TSC2, AKT3 construct) was purchased from Addgene (USA). The construct was used to generate mutant vectors with a QuikChange II site-directed mutagenesis kit (200523, Stratagene, USA).

pcDNA3 carrying HA-tagged wild-type TSC1, TSC2 or AKT3 (pcDNA3 HA-tagged wild-type TSC1, TSC2, AKT3 construct) was purchased from Addgene (USA). In the pcDNA3 TSC1, TSC2, AKT3 wild-type vector, the mutagenesis of TSC-1 R22W and R204C was achieved by use of TSC-1 R22W-F and R22W-R primers for R22W mutagenesis and by use of TSC-1 R204C-F and R204C-R primers for R204C mutagenesis. TSC-2 V1547I-F and V1547I-R primers were used for TSC-2 V15471 mutagenesis in the pcDNA3 TSC2 wild-type vector. For the mutagenesis of AKT3 R247H in the pcDNA3 AKT3 wild-type vector, R247H-F and R247H-R primer were designed.

A QuikChange II site-directed mutagenesis kit (200523, Stratagene, USA) was used to create point mutations. Because each primer has a site-specific point mutation sequence, a mutation is induced in copies of the sequence upon PCR Primers useful for the mutagenesis are listed in Table 6, below.

mented with 10% FBS at 37° C. and 5% $CO_2$. The cells were transfected with empty flag-tagged vector, HA-tagged TSC1 wild-type, HA-tagged TSC2 wild-type, HA-tagged AKT3 wild-type, HA-tagged TSC1 mutant, HA-tagged TSC2 mutant and HA-tagged AKT3 mutant, respectively, using jetPRIME transfection reagent (Polyplus, France).

The cells were serum-starved with 0.1% FBS in DMEM for 24 hours after transfection and then incubated at 37° C. and 5% $CO_2$ in PBS containing 1 mM $MgCl_2$ and $CaCl_2$ for 1 hour. The cells were lysed with PBS containing 1% Triton X-100 and Halt protease and phosphatase inhibitor cocktail (78440, Thermo Scientific, USA). Proteins were resolved by SDS-PAGE and transferred to PVDF membranes (Millipore, USA). The membranes were blocked with 3% BSA in TBS containing 0.1% Tween 20 (TBST). They were washed 4 times with TBST. The membranes were incubated overnight with primary antibodies including a 1/1000 dilution of anti-phospho-S6 ribosomal protein (5364, Cell Signaling Technology, USA), anti-56 ribosomal protein (2217, Cell Signaling Technology, USA), and anti-flag M2 (8164, Cell Signaling Technology, USA) in TBST at 4° C., respectively. After incubation, the membranes were washed 4 times with TBST. They were incubated with a 1/5000 dilution of HRP-linked anti-rabbit or anti-mouse secondary antibodies (7074, Cell Signaling Technology, USA) for 2 hours at room temperature. After washing with TBST, immunodetection was performed using ECL reaction reagents.

TABLE 6

| gene | Location n of Modification | | Primer | SEQ ID NO |
|---|---|---|---|---|
| TSC-1 | C64T | R22W | TSC-1 R22W-F gtcacgtcgtcccacacacccagcatg | 29 |
| | | | TSC-1 R22W-R catgctgggtgtgtgggacgacgtgac | 30 |
| | C610T | R204C | TSC-1 R204C-F ctttcatactgtaatgagaacacaaaaaggagacgaagttgca | 31 |
| | | | TSC-1 R204C-R tgcaacttcgtctcctttttgtgttctcattacagtatgaaag | 32 |
| TSC-2 | G4639A | V1547I | TSC-2 V15471-F tctccaacatacaggatggcgatcttgtgggtg | 33 |
| | | | TSC-2 V15471-R cacccacaagatcgccatcctgtatgttggaga | 34 |
| AKT3 | G740A | R247H | AKT3 R247H-F caccatagaaacgtgtgtggtcctcagagaacacc | 35 |
| | | | AKT3 R247H-R ggtgttctctgaggaccacacacgtttctatggtg | 36 |

8-2. Cell Culture, Transfection, and Western Blot

In order to examine whether TSC-1, TSC-2 or AKT3 mutation causes the aberrant activation of mTOR, wild-type or mutant vectors were transfected into HEK293T and the phosphorylation of SK6, widely known as an mTOR gene marker, was analyzed by Western blotting.

Briefly, HEK293T cells (Thermo Scientific) were cultured in DMEM (Dulbecco's Modified Eagle's Medium) supple-

8-3. Treatment of Mutant-Expressing Cells with Rapamycin and Western Blot

After treatment with rapamycin, the mutant-expressing cells of Example 8-2 were monitored for S6K phosphorylation.

Briefly, HEK293T cells were transfected with mTOR, TSC1, TSC2, or AKT3 mutants in the same manner as in Example 8-2. The transfected cells were starved for 24 hrs with empty DMEM and incubated at 37° C. and 5% $CO_2$ for 1 hr with rapamycin in PBS containing 1 mM $MgCl_2$ and $CaCl_2$, followed by Western blotting in the same manner as in Example 2-2.

8-4. Experiment Data

In order to examine whether the p.Arg22Trp and p.Arg204Cys mutations of TSC-1, the p.Val1547Ile mutation of TSC-2, or the p.Arg247His mutation of AKT3 induces mTOR activation, HEK293T cells were transfected with vectors carrying TSC1, TSC2, and AKT3 wild-type and mutants, and S6K phosphorylation, a well-known index for mTOR mutation, was monitored via Western blotting. The mutant-expressing cells were treated with rapamycin before monitoring the phosphorylation of S6K, as described in Examples 8-2 and 8-3. The results are depicted in FIGS. 15 to 17, and can be described for individual mutant genes) as follows:

(1) In Vitro Activity of TSC-1 Mutant

As can be seen in FIG. 15, S6K phosphorylation was increased in cells expressing mutant TSC-1, and reduced by rapamycin treatment.

(2) In Vitro Activity of TSC-2 Mutant

As can be seen in FIG. 16, S6K phosphorylation was increased in cells expressing mutant TSC-2, and reduced by rapamycin treatment.

(3) In Vitro Activity of AKT3 Mutant

As can be seen in FIG. 17, S6K phosphorylation was increased in cells expressing mutant AKT3, and reduced by rapamycin treatment.

Example 9: Activation of mTOR Pathway by TSC1 and TSC2 Mutants 9-1: Immunoprecipitation Assay To examine whether mutations in TSC1 and TSC2 disrupt the formation of the TSC complex, immunoprecipitation assays were conducted on wild-type and mutant TSC1 or TSC2-expressing HEK293T cells. In this regard, TSC1 and TSC2 mutant proteins prepared in the same manner as in Example 8-3 were incubated overnight with an anti-TSC2 antibody (3990, Cell signaling Technology, USA) or an anti-myc antibody (2276, cell signaling technology, USA), and then with protein A+G magnetic beads for 2 hrs. After washing with PBS containing 1% Triton-X100, the beads were incubated in an SDS buffer at 37° C. for 10 min. After being eluted, proteins were resolved on SDS/PAGE gel and transferred to a PVDF membrane. Immunoblotting was performed in the same manner as in Example 2-3.

The results are depicted in FIG. 18. It was found that the TSC-1 p.Arg22Trp and p.Arg204Cys mutations located near the TSC2 binding domain strongly inhibited TSC1 binding to TSC2. These data imply that the TSC1 mutant disrupted the formation of the TSC complex, leading to the hyperactivation of mTOR kinase.

9-2: GTP-Agarose Pull Down Assay

Cells were harvested in a lysis buffer (20 mM Tris-HCl pH: 7.5, 5 mM $MgCl_2$, 2 mM PMSF, 20 μg/mL leupeptin, 10 μg/mL aprotinin, 150 mM NaCl and 0.1% Triton X-100) and then lysed by sonication for 15 sec. The cell lysates were centrifuged at 4° C. and 13,000 g. The supernatant was separated and incubated with 100 μl of GTP-agarose beads (Sigma-Aldrich, cat no. G9768) at 4° C. for 30 min. The beads were washed with a lysis buffer and again incubated overnight with the supernatant. GTP-bound proteins were extracted and visualized by immunoblots.

The expression of GTP-bound Rheb protein was found to decrease in wild-type TSC2-expressing cells, but not in TSC2 p.Val1547Ile mutant-expressing cells because the GAP (GTPase activating protein) activity of TSC2 was decreased (FIG. 19(참고 2 FIG. 2)), suggesting that the TSC2 mutant reduces the function of the GAP domain, thereby activating the mTOR pathway.

Example 10: Monitoring of S6K Phosphorylation Level in Drug-Treated, Mutant mTOR-Expressing Cells 10-1. Mutant mTOR-Expressing Cell Mutant mTOR-expressing cells were treated with drugs (rapamycin, everolimus, compounds of Chemical Formulas 1 to 4) and monitored for S6K phosphorylation level.

In this regard, HEK293T cells were transfected with the mutants in the same manners as in Examples 8-2 and 8-3, serum-starved for 24 hrs with 01.% FBS in DMEM, and incubated at 37° C. and 5% $CO_2$ for 1 hr with 1 mM $MgCl_2$ and $CaCl_2$ in PBS before treatment with rapamycin, everolimus, or the compounds of Chemical Formulas 1 to 4 (Torin1, INK128, AZD8055, GSK2126458): Torin was purchased from TOCRIS; INK128, AZD8055 and GSK2126458 were from Selleckchem; and everolimus was from LC laboratory. Subsequently, Western blotting was performed in the same manner as in Example 2-4.

As is understood from the data of FIGS. 20 and 21, S6K phosphorylation was inhibited in mutant mTOR-expressing cells. Briefly, FIG. 20 shows levels of S6K phosphorylation in cells respectively expressing the mOTR mutants C1483R, L2427P and L2427Q after rapamycin treatment. FIG. 21 shows levels of S6K phosphorylation in mTOR mutation Y1450D-expressing cells after rapamycin treatment.

FIG. 22 shows levels of S6 in mTOR mutation L2427P-expressing cells after treatment with 0, 25, 50, 100, and 200 nM of rapamycin.

S6K phosphorylation was monitored following treatment with everolimus, or the compounds of Chemical Formulas 1 to 4. As can be seen in FIG. 22, the phosphorylation of S6 in mutant mTOR-expressing cells was inhibited by everolimus or the compounds of Chemical Formulas 1 to 4. A distinct decrease in S6 phosphorylation was apparent at a concentration of 50 nM or higher.

Example 10-2. Change of S6K Phosphorylation with Various mTOR Inhibitors

Cells expressing various mTOR mutations were treated in the same manner as in Example 9-1 with rapamycin, everolimus, or the compounds of Chemical Formulas 1 to 4, and monitored for S6K phosphorylation. The mTOR variants were R624H, Y1450D, C1483R, R1709H, Y1977K, S2215F, L2427P, and L2427Q.

Briefly, the mutant mTOR-expressing cells were monitored for S6K phosphorylation level after treatment with everolimus or the compounds of Chemical Formulas 1 to 4. The results are depicted in FIGS. 23a and 23b. As shown, the phosphorylation of S6K in all the mutant mTOR-expressing cells was inhibited by everolimus or the compounds of Chemical Formulas 1 to 4.

Example 11: Monitoring of S6K Phosphorylation in TSC1 or TSC2 Mutant-Expressing Cells Treated with Drugs HEK293T cells were transfected with TSC1 or TSC2 mutants in the same manner as in Example 8, serum-starved for 24 hrs with 01.% FBS in DMEM, and incubated at 37° C. and 5% $CO_2$ for 1 hr with 1 mM $MgCl_2$ and $CaCl_2$ in PBS.

Thereafter, the cells were treated with rapamycin, everolimus, or the compounds of Chemical Formulas 1 to 4 (Torinl, INK128, AZD8055, GSK2126458): Torin was purchased from Tocris; INK128, AZD8055 and GSK2126458 were from Selleckchem; and everolimus was from LC laboratory. Subsequently, Western blotting was performed in the same manner as in Example 10.

The TSC1 or TSC2 mutant-expressing cells were treated with rapamycin and monitored for S6K phosphorylation. The results are depicted in FIGS. 24a and 24b for the TSC1 mutant and in FIGS. 25a and 25b for the TSC2 mutant.

As is understood from the data of FIGS. 24a, 24b, 25a and 25b, S6K phosphorylation in TSC1 or TSC2 mutant-expressing cells was inhibited by rapamycin. Also, S6K phosphorylation was monitored in the TSC1 or TSC2-expressing cells following treatment with everolimus or the compounds of Chemical Formulas 1 to 4. As can be seen, everolimus or compounds of Chemical Formulas 1 to 4 was found to inhibit the phosphorylation of S6K in TSC1 or TSC2 mutant-expressing cells.

Example 12: Immunostaining of Brain Tissue Section of FCD Patient

To determine whether the affected brains of FCDII patients carrying mutations are associated with mTOR hyperactivation, immunostaining was performed for S6 phosphorylation and NeuN (a neuronal marker) in brain tissue sections obtained from FCD patients carrying the p.Leu2427Pro mutation.

Non-malformations of cortical development (non-MCD) brain specimens were collected in the operating room from the tumor-free margin of individual patients with glioblastoma as part of a planned resection, which was pathologically conformed as a normal brain without tumors. Surgical tissue blocks were fixed overnight in freshly prepared phosphate-buffered (PB) 4% paraformaldehyde, cryoprotected overnight in 20% buffered sucrose, and prepared into gelatin-embedded tissues blocks (7.5% gelatin in 10% sucrose/PB) before storage at −80° C. Cryostat-cut sections (10 um thick) were collected and placed on glass slides. FFPE slides were deparaffinized and rehydrated to remove paraffin. Then, a heat-induced retrieval process was performed on the deparaffinized FFPE slides using a citrate buffer to enhance the staining intensity of the antibodies. The slides were then blocked in PBS-GT (0.2% gelatin and 0.2% Triton X-100 in PBS) at room temperature for 1 hr before staining with the following antibodies: rabbit antibody to phosphorylated S6 ribosomal protein (Ser240/Ser244) (1:100 dilution; 5364, Cell signaling Technology) and mouse antibody to NeuN (1:100 dilution; MAB377, Millipore). Subsequently, samples were washed in PBS and stained with the following secondary antibodies: Alexa Fluor 555-conjugated goat antibody to mouse (1:200 dilution; A21422, Invitrogen) and Alexa Fluor 488-conjugated goat antibody to rabbit (1:200 dilution; A11008, Invitrogen).

DAPI, included in a mounting solution (P36931, Life technology, was used for nuclear staining. Images were acquired using a Leica DMI3000 B inverted microscope. Cells positive for NeuN were counted using a 10× objective lens; 4-5 fields were acquired per subject within neuron-rich regions, and 100 or more cells were scored per region. The number of DAPI-positive cells represents total cell counts. Neuronal cell sizes were measured in NeuN-positive cells using the automated counting protocol of ImageJ software (http://rsbweb.nih.gov/ij/). The experimental results are given in FIGS. 26a to 26f.

As seen in FIGS. 2a to 26f, the results showed a marked increase in the number of neuronal cells positive for phosphorylated S6 in FCD patients #64, 81, 94, 98, and 128 carrying TSC1 or TSC2 mutations, but not in non-FCD brains. In addition, the results revealed a robust increase in the number of neuronal cells that were positive for phosphorylated S6 in patients carrying TSC1 and TSC2 mutations compared with non-FCD brains, as shown in FIGS. 26b and 26d, and in the soma size of phosphorylated S6-positive neurons in the pathological samples, as shown in FIGS. 26e and 26f.

Example 13: Construction of TSC1 or TSC2 Mouse Model

13-1: Construction of TSC1- or TSC2-Targeting CRISPR/Cas9 Vector

A commercially available pX330 plasmid (Addgene, #42230) was used as an initial template. Using a QuikChange site-directed mutagenesis kit (Stratagene, La Jolla, CA), the sgRNA (single guide ribonucleotide) cloning site was modified to change the restriction enzyme recognition site BbsI (GAAGAC) to BsaI (GGTCTC). Subsequently, sgRNAs, targeting respective TSC1 and TSC2 genes, was inserted, the sequences of which are as follows.

```
TSC1:
                              (SEQ ID NO. 37)
5'-TGCTGGACTCCTCCACACTG-3'

TSC2:
                              (SEQ ID NO. 38)
5'-AATCCCAGGTGTGCAGAAGG-3'
```

To generate a plasmid carrying an mCheny fluorescent reporter (U6-sgRNA-Cas9-IRES-mCherry), IRES-mCherry was amplified PCR with the IRES3-mCherry-CL plasmid serving as a template. After PCR amplification, the IRES-mCheny was inserted between the Cas9 sequence and the NLS of px330.

Example 13-2. Construction of Mouse Model

First, the TSC1- or TSC2-targeting U6-sgRNA-Cas9-IRES-mCheny plasmid, prepared in Example 19-1, was diluted at a ratio of 3:1 with pCAG-Dsred (Addgene #11151) to enhance red signals. Timed pregnant mice (E14) (Damul Science) were anesthetized with isoflurane (0.4 L/min of oxygen and isoflurane vaporizer gauge 3 during surgery operation). The uterine horns were exposed, and the lateral ventricle of each embryo was injected using pulled glass capillaries with 2 μg/ml of Fast Green (F7252, Sigma, USA) combined with 2-3 μg of the mixture of the two plasmids. Plasmids were electroporated on the head of the embryo by discharging 50 V with the ECM830 eletroporator (BTX-Harvard apparatus) in five electric pulses of 100 ms at 900-ms intervals. After delivery, selection was made of the mouse pups that exhibited fluorescence, screened using a flashlight (Electron Microscopy Science, USA).

13-3: Assay for Neuronal Migration in TSC1 or TSC2 Mouse Model

Brains were harvested from adult mice (P>56) prepared in Example 13-2, fixed overnight in freshly prepared phosphate-buffered (PB) 4% paraformaldehyde, cryoprotected overnight in 30% buffered sucrose, and prepared into gelatin-embedded tissue blocks (7.5% gelatin in 10% sucrose/PB) before storage at −80° C.

Cryostat-cut sections (30 urn thick) were collected and placed on glass slides. DAPI, included in a mounting solution (P36931, Life technology), was used for nuclear staining. Images were acquired using a Zeiss LSM780 confocal microscope. Fluorescence intensities, reflecting the distribution of electroporated cells within the cortex, were converted into gray values and measured from layer II/III to layer V/VI using ImageJ software (http://rsbweb.nih.gov/ij/).

As can be seen in FIGS. 27a and 27b, dsRed-positive neurons in brain tissue sections of the TSC mouse models were decreased in the cortical layer II/III and increased in the layer II and layer V/VI, indicating that the radial migration of cortical neurons was prevented.

13-4: Video-Electroencephalography Monitoring

After weaning (>3 weeks), the mice were observed for seizures through video monitoring. Thereafter, electrodes for recoding electroencephalograms were surgically implanted. A total of five electrodes were located in the epidural layer: based on the bregma, two electrodes on the frontal lobes (AP+2.8 mm, ML±1.5 mm), two electrodes on the temporal lobes (AP-2.4 mm, ML±2.4 mm), and one electrode on the cerebellum. After 4 days of recovery from surgery, EGG signals were recorded for 6 hrs per day between 6 p.m. and 2 a.m. over 2-5 days. Signals were amplified using an RHD2000 amplifier and board (Intan Technologies, USA) and analyzed using MATLAB EEGLAB (http://sccn.ucsd.edu/eeglab).

The mice whose brains exhibited local TSC1- or TSC2-knockout resulting from use of the CRISPR/Cas9 plasmid displayed spontaneous seizures with epileptic discharges, including high-voltage fast activity, high-voltage spikes and waves, and low-voltage fast activity. The mice in which spontaneous seizures were induced were observed to exhibit systemic tonic-clonic seizures consisting of a tonic phase, a clonic phase, and a postictal phase, similar to those found in FCDII patients. Further, brain waves are characterized by synchronized multi-waves of low-voltage, fast activity in the tonic phase, high-voltage standing waves in the clonic phase, and synchronized attenuated amplitudes in the postictal phase. The seizure frequency was about 10 events per day.

13-5: Soma Size of Neurons in TSC1 or TSC2 Mouse Model

After EGG monitoring, the brains of the mice were excised by perfusion fixation using a phosphate-buffered (PB) 4% paraformaldehyde solution with the aid of a Masterflex compact peristaltic pump (Cole-Parmer international, USA). The brains were fixed in a freshly prepared phosphate-buffered (PB) 4% paraformaldehyde solution, ciyoprotected overnight in 30% buffered sucrose, and prepared into gelatin-embedded tissue blocks (7.5% gelatin in 10% sucrose/PB) before storage at −80° C. Cryostat-cut sections (30 um thick) were collected, placed on glass slides, and blocked in PBS-GT (0.2% gelatin and 0.2% Triton X-100 in PBS) at room temperature for 1 hr before staining with the following antibodies: mouse antibody to NeuN (1:500 dilution; MAB377, Millipore). Subsequently, samples were washed in PBS and stained with the following secondary antibody: Alexa Fluor 488-conjugated goat antibody to mouse (1:200 dilution; A11008, Invitrogen). DAPI included in a mounting solution (P36931, Life technology) was used for nuclear staining. Images were acquired using a Zeiss LSM780 confocal microscope. Neuronal cell sizes were measured using ImageJ software (http://rsbweb.nih.gov/ij/).

Neurons were found to significantly increase in soma size for the mice with the local TSC1- or TSC2-knockout by use of the CRISPR/Cas9 plasmid, compared to normal neurons, but remained unchanged in size for the mice into which the plasmid was electroporated without sgRNA, which was consistent with the dysmorphic neurons of patients with Malformations of Cortical Developments.

Example 14: Effect of Drug on Spontaneous Seizure in TSC2 Mouse Model

The animal models exhibiting spontaneous seizures were monitored after administration with rapamycin. Briefly, rapamycin (LC Labs, USA) was dissolved in 100% ethanol to give a 20 mg/ml stock solution, and stored at −20° C. Immediately before injection, the stock solution was diluted in 5% polyethyleneglycol 400 and 5% Tween80 to final concentrations of 1 mg/ml rapamycin and 4% ethanol. Mice were injected with 1 to 10 mg/kg rapamycin for 2 weeks (10 mg/kg/d intraperitoneal injection).

Rapamycin, as shown in FIG. 28, almost completely freed the animal models from spontaneous seizures.

What is claimed is:

1. A method for treating Focal Cortical Dysplasia (FCD) type II in a subject, comprising administering to the subject an effective amount of an mTOR inhibitor, wherein the subject has a brain somatic mutation in mTOR, TSC1, TSC2, AKT3, or PIK3CA, wherein the mTOR inhibitor is Rapamycin, 3-[2,4-bis [(3S)-3methylmorpholin-4-yl]pyrido[2,3-d]pyrimidin-7-yl]-N-methylbenzamide (AZD2014), 2methyl-2-[4-(3-methyl-2-oxo-8-quinolin-3-ylimidazo[4,5-c] quinolin-1yl]phenyl]propanenitrile (BEZ235), (Z)-but-2-enedioic acid; 8-(6-methoxypyridin-3-yl)-3methyl-1-[4-piperazin-1-yl-3-(trifluoromethyl)phenyl]imidazo [4,5-c]quinolin-2-one (BGT226), Everolimus, 5-ethyl-3-[2-methyl-6-(1H-1,2,4-triazol-5-yl)pyridin-3yl]-7,8-dihydropyrazino[2,3-b]pyrazin-6-one (CC-115), 3-[6-(2-hydroxypropan-2 yl)pyridin-3-yl]-5-(4-methoxycyclohexyl)-7,8-dihydropyrazino[2,3-b] pyrazin-6-one (CC223), 8-[5-(2-hydroxypropan-2-yl) pyridin-3-yl]-1-[(2S)-2-methoxypropyl]-3methylimidazo[4,5-c]quinolin-2-one (LY3023414), P7170, 1-{(2R)-4-[2-(2Aminopyrimidin-5-yl)-6-(morpholin-4-yl)-9-(2,2,2-trifluoroethyl)-9H-purin-8-yl]-2 methylpiperazin-1-yl}ethan-1-one (DS-7423), (4-[(5Z)-4-amino-5-(7-methoxyindol-2 ylidene)-1H-imidazo[5,1-f][1,2,4]triazin-7-yl]cyclohexane-1-carboxylic acid) (OSI-027), 2-amino-8-[4-(2-hydroxyethoxy) cyclohexyl]-6-(6-methoxypyridin-3-yl)-4methylpyrido [2,3-d]pyrimidin-7-one (PF-04691502), 1-[4-[4-(dimethylamino)piperidine-1carbonyl]phenyl]-3-[4-(4, 6-dimorpholin-4-yl-1,3,5-triazin-2-yl)phenyl]urea (PF-05212384), Temsirolimus, [6-(2-amino-1,3-benzoxazol-5-yl)imidazo [1,2-a]pyridin-3-yl] morpholin-4-ylmethanone (MLN1117), Ridaforolimus, Metformin, N-[4-[[3-(3,5dimethoxyanilino)quinoxalin-2-yl]sulfamoyl]phenyl]-3-methoxy-4-methylbenzamide (XL765), 2-amino-8-ethyl-4-methyl-6-(1H-pyrazol-5-yl)pyrido[2,3-d]pyrimidin-7-one (SAR245409), (3S)-4-[[(1S)-1-carboxy-2-hydroxyethyl]amino]-3-[2-[[(2S)-5(diaminomethylideneamino)-2-[[4-oxo-4-[[4-(4-oxo-8-phenylchromen-2-yl)morpholin-4 ium-4-yl]methoxy]butanoyl]amino] pentanoyl]amino]acetyl]amino]-4-oxobutanoate (SF1126), 5-(8-methyl-2-morpholin-4-yl-9-propan-2-ylpurin-6-yl)pyrimidin-2-amine (VS5584), (2S)-1-[4-[[2-(2-aminopyrimidin-5-yl)-7-methyl-4-morpholin-4-ylthieno[3,2d]pyrimidin-6-yl]methyl]piperazin-1-yl]-2-hydroxypropan-1-one (GDC0980), or a compound of any of chemical formulae 1 to 5:

Chemical formula 1

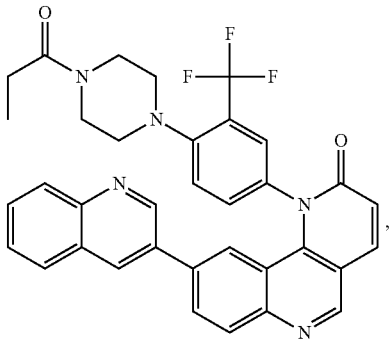

,

Chemical formula 2

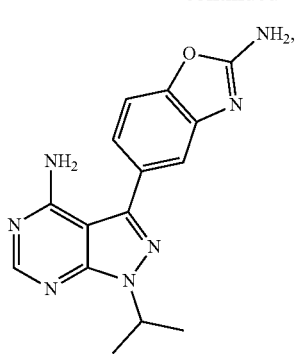

Chemical formula 3

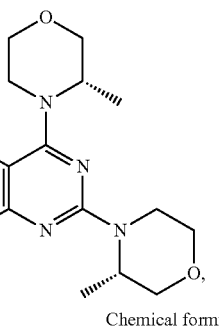

Chemical formula 4

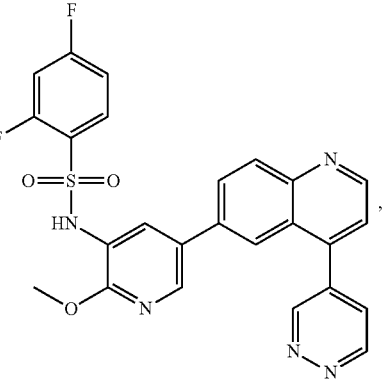

Chemical formula 5

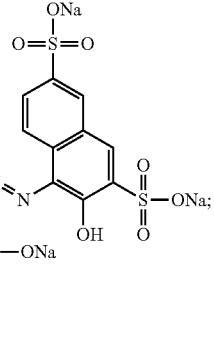

or a pharmaceutically-acceptable salt thereof.

2. The method of claim 1, wherein the subject has a brain somatic mutation in a gene of the mTOR pathway.

3. The method of claim 1, wherein the FCD type II is characterized by mTOR hyperactivation, spontaneous seizures, behavioral seizures, electrographic seizures or generation of abnormal neurons in the subject.

4. The method of claim 3, wherein the mTOR inhibitor decreases the onset frequency of spontaneous seizures, behavioral seizures, or electrographic seizures.

5. The method of claim 1, wherein the mTOR inhibitor decreases the number or soma size of abnormal neurons in the cerebral cortex.

6. The method of claim 1, wherein the mTOR inhibitor is administered intracerebroventricularly.

7. The method of claim 2, wherein the brain somatic mutation comprises a mutation in a gene encoding SEQ ID NO: 2, 4, 6, 8, or 10 that results in at least one of:
substitution of
R at position 206 to C,
R at position 624 to H,
Y at position 1450 to D,
C at position 1483 to R,
R at position 1709 to H,
T at position 1977 to K,
R at position 2193 to C,
S at position 2215 to F,
L at position 2427 to P, or
L at position 2427 to Q,
in the amino acid sequence of SEQ ID NO: 2;
substitution of
R at position 22 to W,
R at position 204 to C, or
R at position 811 to L
in the amino acid sequence of SEQ ID NO: 4;
substitution of valine (V) at position 1547 to isoleucine (I) in the amino acid sequence of SEQ ID NO: 6;
substitution of arginine (R) at position 247 to histidine (H) in the amino acid sequence of SEQ ID NO: 8; or
substitution of aspartic acid (D) at position 1018 to asparagine (N) in an amino acid of SEQ ID NO: 10.

8. The method of claim 2, wherein the brain somatic mutation includes at least one of:
substitution of
Cytosine (C) at position 616 to Thymine (T),
Guanine (G) at position 1871 to Adenine (A),
Thymine (T) at position 4348 to Guanine (G),
Thymine (T) at position 4447 to Cytosine (C),
Guanine (G) at position 5126 to Adenine (A),
Cytosine (C) at position 5930 to Adenine (A),
Cytosine (C) at position 6577 to Thymine (T),
Cytosine (C) at position 6644 to Thymine (T),
Thymine (T) at position 7280 to Cytosine (C), or
Thymine (T) at position 7280 to Adenine (A)
in the amino acid sequence of SEQ ID NO: 1;
substitution of
Cytosine (C) at position 64 to Thymine (T),
Cytosine (C) at position 610 to Thymine (T), or
Guanine (G) at position 2432 to Thymine (T)
in the amino acid sequence of SEQ ID NO: 3;
substitution of Guanine (G) at position 4639 to Adenine (A) in the nucleotide sequence of SEQ ID NO: 5;
substitution of Guanine (G) at position 740 to Adenine (A) in the nucleotide sequence of SEQ ID NO: 7; or
substitution of Guanine (G) at position 3052 to Adenine (A) in the nucleotide sequence of SEQ ID NO: 9.

9. The method of claim 1, wherein the mTOR inhibitor is in a composition that further comprises a pharmaceutically acceptable diluent, excipient, stabilizing agent, surfactant, gelling agent, pH adjusting agent, anti-oxidant, or preservative.

10. The method of claim 1, wherein the subject has mTOR hyperactivation, spontaneous seizures, behavioral seizures, electrographic seizures or generation of abnormal neurons in the subject.

11. A method for treating Focal Cortical Dysplasia (FCD) type II in a subject, the method comprising reducing phosphorylation of S6K by administering an mTOR inhibitor, wherein the subject has a brain somatic mutation in mTOR, TSC1, TSC2, AKT3, or PIK3CA, wherein the mTOR inhibitor is Rapamycin, 3-[2,4-bis [(3S)-3methylmorpholin-4-yl]pyrido[2,3-d]pyrimidin-7-yl]-N-methylbenzamide (AZD2014), 2methyl-2-[4-(3-methyl-2-oxo-8-quinolin-3-ylimidazo[4,5-c] quinolin-1yl)phenyl]propanenitrile (BEZ235), (Z)-but-2-enedioic acid; 8-(6-methoxypyridin-3-yl)-3methyl-1-[4-piperazin-1-yl-3-(trifluoromethyl)phenyl]imidazo [4,5-c]quinolin-2-one (BGT226), Everolimus, 5-ethyl-3-[2-methyl-6-(1H-1,2,4-triazol-5-yl)pyridin-3yl]-7,8-dihydropyrazino[2,3-b]pyrazin-6-one (CC-115), 3-[6-(2-hydroxypropan-2 yl)pyridin-3-yl]-5-(4-methoxycyclohexyl)-7,8-dihydropyrazino[2,3-b] pyrazin-6-one (CC223), 8-[5-(2-hydroxypropan-2-yl) pyridin-3-yl]-1-[(2S)-2-methoxypropyl]-3methylimidazo[4,5-c]quinolin-2-one (LY3023414), P7170, 1-{(2R)-4-[2-(2Aminopyrimidin-5-yl)-6-(morpholin-4-yl)-9-(2,2,2-trifluoroethyl)-9H-purin-8-yl]-2 methylpiperazin-1-yl}ethan-1-one (DS-7423), (4-[(5Z)-4-amino-5-(7-methoxyindol-2 ylidene)-1H-imidazo[5,1-f][1,2,4]triazin-7-yl]cyclohexane-1-carboxylic acid) (OSI-027), 2-amino-8-[4-(2-hydroxyethoxy) cyclohexyl]-6-(6-methoxypyridin-3-yl)-4methylpyrido [2,3-d]pyrimidin-7-one (PF-04691502), 1-[4-[4-(dimethylamino)piperidine-1carbonyl]phenyl]-3-[4-(4,6-dimorpholin-4-yl-1,3,5-triazin-2-yl)phenyl]urea (PF-05212384), Temsirolimus, [6-(2-amino-1,3-benzoxazol-5-yl)imidazo[1,2-a]pyridin-3-yl] morpholin-4-ylmethanone (MLN1117), Ridaforolimus, Metformin, N-[4-[[3-(3,5dimethoxyanilino) quinoxalin-2-yl]sulfamoyl]phenyl]-3-methoxy-4-methylbenzamide (XL765), 2-amino-8-ethyl-4-methyl-6-(1H-pyrazol-5-yl)pyrido[2,3-d]pyrimidin-7-one (SAR245409), (3S)-4-[[(1S)-1-carboxy-2-hydroxyethyl]amino]-3-(2S)-5(diaminomethylideneamino)-2-[[4-oxo-4-[[4-(4-oxo-8-phenylchromen-2-yl) morpholin-4 ium-4-yl]methoxy]butanoyl]amino]pentanoyl] amino]acetyl]amino]-4-oxobutanoate (SF1126), 5-(8-methyl-2-morpholin-4-yl-9-propan-2-ylpurin-6-yl) pyrimidin-2-amine (VS5584), (2S)-1-[4-[[2-(2-aminopyrimidin-5-yl)-7-methyl-4-morpholin-4-ylthieno[3,2d]pyrimidin-6-yl]methyl]piperazin-1-yl]-2-hydroxypropan-1-one (GDC0980), or a compound of any of chemical formulae 1 to 5:

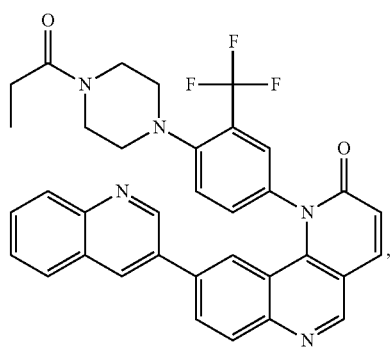

Chemical formula 1

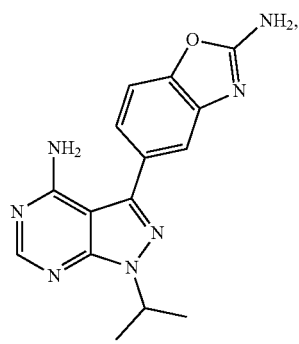

Chemical formula 2

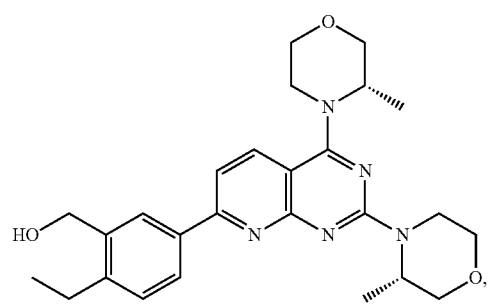

Chemical formula 3

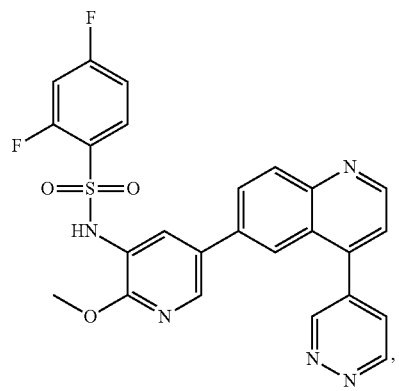

Chemical formula 4

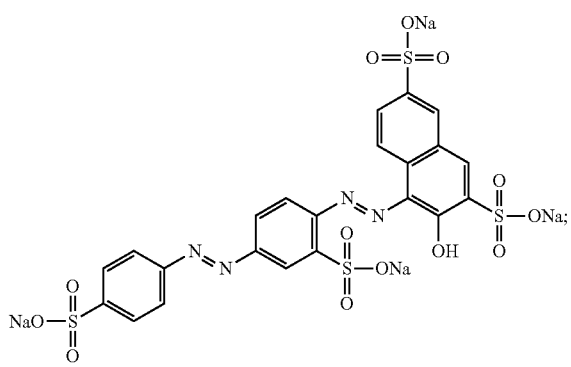

Chemical formula 5 or a pharmaceutically-acceptable salt thereof.

* * * * *

SEQUENCE LISTING

```
<160> NUMBER OF SEQ ID NOS: 38

<210> SEQ ID NO 1
<211> LENGTH: 7650
<212> TYPE: DNA
<213> ORGANISM: Homo sapiens
<220> FEATURE:
<221> NAME/KEY: gene
<222> LOCATION: (1)..(7650)
<223> OTHER INFORMATION: wild type mTOR

<400> SEQUENCE: 1
atgcttggaa ccggacctgc cgccgccacc accgctgcca ccacatctag caatgtgagc     60
```

```
gtcctgcagc agtttgccag tggcctaaag agccggaatg aggaaaccag ggccaaagcc      120
gccaaggagc tccagcacta tgtcaccatg gaactccgag agatgagtca agaggagtct      180
actcgcttct atgaccaact gaaccatcac attttttgaat tggtttccag ctcagatgcc     240
aatgagagga aaggtggcat cttggccata gctagcctca taggagtgga aggtgggaat      300
gccacccgaa ttggcagatt tgccaactat cttcggaacc tcctcccctc caatgaccca      360
gttgtcatgg aaatggcatc caaggccatt ggccgtcttg ccatggcagg ggacactttt      420
accgctgagt acgtggaatt tgaggtgaag cgagccctgg aatggctggg tgctgaccgc      480
aatgagggcc ggagacatgc agctgtcctg gttctccgtg agctggccat cagcgtccct      540
accttcttct ccagcaagt gcaacccttc tttgacaaca ttttttgtggc cgtgtgggac      600 cccaaacagg ccatccgtga gggagctgta gccgcccttc gtgcctgtct gattctcaca      660
acccagcgtg agccgaagga gatgcagaag cctcagtggt acaggcacac atttgaagaa      720
gcagagaagg gatttgatga gaccttggcc aaagagaagg gcatgaatcg ggatgatcgg      780
atccatggag ccttgttgat ccttaacgag ctggtccgaa tcagcagcat ggagggagag      840
cgtctgagag aagaaatgga agaaatcaca cagcagcagc tggtacacga caagtactgc      900
aaagatctca tgggcttcgg aacaaaacct cgtcacatta ccccccttcac cagtttccag      960 gctgtacagc cccagcagtc aaatgccttg gtggggctgc tggggtacag ctctcaccaa     1020
ggcctcatgg gatttgggac ctcccccagt ccagctaagt ccaccctggt ggagagccgg     1080
tgttgcagag acttgatgga ggagaaattt gatcaggtgt gccagtgggt gctgaaatgc     1140
aggaatagca agaactcgct gatccaaatg acaatcctta atttgttgcc ccgcttggct     1200
gcattccgac cttctgcctt cacagatacc cagtatctcc aagataccat gaaccatgtc     1260
ctaagctgtg tcaagaagga gaggaacgt acagcggcct tccaagcct ggggctactt      1320 tctgtggctg tgaggtctga gtttaaggtc tatttgcctc gcgtgctgga catcatccga     1380
gcggccctgc ccccaaagga cttcgcccat aagaggcaga aggcaatgca ggtggatgcc     1440
acagtcttca cttgcatcag catgctggct cgagcaatgg ggccaggcat ccagcaggat     1500
atcaaggagc tgctggagcc catgctggca gtgggactaa gccctgccct cactgcagtg     1560
ctctacgacc tgagccgtca gattccacag ctaaagaagg acattcaaga tgggctactg     1620
aaaatgctgt ccctggtcct tatgcacaaa cccctttcgcc acccaggcat gcccaagggc     1680
ctggcccatc agctggcctc tcctggcctc acgaccctcc ctgaggccag cgatgtgggc     1740
agcatcactc ttgcccctccg aacgcttggc agctttgaat ttgaaggcca ctctctgacc     1800
caatttgttc gccactgtgc ggatcatttc ctgaacagtg agcacaagga gatccgcatg     1860
gaggctgccc gcacctgctc ccgcctgctc acaccctcca tccacctcat cagtggccat     1920
gctcatgtgg ttagccagac cgcagtgcaa gtggtggcag atgtgcttag caaactgctc     1980
gtagttggga taacagatcc tgaccctgac attcgctact gtgtcttggc gtccctggac     2040
gagcgctttg atgcacacct ggcccaggcg gagaacttgc aggccttgtt tgtggctctg     2100
aatgaccagg tgtttgagat ccgggagctg gccatctgca ctgtgggccg actcagtagc     2160
atgaaccctg cctttgtcat gcctttcctg cgcaagatgc tcatccagat tttgacagag     2220
ttggagcaca gtgggattgg aagaatcaaa gagcagagtg cccgcatgct ggggcacctg     2280
gtctccaatg ccccccgact catccgcccc tacatggagc ctattctgaa ggcattaatt     2340
ttgaaactga aagatccaga ccctgatcca aacccaggtg tgatcaataa tgtcctggca     2400
```

```
acaataggag aattggcaca ggttagtggc ctggaaatga ggaaatgggt tgatgaactt    2460
tttattatca tcatggacat gctccaggat tcctctttgt tggccaaaag gcaggtggct    2520
ctgtggaccc tgggacagtt ggtggccagc actggctatg tagtagagcc ctacaggaag    2580
taccctactt tgcttgaggt gctactgaat tttctgaaga ctgagcagaa ccagggtaca    2640
cgcagagagg ccatccgtgt gttagggctt ttaggggctt tggatcctta caagcacaaa    2700
gtgaacattg gcatgataga ccagtcccgg gatgcctctg ctgtcagcct gtcagaatcc    2760
aagtcaagtc aggattcctc tgactatagc actagtgaaa tgctggtcaa catgggaaac    2820
ttgcctctgg atgagttcta cccagctgtg tccatggtgg ccctgatgcg gatcttccga    2880
gaccagtcac tctctcatca tcacaccatg gttgtccagg ccatcacctt catcttcaag    2940
tccctgggac tcaaatgtgt gcagttcctg ccccaggtca tgcccacgtt ccttaacgtc    3000
attcgagtct gtgatggggc catccgggaa ttttgttcc agcagctggg aatgttggtg    3060
tcctttgtga agagccacat cagaccttat atggatgaaa tagtcaccct catgagagaa    3120
ttctgggtca tgaacacctc aattcagagc acgatcattc ttctcattga gcaaattgtg    3180
gtagctcttg ggggtgaatt taagctctac ctgccccagc tgatcccaca catgctgcgt    3240
gtcttcatgc atgacaacag cccaggccgc attgtctcta tcaagttact ggctgcaatc    3300
cagctgtttg gcgccaacct ggatgactac ctgcatttac tgctgcctcc tattgttaag    3360
ttgtttgatg cccctgaagc tccactgcca tctcgaaagg cagcgctaga gactgtggac    3420
cgcctgacgg agtccctgga tttcactgac tatgcctccc ggatcattca ccctattgtt    3480
cgaacactgg accagagccc agaactgcgc tccacagcca tggacacgct gtcttcactt    3540
gtttttcagc tggggaagaa gtaccaaatt ttcattccaa tggtgaataa agttctggtg    3600
cgacaccgaa tcaatcatca gcgctatgat gtgctcatct gcagaattgt caagggatac    3660
acacttgctg atgaagagga ggatccttg atttaccagc atcggatgct taggagtggc    3720 caagggatc cattggctag tggaccagtg gaaacaggac ccatgaagaa actgcacgtc    3780
agcaccatca acctccaaaa ggcctgggc gctgccagga gggtctccaa agatgactgg    3840
ctggaatggc tgagacggct gagcctggag ctgctgaagg actcatcatc gccctccctg    3900
cgctcctgct gggccctggc acaggcctac aacccgatgg ccagggatct cttcaatgct    3960
gcatttgtgt cctgctggtc tgaactgaat gaagatcaac aggatgagct catcagaagc    4020
atcgagttgg ccctcacctc acaagacatc gctgaagtca cacagaccct cttaaacttg    4080
gctgaattca tggaacacag tgacaagggc cccctgccac tgagagatga caatggcatt    4140
gttctgctgg gtgagagagc tgccaagtgc cgagcatatg ccaaagcact acactacaaa    4200
gaactggagt tccagaaagg ccccaccct gccattctag aatctctcat cagcattaat    4260
aataagctac agcagccgga ggcagcggcc ggagtgttag aatatgccat gaaacacttt    4320
ggagagctgg agatccaggc tacctggtat gagaaactgc acgagtggga ggatgccctt    4380
gtggcctatg acaagaaaat ggacaccaac aaggacgacc cagagctgat gctgggccgc    4440
atgcgctgcc tcgaggcctt ggggaatgg ggtcaactcc accagcagtg ctgtgaaaag    4500
tggacccctg ttaatgatga cccaagcc aagatggccc ggatggctgc tgcagctgca    4560
tggggtttag gtcagtggga cagcatggaa gaatacacct gtatgatccc tcgggacacc    4620
catgatgggg cattttatag agctgtgctg gcactgcatc aggacctctt ctccttggca    4680
caacagtgca ttgacaaggc cagggacctg ctggatgctg aattaactgc gatgcagga    4740 gagagttaca gtcgggcata tgggccatg gtttcttgcc acatgctgtc cgagctggag    4800
```

-continued

```
gaggttatcc agtacaaact tgtccccgag cgacgagaga tcatccgcca gatctggtgg    4860
gagagactgc agggctgcca gcgtatcgta gaggactgga agaaaatcct tatggtgcgg    4920
tcccttgtgg tcagccctca tgaagacatg agaacctggc tcaagtatgc aagcctgtgc    4980
ggcaagagtg gcaggctggc tcttgctcat aaaactttag tgttgctcct gggagttgat    5040
ccgtctcggc aacttgacca tcctctgcca acagttcacc ctcaggtgac ctatgcctac    5100
atgaaaaaca tgtggaagag tgcccgcaag atcgatgcct tccagcacat gcagcatttt    5160
gtccagacca tgcagcaaca ggcccagcat gccatcgcta ctgaggacca gcagcataag    5220
caggaactgc acaagctcat ggcccgatgc ttcctgaaac ttggagagtg gcagctgaat    5280
ctacagggca tcaatgagag cacaatcccc aaagtgctgc agtactacag cgccgccaca    5340
gagcacgacc gcagctggta caaggcctgg catgcgtggg cagtgatgaa cttcgaagct    5400
gtgctacact acaaacatca gaaccaagcc cgcgatgaga agaagaaact gcgtcatgcc    5460
agcggggcca acatcaccaa cgccaccact gccgccacca cggccgccac tgccaccacc    5520
actgccagca ccgagggcag caacagtgag agcgaggccg agagcaccga aacagcccc    5580 accccatcgc cgctgcagaa gaaggtcact gaggatctgt ccaaaacccct cctgatgtac    5640 acggtgcctg ccgtccaggg cttcttccgt tccatctcct tgtcacgagg caacaacctc    5700
caggatacac tcagagttct caccttatgg tttgattatg gtcactggcc agatgtcaat    5760
gaggccttag tggaggggt gaaagccatc cagattgata cctggctaca ggttatacct    5820
cagctcattg caagaattga tacgcccaga cccttggtgg acgtctcat tcaccagctt    5880 ctcacagaca ttggtcggta ccaccccag gccctcatct acccactgac agtggcttct    5940
aagtctacca cgacagcccg gcacaatgca gccaacaaga ttctgaagaa catgtgtgag    6000
cacagcaaca ccctggtcca gcaggccatg atggtgagcg aggagctgat ccgagtggcc    6060
atcctctggc atgagatgtg gcatgaaggc ctggaagagg catctcgttt gtactttggg    6120
gaaaggaacg tgaaaggcat gtttgaggtg ctggagccct gcatgctat gatggaacgg    6180 ggcccccaga ctctgaagga acatcccttt aatcaggcct atggtcgaga tttaatggag    6240
gcccaagagt ggtgcaggaa gtacatgaaa tcagggaatg tcaaggacct cacccaagcc    6300
tgggacctct attatcatgt gttccgacga atctcaaagc agctgcctca gctcacatcc    6360
ttagagctgc aatatgtttc cccaaaactt ctgatgtgcc gggaccttga attggctgtg    6420
ccaggaacat atgaccccaa ccagccaatc attcgcattc agtccatagc accgtctttg    6480
caagtcatca catccaagca gaggcccagg aaattgacac ttatgggcag caacggacat    6540
gagtttgttt tccttctaaa aggccatgaa gatctgcgcc aggatgagcg tgtgatgcag    6600
ctcttcggcc tggttaacac ccttctggcc aatgacccaa catctcttcg gaaaaacctc    6660
agcatccaga gatacgctgt catccctta tcgaccaact cgggcctcat ggctgggtt    6720 ccccactgtg acacactgca cgccctcatc cgggactaca gggagaagaa gaagatcctt    6780
ctcaacatcg agcatcgcat catgttgcgg atggctccgg actatgacca cttgactctg    6840
atgcagaagg tggaggtgtt tgagcatgcc gtcaataata cagctgggga cgacctggcc    6900
aagctgctgt ggctgaaaag ccccagctcc gaggtgtggt tgaccgaag aaccaattat    6960 acccgttctt tagcggtcat gtcaatggtt gggtatattt taggcctggg agatagacac    7020
ccatccaacc tgatgctgga ccgtctgagt gggaagatcc tgcacattga ctttgggga     7080 tgctttgagg ttgctatgac ccgagagaag tttccagaga agattccatt tagactaaca    7140
```

-continued

```
agaatgttga ccaatgctat ggaggttaca ggcctggatg caactacag  aatcacatgc   7200 cacacagtga tggaggtgct gcgagagcac aaggacagtg tcatggccgt gctggaagcc   7260
tttgtctatg accccttgct gaactggagg ctgatggaca caaataccaa aggcaacaag   7320
cgatcccgaa cgaggacgga ttcctactct gctggccagt cagtcgaaat tttggacggt   7380
gtggaacttg gagagccagc ccataagaaa acggggacca cagtgccaga atctattcat   7440
tctttcattg gagacggttt ggtgaaacca gaggccctaa ataagaaagc tatccagatt   7500
attaacaggg ttcgagataa gctcactggt cgggacttct ctcatgatga cactttggat   7560
gttccaacgc aagttgagct gctcatcaaa caagcgacat cccatgaaaa cctctgccag   7620
tgctatattg gctggtgccc tttctggtaa                                    7650
```

<210> SEQ ID NO 2
<211> LENGTH: 2549
<212> TYPE: PRT
<213> ORGANISM: Homo sapiens
<220> FEATURE:
<221> NAME/KEY: PEPTIDE
<222> LOCATION: (1)..(2549)
<223> OTHER INFORMATION: wild type mTOR

<400> SEQUENCE: 2

```
Met Leu Gly Thr Gly Pro Ala Ala Thr Thr Ala Ala Thr Thr Ser
1               5                   10                  15

Ser Asn Val Ser Val Leu Gln Gln Phe Ala Ser Gly Leu Lys Ser Arg
                20                  25                  30

Asn Glu Glu Thr Arg Ala Lys Ala Ala Lys Glu Leu Gln His Tyr Val
            35                  40                  45

Thr Met Glu Leu Arg Glu Met Ser Gln Glu Glu Ser Thr Arg Phe Tyr
        50                  55                  60

Asp Gln Leu Asn His His Ile Phe Glu Leu Val Ser Ser Ser Asp Ala
65                  70                  75                  80

Asn Glu Arg Lys Gly Gly Ile Leu Ala Ile Ala Ser Leu Ile Gly Val
                85                  90                  95

Glu Gly Gly Asn Ala Thr Arg Ile Gly Arg Phe Ala Asn Tyr Leu Arg
            100                 105                 110

Asn Leu Leu Pro Ser Asn Asp Pro Val Val Met Glu Met Ala Ser Lys
        115                 120                 125

Ala Ile Gly Arg Leu Ala Met Ala Gly Asp Thr Phe Thr Ala Glu Tyr
    130                 135                 140

Val Glu Phe Glu Val Lys Arg Ala Leu Glu Trp Leu Gly Ala Asp Arg
145                 150                 155                 160

Asn Glu Gly Arg Arg His Ala Ala Val Leu Val Leu Arg Glu Leu Ala
                165                 170                 175

Ile Ser Val Pro Thr Phe Phe Gln Gln Val Gln Pro Phe Phe Asp
            180                 185                 190

Asn Ile Phe Val Ala Val Trp Asp Pro Lys Gln Ala Ile Arg Glu Gly
        195                 200                 205

Ala Val Ala Ala Leu Arg Ala Cys Leu Ile Leu Thr Thr Gln Arg Glu
    210                 215                 220

Pro Lys Glu Met Gln Lys Pro Gln Trp Tyr Arg His Thr Phe Glu Glu
225                 230                 235                 240

Ala Glu Lys Gly Phe Asp Glu Thr Leu Ala Lys Glu Lys Gly Met Asn
                245                 250                 255

Arg Asp Asp Arg Ile His Gly Ala Leu Leu Ile Leu Asn Glu Leu Val
```

```
                260                 265                 270
Arg Ile Ser Ser Met Glu Gly Glu Arg Leu Arg Glu Glu Met Glu Glu
            275                 280                 285
Ile Thr Gln Gln Gln Leu Val His Asp Lys Tyr Cys Lys Asp Leu Met
            290                 295                 300
Gly Phe Gly Thr Lys Pro Arg His Ile Thr Pro Phe Thr Ser Phe Gln
305                 310                 315                 320
Ala Val Gln Pro Gln Gln Ser Asn Ala Leu Val Gly Leu Leu Gly Tyr
            325                 330                 335
Ser Ser His Gln Gly Leu Met Gly Phe Gly Thr Ser Pro Ser Pro Ala
            340                 345                 350
Lys Ser Thr Leu Val Glu Ser Arg Cys Cys Arg Asp Leu Met Glu Glu
            355                 360                 365
Lys Phe Asp Gln Val Cys Gln Trp Val Leu Lys Cys Arg Asn Ser Lys
            370                 375                 380
Asn Ser Leu Ile Gln Met Thr Ile Leu Asn Leu Leu Pro Arg Leu Ala
385                 390                 395                 400
Ala Phe Arg Pro Ser Ala Phe Thr Asp Thr Gln Tyr Leu Gln Asp Thr
            405                 410                 415
Met Asn His Val Leu Ser Cys Val Lys Glu Lys Glu Arg Thr Ala
            420                 425                 430
Ala Phe Gln Ala Leu Gly Leu Leu Ser Val Ala Val Arg Ser Glu Phe
            435                 440                 445
Lys Val Tyr Leu Pro Arg Val Leu Asp Ile Ile Arg Ala Ala Leu Pro
450                 455                 460
Pro Lys Asp Phe Ala His Lys Arg Gln Lys Ala Met Gln Val Asp Ala
465                 470                 475                 480
Thr Val Phe Thr Cys Ile Ser Met Leu Ala Arg Ala Met Gly Pro Gly
            485                 490                 495
Ile Gln Gln Asp Ile Lys Glu Leu Leu Glu Pro Met Leu Ala Val Gly
            500                 505                 510
Leu Ser Pro Ala Leu Thr Ala Val Leu Tyr Asp Leu Ser Arg Gln Ile
            515                 520                 525
Pro Gln Leu Lys Lys Asp Ile Gln Asp Gly Leu Leu Lys Met Leu Ser
            530                 535                 540
Leu Val Leu Met His Lys Pro Leu Arg His Pro Gly Met Pro Lys Gly
545                 550                 555                 560
Leu Ala His Gln Leu Ala Ser Pro Gly Leu Thr Thr Leu Pro Glu Ala
            565                 570                 575
Ser Asp Val Gly Ser Ile Thr Leu Ala Leu Arg Thr Leu Gly Ser Phe
            580                 585                 590
Glu Phe Glu Gly His Ser Leu Thr Gln Phe Val Arg His Cys Ala Asp
            595                 600                 605
His Phe Leu Asn Ser Glu His Lys Glu Ile Arg Met Glu Ala Ala Arg
            610                 615                 620
Thr Cys Ser Arg Leu Leu Thr Pro Ser Ile His Leu Ile Ser Gly His
625                 630                 635                 640
Ala His Val Val Ser Gln Thr Ala Val Gln Val Ala Asp Val Leu
            645                 650                 655
Ser Lys Leu Leu Val Val Gly Ile Thr Asp Pro Asp Pro Asp Ile Arg
            660                 665                 670
Tyr Cys Val Leu Ala Ser Leu Asp Glu Arg Phe Asp Ala His Leu Ala
            675                 680                 685
```

-continued

```
Gln Ala Glu Asn Leu Gln Ala Leu Phe Val Ala Leu Asn Asp Gln Val
    690                 695                 700
Phe Glu Ile Arg Glu Leu Ala Ile Cys Thr Val Gly Arg Leu Ser Ser
705                 710                 715                 720
Met Asn Pro Ala Phe Val Met Pro Phe Leu Arg Lys Met Leu Ile Gln
                725                 730                 735
Ile Leu Thr Glu Leu Glu His Ser Gly Ile Gly Arg Ile Lys Glu Gln
            740                 745                 750
Ser Ala Arg Met Leu Gly His Leu Val Ser Asn Ala Pro Arg Leu Ile
        755                 760                 765
Arg Pro Tyr Met Glu Pro Ile Leu Lys Ala Leu Ile Leu Lys Leu Lys
770                 775                 780
Asp Pro Asp Pro Asp Pro Asn Pro Gly Val Ile Asn Asn Val Leu Ala
785                 790                 795                 800
Thr Ile Gly Glu Leu Ala Gln Val Ser Gly Leu Glu Met Arg Lys Trp
                805                 810                 815
Val Asp Glu Leu Phe Ile Ile Met Asp Met Leu Gln Asp Ser Ser
                820                 825                 830
Leu Leu Ala Lys Arg Gln Val Ala Leu Trp Thr Leu Gly Gln Leu Val
            835                 840                 845
Ala Ser Thr Gly Tyr Val Val Glu Pro Tyr Arg Lys Tyr Pro Thr Leu
        850                 855                 860
Leu Glu Val Leu Leu Asn Phe Leu Lys Thr Glu Gln Asn Gln Gly Thr
865                 870                 875                 880
Arg Arg Glu Ala Ile Arg Val Leu Gly Leu Leu Gly Ala Leu Asp Pro
                885                 890                 895
Tyr Lys His Lys Val Asn Ile Gly Met Ile Asp Gln Ser Arg Asp Ala
            900                 905                 910
Ser Ala Val Ser Leu Ser Glu Ser Lys Ser Ser Gln Asp Ser Ser Asp
        915                 920                 925
Tyr Ser Thr Ser Glu Met Leu Val Asn Met Gly Asn Leu Pro Leu Asp
930                 935                 940
Glu Phe Tyr Pro Ala Val Ser Met Val Ala Leu Met Arg Ile Phe Arg
945                 950                 955                 960
Asp Gln Ser Leu Ser His His His Thr Met Val Val Gln Ala Ile Thr
                965                 970                 975
Phe Ile Phe Lys Ser Leu Gly Leu Lys Cys Val Gln Phe Leu Pro Gln
            980                 985                 990
Val Met Pro Thr Phe Leu Asn Val Ile Arg Val Cys Asp Gly Ala Ile
        995                 1000                1005
Arg Glu Phe Leu Phe Gln Gln Leu Gly Met Leu Val Ser Phe Val Lys
1010                1015                1020
Ser His Ile Arg Pro Tyr Met Asp Glu Ile Val Thr Leu Met Arg Glu
1025                1030                1035                1040
Phe Trp Val Met Asn Thr Ser Ile Gln Ser Thr Ile Ile Leu Leu Ile
                1045                1050                1055
Glu Gln Ile Val Val Ala Leu Gly Gly Glu Phe Lys Leu Tyr Leu Pro
            1060                1065                1070
Gln Leu Ile Pro His Met Leu Arg Val Phe Met His Asp Asn Ser Pro
        1075                1080                1085
Gly Arg Ile Val Ser Ile Lys Leu Leu Ala Ala Ile Gln Leu Phe Gly
1090                1095                1100
```

-continued

Ala Asn Leu Asp Asp Tyr Leu His Leu Leu Leu Pro Pro Ile Val Lys
1105                1110                1115                1120

Leu Phe Asp Ala Pro Glu Ala Pro Leu Pro Ser Arg Lys Ala Ala Leu
            1125                1130                1135

Glu Thr Val Asp Arg Leu Thr Glu Ser Leu Asp Phe Thr Asp Tyr Ala
            1140                1145                1150

Ser Arg Ile Ile His Pro Ile Val Arg Thr Leu Asp Gln Ser Pro Glu
        1155                1160                1165

Leu Arg Ser Thr Ala Met Asp Thr Leu Ser Ser Leu Val Phe Gln Leu
    1170                1175                1180

Gly Lys Lys Tyr Gln Ile Phe Ile Pro Met Val Asn Lys Val Leu Val
1185                1190                1195                1200

Arg His Arg Ile Asn His Gln Arg Tyr Asp Val Leu Ile Cys Arg Ile
            1205                1210                1215

Val Lys Gly Tyr Thr Leu Ala Asp Glu Glu Asp Pro Leu Ile Tyr
            1220                1225                1230

Gln His Arg Met Leu Arg Ser Gly Gln Gly Asp Ala Leu Ala Ser Gly
        1235                1240                1245

Pro Val Glu Thr Gly Pro Met Lys Lys Leu His Val Ser Thr Ile Asn
    1250                1255                1260

Leu Gln Lys Ala Trp Gly Ala Ala Arg Arg Val Ser Lys Asp Asp Trp
1265                1270                1275                1280

Leu Glu Trp Leu Arg Arg Leu Ser Leu Glu Leu Leu Lys Asp Ser Ser
            1285                1290                1295

Ser Pro Ser Leu Arg Ser Cys Trp Ala Leu Ala Gln Ala Tyr Asn Pro
        1300                1305                1310

Met Ala Arg Asp Leu Phe Asn Ala Ala Phe Val Ser Cys Trp Ser Glu
    1315                1320                1325

Leu Asn Glu Asp Gln Gln Asp Glu Leu Ile Arg Ser Ile Glu Leu Ala
1330                1335                1340

Leu Thr Ser Gln Asp Ile Ala Glu Val Thr Gln Thr Leu Leu Asn Leu
1345                1350                1355                1360

Ala Glu Phe Met Glu His Ser Asp Lys Gly Pro Leu Pro Leu Arg Asp
            1365                1370                1375

Asp Asn Gly Ile Val Leu Leu Gly Glu Arg Ala Ala Lys Cys Arg Ala
        1380                1385                1390

Tyr Ala Lys Ala Leu His Tyr Lys Glu Leu Glu Phe Gln Lys Gly Pro
    1395                1400                1405

Thr Pro Ala Ile Leu Glu Ser Leu Ile Ser Ile Asn Asn Lys Leu Gln
    1410                1415                1420

Gln Pro Glu Ala Ala Ala Gly Val Leu Glu Tyr Ala Met Lys His Phe
1425                1430                1435                1440

Gly Glu Leu Glu Ile Gln Ala Thr Trp Tyr Glu Lys Leu His Glu Trp
            1445                1450                1455

Glu Asp Ala Leu Val Ala Tyr Asp Lys Lys Met Asp Thr Asn Lys Asp
        1460                1465                1470

Asp Pro Glu Leu Met Leu Gly Arg Met Arg Cys Leu Glu Ala Leu Gly
    1475                1480                1485

Glu Trp Gly Gln Leu His Gln Gln Cys Cys Glu Lys Trp Thr Leu Val
    1490                1495                1500

Asn Asp Glu Thr Gln Ala Lys Met Ala Arg Met Ala Ala Ala Ala
1505                1510                1515                1520

Trp Gly Leu Gly Gln Trp Asp Ser Met Glu Glu Tyr Thr Cys Met Ile

```
                    1525           1530           1535
Pro Arg Asp Thr His Asp Gly Ala Phe Tyr Arg Ala Val Leu Ala Leu
            1540           1545           1550

His Gln Asp Leu Phe Ser Leu Ala Gln Gln Cys Ile Asp Lys Ala Arg
            1555           1560           1565

Asp Leu Leu Asp Ala Glu Leu Thr Ala Met Ala Gly Glu Ser Tyr Ser
            1570           1575           1580

Arg Ala Tyr Gly Ala Met Val Ser Cys His Met Leu Ser Glu Leu Glu
1585           1590           1595           1600

Glu Val Ile Gln Tyr Lys Leu Val Pro Glu Arg Arg Glu Ile Ile Arg
            1605           1610           1615

Gln Ile Trp Trp Glu Arg Leu Gln Gly Cys Gln Arg Ile Val Glu Asp
            1620           1625           1630

Trp Gln Lys Ile Leu Met Val Arg Ser Leu Val Val Ser Pro His Glu
            1635           1640           1645

Asp Met Arg Thr Trp Leu Lys Tyr Ala Ser Leu Cys Gly Lys Ser Gly
            1650           1655           1660

Arg Leu Ala Leu Ala His Lys Thr Leu Val Leu Leu Leu Gly Val Asp
1665           1670           1675           1680

Pro Ser Arg Gln Leu Asp His Pro Leu Pro Thr Val His Pro Gln Val
            1685           1690           1695

Thr Tyr Ala Tyr Met Lys Asn Met Trp Lys Ser Ala Arg Lys Ile Asp
            1700           1705           1710

Ala Phe Gln His Met Gln His Phe Val Gln Thr Met Gln Gln Gln Ala
            1715           1720           1725

Gln His Ala Ile Ala Thr Glu Asp Gln Gln His Lys Gln Glu Leu His
            1730           1735           1740

Lys Leu Met Ala Arg Cys Phe Leu Lys Leu Gly Glu Trp Gln Leu Asn
1745           1750           1755           1760

Leu Gln Gly Ile Asn Glu Ser Thr Ile Pro Lys Val Leu Gln Tyr Tyr
            1765           1770           1775

Ser Ala Ala Thr Glu His Asp Arg Ser Trp Tyr Lys Ala Trp His Ala
            1780           1785           1790

Trp Ala Val Met Asn Phe Glu Ala Val Leu His Tyr Lys His Gln Asn
            1795           1800           1805

Gln Ala Arg Asp Glu Lys Lys Lys Leu Arg His Ala Ser Gly Ala Asn
            1810           1815           1820

Ile Thr Asn Ala Thr Thr Ala Ala Thr Thr Ala Ala Thr Ala Thr Thr
1825           1830           1835           1840

Thr Ala Ser Thr Glu Gly Ser Asn Ser Glu Ser Glu Ala Glu Ser Thr
            1845           1850           1855

Glu Asn Ser Pro Thr Pro Ser Pro Leu Gln Lys Lys Val Thr Glu Asp
            1860           1865           1870

Leu Ser Lys Thr Leu Leu Met Tyr Thr Val Pro Ala Val Gln Gly Phe
            1875           1880           1885

Phe Arg Ser Ile Ser Leu Ser Arg Gly Asn Asn Leu Gln Asp Thr Leu
            1890           1895           1900

Arg Val Leu Thr Leu Trp Phe Asp Tyr Gly His Trp Pro Asp Val Asn
1905           1910           1915           1920

Glu Ala Leu Val Glu Gly Val Lys Ala Ile Gln Ile Asp Thr Trp Leu
            1925           1930           1935

Gln Val Ile Pro Gln Leu Ile Ala Arg Ile Asp Thr Pro Arg Pro Leu
            1940           1945           1950
```

Val Gly Arg Leu Ile His Gln Leu Leu Thr Asp Ile Gly Arg Tyr His
        1955                1960                1965

Pro Gln Ala Leu Ile Tyr Pro Leu Thr Val Ala Ser Lys Ser Thr Thr
        1970                1975                1980

Thr Ala Arg His Asn Ala Ala Asn Lys Ile Leu Lys Asn Met Cys Glu
1985                1990                1995                2000

His Ser Asn Thr Leu Val Gln Gln Ala Met Met Val Ser Glu Glu Leu
            2005                2010                2015

Ile Arg Val Ala Ile Leu Trp His Glu Met Trp His Glu Gly Leu Glu
            2020                2025                2030

Glu Ala Ser Arg Leu Tyr Phe Gly Glu Arg Asn Val Lys Gly Met Phe
            2035                2040                2045

Glu Val Leu Glu Pro Leu His Ala Met Met Glu Arg Gly Pro Gln Thr
            2050                2055                2060

Leu Lys Glu Thr Ser Phe Asn Gln Ala Tyr Gly Arg Asp Leu Met Glu
2065                2070                2075                2080

Ala Gln Glu Trp Cys Arg Lys Tyr Met Lys Ser Gly Asn Val Lys Asp
            2085                2090                2095

Leu Thr Gln Ala Trp Asp Leu Tyr Tyr His Val Phe Arg Arg Ile Ser
            2100                2105                2110

Lys Gln Leu Pro Gln Leu Thr Ser Leu Glu Leu Gln Tyr Val Ser Pro
            2115                2120                2125

Lys Leu Leu Met Cys Arg Asp Leu Glu Leu Ala Val Pro Gly Thr Tyr
            2130                2135                2140

Asp Pro Asn Gln Pro Ile Ile Arg Ile Gln Ser Ile Ala Pro Ser Leu
2145                2150                2155                2160

Gln Val Ile Thr Ser Lys Gln Arg Pro Arg Lys Leu Thr Leu Met Gly
            2165                2170                2175

Ser Asn Gly His Glu Phe Val Phe Leu Leu Lys Gly His Glu Asp Leu
            2180                2185                2190

Arg Gln Asp Glu Arg Val Met Gln Leu Phe Gly Leu Val Asn Thr Leu
            2195                2200                2205

Leu Ala Asn Asp Pro Thr Ser Leu Arg Lys Asn Leu Ser Ile Gln Arg
            2210                2215                2220

Tyr Ala Val Ile Pro Leu Ser Thr Asn Ser Gly Leu Ile Gly Trp Val
2225                2230                2235                2240

Pro His Cys Asp Thr Leu His Ala Leu Ile Arg Asp Tyr Arg Glu Lys
            2245                2250                2255

Lys Lys Ile Leu Leu Asn Ile Glu His Arg Ile Met Leu Arg Met Ala
            2260                2265                2270

Pro Asp Tyr Asp His Leu Thr Leu Met Gln Lys Val Glu Val Phe Glu
            2275                2280                2285

His Ala Val Asn Asn Thr Ala Gly Asp Asp Leu Ala Lys Leu Leu Trp
            2290                2295                2300

Leu Lys Ser Pro Ser Ser Glu Val Trp Phe Asp Arg Arg Thr Asn Tyr
2305                2310                2315                2320

Thr Arg Ser Leu Ala Val Met Ser Met Val Gly Tyr Ile Leu Gly Leu
            2325                2330                2335

Gly Asp Arg His Pro Ser Asn Leu Met Leu Asp Arg Leu Ser Gly Lys
            2340                2345                2350

Ile Leu His Ile Asp Phe Gly Asp Cys Phe Glu Val Ala Met Thr Arg
            2355                2360                2365

Glu Lys Phe Pro Glu Lys Ile Pro Phe Arg Leu Thr Arg Met Leu Thr
2370            2375            2380

Asn Ala Met Glu Val Thr Gly Leu Asp Gly Asn Tyr Arg Ile Thr Cys
2385            2390            2395            2400

His Thr Val Met Glu Val Leu Arg Glu His Lys Asp Ser Val Met Ala
            2405            2410            2415

Val Leu Glu Ala Phe Val Tyr Asp Pro Leu Leu Asn Trp Arg Leu Met
            2420            2425            2430

Asp Thr Asn Thr Lys Gly Asn Lys Arg Ser Arg Thr Arg Thr Asp Ser
            2435            2440            2445

Tyr Ser Ala Gly Gln Ser Val Glu Ile Leu Asp Gly Val Glu Leu Gly
            2450            2455            2460

Glu Pro Ala His Lys Lys Thr Gly Thr Thr Val Pro Glu Ser Ile His
2465            2470            2475            2480

Ser Phe Ile Gly Asp Gly Leu Val Lys Pro Glu Ala Leu Asn Lys Lys
            2485            2490            2495

Ala Ile Gln Ile Ile Asn Arg Val Arg Asp Lys Leu Thr Gly Arg Asp
            2500            2505            2510

Phe Ser His Asp Asp Thr Leu Asp Val Pro Thr Gln Val Glu Leu Leu
            2515            2520            2525

Ile Lys Gln Ala Thr Ser His Glu Asn Leu Cys Gln Cys Tyr Ile Gly
            2530            2535            2540

Trp Cys Pro Phe Trp
2545

<210> SEQ ID NO 3
<211> LENGTH: 3495
<212> TYPE: DNA
<213> ORGANISM: Homo sapiens
<220> FEATURE:
<221> NAME/KEY: gene
<222> LOCATION: (1)..(3495)
<223> OTHER INFORMATION: wild type TSC1

<400> SEQUENCE: 3
atggcccaac aagcaaatgt cggggagctt cttgccatgc tggactcccc catgctgggt      60
gtgcgggacg acgtgacagc tgtctttaaa gagaacctca attctgaccg tgccctatg     120 cttgtaaaca ccttggtgga ttattacctg gaaaccagct ctcagccggc attgcacatc     180
ctgaccacct tgcaagagcc acatgacaag cacctcttgg acaggattaa cgaatatgtg     240
ggcaaagccg ccactcgttt atccatcctc tcgttactgg tcatgtcat aagactgcag      300 ccatcttgga agcataagct ctctcaagca cctcttttgc cttctttact aaaatgtctc     360
aagatggaca ctgacgtcgt tgtcctcaca acaggcgtct tggtgttgat aaccatgcta     420
ccaatgattc cacagtctgg gaaacagcat cttcttgatt tctttgacat ttttggccgt     480
ctgtcatcat ggtgcctgaa gaaccaggc acgtggcgg aagtctatct cgtccatctc      540
catgccagtg tgtacgcact cttcatcgc ctttatggaa tgtacccttg caacttcgtc      600 tccttttgc gttctcatta cagtatgaaa gaaaacctgg agacttttga agaagtggtc     660
aagccaatga tggagcatgt gcgaattcat ccggaattag tgactggatc caaggaccat     720
gaactggacc ctcgaaggtg gaagagatta gaaactcatg atgttgtgat cgagtgtgcc     780
aaaatctctc tggatcccac agaagcctca tatgaagatg ctattctgt gtctcaccaa     840 atctcagccc gctttcctca tcgttcagcc gatgtcacca ccagcccta tgctgacaca     900 cagaatagct atgggtgtgc tacttctacc ccttactcca gtctcggct gatgttgta     960

-continued

```
aatatgccag ggcagctacc tcagactctg agttccccat cgacacggct gataactgaa    1020
ccaccacaag ctactctttg gagcccatct atggtttgtg gtatgaccac tcctccaact    1080
tctcctggaa atgtcccacc tgatctgtca caccttaca gtaaagtctt tggtacaact     1140
gcaggtggaa aaggaactcc tctgggaacc ccagcaacct ctcctcctcc agccccactc    1200
tgtcattcgg atgactacgt gcacatttca ctcccccagg ccacagtcac accccccagg    1260
aaggaagaga gaatggattc tgcaagacca tgtctacaca gacaacacca tcttctgaat    1320
gacagaggat cagaagagcc acctggcagc aaaggttctg tcactctaag tgatcttcca    1380 gggttttag gtgatctggc ctctgaagaa gatagtattg aaaaagataa agaagaagct     1440
gcaatatcta gagaactttc tgagatcacc acagcagagg cagagcctgt ggttcctcga    1500
ggaggctttg actctccctt ttaccgagac agtctcccag gttctcagcg gaagacccac    1560
tcggcagcct ccagttctca gggcgccagc gtgaaccctg agcctttaca ctcctccctg    1620
gacaagcttg ggcctgacac accaaagcaa gcctttactc ccatagacct gccctgcggc    1680
agtgctgatg aaagccctgc gggagacagg gaatgccaga cttctttgga gaccagtatc    1740
ttcactccca gtccttgtaa aattccacct ccgacgagag tgggctttgg aagcgggcag    1800
cctcccccgt atgatcatct ttttgaggtg gcattgccaa agacagccca tcattttgtc    1860
atcaggaaga ctgaggagct gttaaagaaa gcaaaggaa acacagagga agatggtgtg     1920
ccctctacct ccccaatgga agtgctggac agactgatac agcagggagc agacgcgcac    1980
agcaaggagc tgaacaagtt gcctttaccc agcaagtctg tcgactggac ccactttgga    2040
ggctctcctc cttcagatga gatccgcacc ctccgagacc agttgctttt actgcacaac    2100
cagttactct atgagcgttt taagaggcag cagcatgccc tccggaacag gcggctcctc    2160
cgcaaggtga tcaaagcagc agctctggag gaacataatg ctgccatgaa agatcagttg    2220
aagttacaag agaaggacat ccagatgtgg aaggttagtc tgcagaaaga acaagctaga    2280
tacaatcagc tccaggagca gcgtgacact atggtaacca agctccacag ccagatcaga    2340
cagctgcagc atgaccgaga ggaattctac aaccagagcc aggaattaca gacgaagctg    2400
gaggactgca ggaacatgat tgcggagctg cggatagaac tgaagaaggc caacaacaag    2460
gtgtgtcaca ctgagctgct gctcagtcag gtttcccaaa agctctcaaa cagtgagtcg    2520
gtccagcagc agatggagtt cttgaacagg cagctgttgg ttcttgggga ggtcaacgag    2580
ctctatttgg aacaactgca gaacaagcac tcagatacca caaggaagt agaaatgatg     2640 aaagccgcct atcggaaaga gctagaaaaa acagaagcc atgttctcca gcagactcag     2700
aggcttgata cctcccaaaa acggattttg gaactggaat ctcacctggc caagaaagac    2760
cacttctttt tggaacagaa gaaatatcta gaggatgtca aactccaggc aagaggacag    2820
ctgcaggccg cagagagcag gtatgaggct cagaaaagga taacccaggt gtttgaattg    2880
gagatcttag atttatatgg caggttggag aaagatggcc tcctgaaaaa acttgaagaa    2940
gaaaaagcag aagcagctga agcagcagaa gaaaggcttg actgttgtaa tgacgggtgc    3000
tcagattcca tggtagggca caatgaagag gcatctggcc acaacggtga gaccaagacc    3060
cccaggccca gcagcgcccg gggcagtagt ggaagcagag gtggtggagg cagcagcagc    3120
agcagcagcg agctttctac cccagagaaa cccccacacc agagggcagg cccattcagc    3180
agtcggtggg agacgactat gggagaagcg tctgccagca tccccaccac tgtgggctca    3240
cttcccagtt caaaaagctt cctgggtatg aaggctcgag agttatttcg taataagagc    3300
```

-continued

```
gagagccagt gtgatgagga cggcatgacc agtagccttt ctgagagcct aaagacagaa    3360
ctgggcaaag acttgggtgt ggaagccaag attcccctga acctagatgg ccctcacccg    3420
tctcccccga ccccggacag tgttggacag ctacatatca tggactacaa tgagactcat    3480
catgaacaca gctaa                                                     3495
```

<210> SEQ ID NO 4
<211> LENGTH: 1164
<212> TYPE: PRT
<213> ORGANISM: Homo sapiens
<220> FEATURE:
<221> NAME/KEY: PEPTIDE
<222> LOCATION: (1)..(1164)
<223> OTHER INFORMATION: wild type TSC1

<400> SEQUENCE: 4

```
Met Ala Gln Gln Ala Asn Val Gly Glu Leu Leu Ala Met Leu Asp Ser
1               5                   10                  15

Pro Met Leu Gly Val Arg Asp Asp Val Thr Ala Val Phe Lys Glu Asn
            20                  25                  30

Leu Asn Ser Asp Arg Gly Pro Met Leu Val Asn Thr Leu Val Asp Tyr
        35                  40                  45

Tyr Leu Glu Thr Ser Ser Gln Pro Ala Leu His Ile Leu Thr Thr Leu
    50                  55                  60

Gln Glu Pro His Asp Lys His Leu Leu Asp Arg Ile Asn Glu Tyr Val
65                  70                  75                  80

Gly Lys Ala Ala Thr Arg Leu Ser Ile Leu Ser Leu Leu Gly His Val
                85                  90                  95

Ile Arg Leu Gln Pro Ser Trp Lys His Lys Leu Ser Gln Ala Pro Leu
            100                 105                 110

Leu Pro Ser Leu Leu Lys Cys Leu Lys Met Asp Thr Asp Val Val Val
        115                 120                 125

Leu Thr Thr Gly Val Leu Val Leu Ile Thr Met Leu Pro Met Ile Pro
    130                 135                 140

Gln Ser Gly Lys Gln His Leu Leu Asp Phe Phe Asp Ile Phe Gly Arg
145                 150                 155                 160

Leu Ser Ser Trp Cys Leu Lys Lys Pro Gly His Val Ala Glu Val Tyr
                165                 170                 175

Leu Val His Leu His Ala Ser Val Tyr Ala Leu Phe His Arg Leu Tyr
            180                 185                 190

Gly Met Tyr Pro Cys Asn Phe Val Ser Phe Leu Arg Ser His Tyr Ser
        195                 200                 205

Met Lys Glu Asn Leu Glu Thr Phe Glu Glu Val Val Lys Pro Met Met
    210                 215                 220

Glu His Val Arg Ile His Pro Glu Leu Val Thr Gly Ser Lys Asp His
225                 230                 235                 240

Glu Leu Asp Pro Arg Arg Trp Lys Arg Leu Glu Thr His Asp Val Val
                245                 250                 255

Ile Glu Cys Ala Lys Ile Ser Leu Asp Pro Thr Glu Ala Ser Tyr Glu
            260                 265                 270

Asp Gly Tyr Ser Val Ser His Gln Ile Ser Ala Arg Phe Pro His Arg
        275                 280                 285

Ser Ala Asp Val Thr Thr Ser Pro Tyr Ala Asp Thr Gln Asn Ser Tyr
    290                 295                 300

Gly Cys Ala Thr Ser Thr Pro Tyr Ser Thr Ser Arg Leu Met Leu Leu
305                 310                 315                 320
```

```
Asn Met Pro Gly Gln Leu Pro Gln Thr Leu Ser Ser Pro Ser Thr Arg
            325                 330                 335

Leu Ile Thr Glu Pro Pro Gln Ala Thr Leu Trp Ser Pro Ser Met Val
            340                 345                 350

Cys Gly Met Thr Thr Pro Pro Thr Ser Pro Gly Asn Val Pro Pro Asp
            355                 360                 365

Leu Ser His Pro Tyr Ser Lys Val Phe Gly Thr Thr Ala Gly Gly Lys
            370                 375                 380

Gly Thr Pro Leu Gly Thr Pro Ala Thr Ser Pro Pro Ala Pro Leu
385                 390                 395                 400

Cys His Ser Asp Asp Tyr Val His Ile Ser Leu Pro Gln Ala Thr Val
            405                 410                 415

Thr Pro Pro Arg Lys Glu Glu Arg Met Asp Ser Ala Arg Pro Cys Leu
            420                 425                 430

His Arg Gln His His Leu Leu Asn Asp Arg Gly Ser Glu Glu Pro Pro
            435                 440                 445

Gly Ser Lys Gly Ser Val Thr Leu Ser Asp Leu Pro Gly Phe Leu Gly
            450                 455                 460

Asp Leu Ala Ser Glu Glu Asp Ser Ile Glu Lys Asp Lys Glu Glu Ala
465                 470                 475                 480

Ala Ile Ser Arg Glu Leu Ser Glu Ile Thr Thr Ala Glu Ala Glu Pro
            485                 490                 495

Val Val Pro Arg Gly Gly Phe Asp Ser Pro Phe Tyr Arg Asp Ser Leu
            500                 505                 510

Pro Gly Ser Gln Arg Lys Thr His Ser Ala Ala Ser Ser Ser Gln Gly
            515                 520                 525

Ala Ser Val Asn Pro Glu Pro Leu His Ser Ser Leu Asp Lys Leu Gly
            530                 535                 540

Pro Asp Thr Pro Lys Gln Ala Phe Thr Pro Ile Asp Leu Pro Cys Gly
545                 550                 555                 560

Ser Ala Asp Glu Ser Pro Ala Gly Asp Arg Glu Cys Gln Thr Ser Leu
            565                 570                 575

Glu Thr Ser Ile Phe Thr Pro Ser Pro Cys Lys Ile Pro Pro Pro Thr
            580                 585                 590

Arg Val Gly Phe Gly Ser Gly Gln Pro Pro Pro Tyr Asp His Leu Phe
            595                 600                 605

Glu Val Ala Leu Pro Lys Thr Ala His His Phe Val Ile Arg Lys Thr
            610                 615                 620

Glu Glu Leu Leu Lys Lys Ala Lys Gly Asn Thr Glu Glu Asp Gly Val
625                 630                 635                 640

Pro Ser Thr Ser Pro Met Glu Val Leu Asp Arg Leu Ile Gln Gln Gly
            645                 650                 655

Ala Asp Ala His Ser Lys Glu Leu Asn Lys Leu Pro Leu Pro Ser Lys
            660                 665                 670

Ser Val Asp Trp Thr His Phe Gly Gly Ser Pro Pro Ser Asp Glu Ile
            675                 680                 685

Arg Thr Leu Arg Asp Gln Leu Leu Leu His Asn Gln Leu Leu Tyr
            690                 695                 700

Glu Arg Phe Lys Arg Gln Gln His Ala Leu Arg Asn Arg Arg Leu Leu
705                 710                 715                 720

Arg Lys Val Ile Lys Ala Ala Ala Leu Glu Glu His Asn Ala Ala Met
            725                 730                 735
```

-continued

Lys Asp Gln Leu Lys Leu Gln Glu Lys Asp Ile Gln Met Trp Lys Val
            740                 745                 750

Ser Leu Gln Lys Glu Gln Ala Arg Tyr Asn Gln Leu Gln Glu Gln Arg
            755                 760                 765

Asp Thr Met Val Thr Lys Leu His Ser Gln Ile Arg Gln Leu Gln His
            770                 775                 780

Asp Arg Glu Glu Phe Tyr Asn Gln Ser Gln Glu Leu Gln Thr Lys Leu
785                 790                 795                 800

Glu Asp Cys Arg Asn Met Ile Ala Glu Leu Arg Ile Glu Leu Lys Lys
            805                 810                 815

Ala Asn Asn Lys Val Cys His Thr Glu Leu Leu Leu Ser Gln Val Ser
            820                 825                 830

Gln Lys Leu Ser Asn Ser Glu Ser Val Gln Gln Gln Met Glu Phe Leu
            835                 840                 845

Asn Arg Gln Leu Leu Val Leu Gly Glu Val Asn Glu Leu Tyr Leu Glu
            850                 855                 860

Gln Leu Gln Asn Lys His Ser Asp Thr Thr Lys Glu Val Glu Met Met
865                 870                 875                 880

Lys Ala Ala Tyr Arg Lys Glu Leu Glu Lys Asn Arg Ser His Val Leu
            885                 890                 895

Gln Gln Thr Gln Arg Leu Asp Thr Ser Gln Lys Arg Ile Leu Glu Leu
            900                 905                 910

Glu Ser His Leu Ala Lys Lys Asp His Leu Leu Leu Glu Gln Lys Lys
            915                 920                 925

Tyr Leu Glu Asp Val Lys Leu Gln Ala Arg Gly Gln Leu Gln Ala Ala
            930                 935                 940

Glu Ser Arg Tyr Glu Ala Gln Lys Arg Ile Thr Gln Val Phe Glu Leu
945                 950                 955                 960

Glu Ile Leu Asp Leu Tyr Gly Arg Leu Glu Lys Asp Gly Leu Leu Lys
            965                 970                 975

Lys Leu Glu Glu Glu Lys Ala Glu Ala Ala Glu Ala Glu Glu Arg
            980                 985                 990

Leu Asp Cys Cys Asn Asp Gly Cys Ser Asp Ser Met Val Gly His Asn
            995                 1000                1005

Glu Glu Ala Ser Gly His Asn Gly Glu Thr Lys Thr Pro Arg Pro Ser
            1010                1015                1020

Ser Ala Arg Gly Ser Ser Gly Ser Arg Gly Gly Gly Ser Ser Ser
1025                1030                1035                1040

Ser Ser Ser Glu Leu Ser Thr Pro Glu Lys Pro Pro His Gln Arg Ala
            1045                1050                1055

Gly Pro Phe Ser Ser Arg Trp Glu Thr Thr Met Gly Glu Ala Ser Ala
            1060                1065                1070

Ser Ile Pro Thr Thr Val Gly Ser Leu Pro Ser Ser Lys Ser Phe Leu
            1075                1080                1085

Gly Met Lys Ala Arg Glu Leu Phe Arg Asn Lys Ser Glu Ser Gln Cys
            1090                1095                1100

Asp Glu Asp Gly Met Thr Ser Ser Leu Ser Glu Ser Leu Lys Thr Glu
1105                1110                1115                1120

Leu Gly Lys Asp Leu Gly Val Glu Ala Lys Ile Pro Leu Asn Leu Asp
            1125                1130                1135

Gly Pro His Pro Ser Pro Pro Thr Pro Asp Ser Val Gly Gln Leu His
            1140                1145                1150

Ile Met Asp Tyr Asn Glu Thr His His Glu His Ser 1155        1160

<210> SEQ ID NO 5
<211> LENGTH: 5424
<212> TYPE: DNA
<213> ORGANISM: Homo sapiens
<220> FEATURE:
<221> NAME/KEY: gene
<222> LOCATION: (1)..(5424)
<223> OTHER INFORMATION: wild type TSC2

<400> SEQUENCE: 5

| | |
|---|---|
| atggccaaac caacaagcaa agattcaggc ttgaaggaga agtttaagat tctgttggga | 60 |
| ctgggaacac cgaggccaaa tcccaggtct gcagagggta acagacgga gtttatcatc | 120 |
| accgcggaaa tactgagaga actgagcatg aatgtggcc tcaacaatcg catccggatg | 180 |
| ataggggcaga tttgtgaagt cgcaaaaacc aagaaatttg aagagcacgc agtggaagca | 240 |
| ctctggaagg cggtcgcgga tctgttgcag ccggagcggc cgctggaggc ccggcacgcg | 300 |
| gtgctggctc tgctgaaggc catcgtgcag gggcagggcg agcgtttggg ggtcctcaga | 360 |
| gccctcttct ttaaggtcat caaggattac ccttccaacg aagaccttca cgaaaggctg | 420 |
| gaggttttca aggccctcac agacaatggg agacacatca cctacttgga ggaagagctg | 480 |
| gctgactttg tcctgcagtg gatggatgtt ggcttgtcct cggaattcct tctggtgctg | 540 |
| gtgaacttgg tcaaattcaa tagctgttac ctcgacgagt acatcgcaag gatggttcag | 600 |
| atgatctgtc tgctgtgcgt ccggaccgcg tcctctgtgg acatagaggt ctccctgcag | 660 |
| gtgctggacg ccgtggtctg ctacaactgc ctgccggctg agagcctccc gctgttcatc | 720 |
| gttaccctct gtcgcaccat caacgtcaag gagctctgcg agccttgctg gaagctgatg | 780 |
| cggaaccctc ttggcaccca cctgggccac agcgccatct acaacatgtg ccacctcatg | 840 |
| gaggacagag cctacatgga ggacgcgccc ctgctgagag agccgtgtt ttttgtgggc | 900 |
| atggctctct ggggagccca ccggctctat tctctcagga actcgccgac atctgtgttg | 960 |
| ccatcatttt accaggccat ggcatgtccg aacgaggtgg tgtcctatga tcgtcctg | 1020 |
| tccatcacca ggctcatcaa gaagtatagg aaggagctcc aggtggtggc gtgggacatt | 1080 |
| ctgctgaaca tcatcgaacg gctccttcag cagctccaga ccttggacag cccggagctc | 1140 |
| aggaccatcg tccatgacct gttgaccacg gtggaggagc tgtgtgacca aacgagttc | 1200 |
| cacgggtctc aggagagata ctttgaactg gtggagagat gtgcggacca gaggcctgag | 1260 |
| tcctcccctc tgaacctgat ctcctataga gcgcagtcca tccacccggc caaggacggc | 1320 |
| tggattcaga acctgcaggc gctgatggag agattcttca ggagcgagtc ccgaggcgcc | 1380 |
| gtgcgcatca aggtgctgga cgtgctgtcc tttgtgctgc tcatcaacag gcagttctat | 1440 |
| gaggaggagc tgattaactc agtggtcatc tcgcagctct cccacatccc cgaggataaa | 1500 |
| gaccaccagg tccgaaagct ggccacccag ttgctggtgg acctggcaga gggctgccac | 1560 |
| acacaccact tcaacagcct gctggacatc atcgagaagg tgatggcccg ctccctctcc | 1620 |
| ccaccccgg agctggaaga aagggatgtg gccgcatact cggcctcctt ggaggatgtg | 1680 |
| aagacagccg tcctggggct tctggtcatc cttcagacca gctgtacac cctgcctgca | 1740 |
| agccacgcca cgcgtgtgta tgagatgctg gtcagccaca ttcagctcca ctacaagcac | 1800 |
| agctacaccc tgccaatcgc gagcagcatc cggctgcagg cctttgactt cctgttgctg | 1860 |
| ctgcgggcca actcactgca ccgcctgggc ctgcccaaca aggatggagt cgtgcggttc | 1920 |
| agcccctact gcgtctgcga ctacatggag ccagagagag gctctgagaa gaagaccagc | 1980 |

```
ggccccottt ctcctcccac agggcctcct ggcccggcgc ctgcaggccc cgccgtgcgg    2040
ctggggtccg tgccctactc cctgctcttc cgcgtcctgc tgcagtgctt gaagcaggag    2100
tctgactgga aggtgctgaa gctggttctg ggcaggctgc ctgagtccct cgctataaa     2160 gtgctcatct ttacttcccc ttgcagtgtg accagctgt gctctgctct ctgctccatg     2220
cttccaggcc caaagacact ggagcggctc cgaggcgccc cagaaggctt ctccagaact    2280
gacttgcacc tggccgtggt tccagtgctg acagcattaa tctcttacca taactacctg    2340
gacaaaacca acagcgcga gatggtctac tgcctggagc agggcctcat ccaccgctgt     2400
gccagccagt gcgtcgtggc cttgtccatc tgcagcgtgg agatgcctga catcatcatc    2460
aaggcgctgc ctgttctggt ggtgaagctc acgcacatct cagccacagc cagcatggcc    2520
gtcccactgc tggagttcct gtccactctg gccaggctgc cgcacctcta caggaacttt    2580
gccgcggagc agtatgccag tgtgttcgcc atctccctgc cgtacaccaa cccctccaag    2640
tttaatcagt acatcgtgtg tctggcccat cacgtcatag ccatgtggtt catcaggtgc    2700
cgcctgccct tccggaagga ttttgtccct ttcatcacta agggcctgcg gtccaatgtc    2760
ctcttgtctt ttgatgacac ccccgagaag gacagcttca gggcccggag tactagtctc    2820
aacgagagac ccaagagtct gaggatagcc agaccccca  acaaggcttt gaataactct    2880
ccacccgtga agaattcaa  ggagagctct gcagccgagg ccttccggtg ccgcagcatc    2940
agtgtgtctg aacatgtggt ccgcagcagg atacagacgt ccctcaccag tgccagcttg    3000
gggtctgcag atgagaactc cgtggcccag gctgacgata gcctgaaaaa cctccacctg    3060
gagctcacgg aaacctgtct ggacatgatg gctcgatacg tcttctccaa cttcacggct    3120
gtcccgaaga ggtctcctgt gggcgagttc ctcctagcgg gtggcaggac caaaacctgg    3180
ctggttggga acaagcttgt cactgtgacg acaagcgtgg gaaccgggac ccggtcgtta    3240
ctaggcctgg actcgggga  gctgcagtcc ggcccggagt cgagctccag ccccggggtg    3300
catgtgagac agaccaagga ggcgccggcc aagctggagt cccaggctgg gcagcaggtg    3360
tcccgtgggg cccgggatcg ggtccgttcc atgtcggggg ccatggtct  tcgagttggc    3420 gccctggacg tgccggcctc ccagttcctg ggcagtgcca cttctccagg accacggact    3480
gcaccagccg cgaaacctga gaaggcctca gctggcaccc gggttcctgt gcaggagaag    3540
acgaacctgg cggcctatgt gccctgctg  acccagggct gggcggagat cctggtccgg    3600
aggcccacag ggaacaccag ctggctgatg agcctggaga cccgctcag  cctttctcc     3660 tcggacatca caacatgcc  cctgcaggag ctgtctaacg ccctcatggc ggctgagcgc    3720
ttcaaggagc accgggacac agccctgtac aagtcactgt cggtgccggc agccagcacg    3780
gccaaacccc ctcctctgcc tcgctccaac acagtggcct cttctcctc  cctgtaccag    3840 tccagctgcc aaggacagct gcacaggagc gtttcctggg cagactccgc cgtggtcatg    3900
gaggagggaa gtccgggcga ggttcctgtg ctggtggagc ccccagggtt ggaggacgtt    3960
gaggcagcgc taggcatgga caggcgcacg gatgcctaca gcaggtcgtc ctcagtctcc    4020
agccaggagg agaagtcgct ccacgcggag gagctggttg gcaggggcat ccccatcgag    4080
cgagtcgtct cctcggaggg tggccggccc tctgtgacc  tctccttcca gccctcgcag    4140
cccctgagca gtccagctc  ctctcccgag ctgcagactc tgcaggacat cctcggggac    4200
cctgggacaa aggccgacgt gggccggctg agccctgagg ttaaggcccg gtcacagtca    4260
gggaccctgg acggggaaag tgctgcctgg tcggcctcgg gcgaagacag tcggggccag    4320
```

-continued

```
cccgagggtc ccttgccttc cagctcccc cgctcgccca gtggcctccg gccccgaggt    4380
tacaccatct ccgactcggc cccatcacgc aggggcaaga gagtagagag ggacgcctta    4440
aagagcagag ccacagcctc caatgcagag aaagtgccag gcatcaaccc cagtttcgtg    4500
ttcctgcagc tctaccattc cccttctttt ggcgacgagt caaacaagcc aatcctgctg    4560
cccaatgagt cacagtcctt tgagcggtcg gtgcagctcc tcgaccagat cccatcatac    4620
gacacccaca agatcgccgt cctgtatgtt ggagaaggcc agagcaacag cgagctcgcc    4680
atcctgtcca atgagcatgg ctcctacagg tacacggagt tcctgacggg cctgggccgg    4740
ctcatcgagc tgaaggactg ccagccggac aaggtgtacc tgggaggcct ggacgtgtgt    4800
ggtgaggacg gccagttcac ctactgctgg cacgatgaca tcatgcaagc cgtcttccac    4860
atcgccaccc tgatgcccac caaggacgtg gacaagcacc gctgcgacaa gaagcgccac    4920
ctgggcaacg actttgtgtc cattgtctac aatgactccg gtgaggactt caagcttggc    4980
accatcaagg gccagttcaa ctttgtccac gtgatcgtca ccccgctgga ctacgagtgc    5040
aacctggtgt ccctgcagtg caggaaagac atggagggcc ttgtggacac cagcgtggcc    5100
aagatcgtgt ctgaccgcaa cctgcccttc gtggcccgcc agatggccct gcacgcaaat    5160
atggcctcac aggtgcatca tagccgctcc aaccccaccg atatctaccc ctccaagtgg    5220
attgcccggc tccgccacat caagcggctc cgccagcgga tctgcgagga agccgcctac    5280
tccaacccca gcctacctct ggtgcaccct ccgtcccata gcaaagcccc tgcacagact    5340
ccagccgagc ccacacctgg ctatgaggtg ggccagcgga agcgcctcat ctcctcggtg    5400
gaggacttca ccgagtttgt gtga                                          5424
```

<210> SEQ ID NO 6
<211> LENGTH: 1807
<212> TYPE: PRT
<213> ORGANISM: Homo sapiens
<220> FEATURE:
<221> NAME/KEY: PEPTIDE
<222> LOCATION: (1)..(1807)
<223> OTHER INFORMATION: wild type TSC2

<400> SEQUENCE: 6

```
Met Ala Lys Pro Thr Ser Lys Asp Ser Gly Leu Lys Glu Lys Phe Lys
1               5                   10                  15

Ile Leu Leu Gly Leu Gly Thr Pro Arg Pro Asn Pro Arg Ser Ala Glu
            20                  25                  30

Gly Lys Gln Thr Glu Phe Ile Ile Thr Ala Glu Ile Leu Arg Glu Leu
        35                  40                  45

Ser Met Glu Cys Gly Leu Asn Asn Arg Ile Arg Met Ile Gly Gln Ile
    50                  55                  60

Cys Glu Val Ala Lys Thr Lys Lys Phe Glu Glu His Ala Val Glu Ala
65                  70                  75                  80

Leu Trp Lys Ala Val Ala Asp Leu Leu Gln Pro Glu Arg Pro Leu Glu
                85                  90                  95

Ala Arg His Ala Val Leu Ala Leu Leu Lys Ala Ile Val Gln Gly Gln
            100                 105                 110

Gly Glu Arg Leu Gly Val Leu Arg Ala Leu Phe Phe Lys Val Ile Lys
        115                 120                 125

Asp Tyr Pro Ser Asn Glu Asp Leu His Glu Arg Leu Glu Val Phe Lys
    130                 135                 140

Ala Leu Thr Asp Asn Gly Arg His Ile Thr Tyr Leu Glu Glu Glu Leu
145                 150                 155                 160
```

```
Ala Asp Phe Val Leu Gln Trp Met Asp Val Gly Leu Ser Ser Glu Phe
            165                 170                 175

Leu Leu Val Leu Val Asn Leu Val Lys Phe Asn Ser Cys Tyr Leu Asp
            180                 185                 190

Glu Tyr Ile Ala Arg Met Val Gln Met Ile Cys Leu Leu Cys Val Arg
            195                 200                 205

Thr Ala Ser Ser Val Asp Ile Glu Val Ser Leu Gln Val Leu Asp Ala
            210                 215                 220

Val Val Cys Tyr Asn Cys Leu Pro Ala Glu Ser Leu Pro Leu Phe Ile
225                 230                 235                 240

Val Thr Leu Cys Arg Thr Ile Asn Val Lys Glu Leu Cys Glu Pro Cys
            245                 250                 255

Trp Lys Leu Met Arg Asn Leu Leu Gly Thr His Leu Gly His Ser Ala
            260                 265                 270

Ile Tyr Asn Met Cys His Leu Met Glu Asp Arg Ala Tyr Met Glu Asp
            275                 280                 285

Ala Pro Leu Leu Arg Gly Ala Val Phe Phe Val Gly Met Ala Leu Trp
            290                 295                 300

Gly Ala His Arg Leu Tyr Ser Leu Arg Asn Ser Pro Thr Ser Val Leu
305                 310                 315                 320

Pro Ser Phe Tyr Gln Ala Met Ala Cys Pro Asn Glu Val Val Ser Tyr
            325                 330                 335

Glu Ile Val Leu Ser Ile Thr Arg Leu Ile Lys Lys Tyr Arg Lys Glu
            340                 345                 350

Leu Gln Val Val Ala Trp Asp Ile Leu Leu Asn Ile Ile Glu Arg Leu
            355                 360                 365

Leu Gln Gln Leu Gln Thr Leu Asp Ser Pro Glu Leu Arg Thr Ile Val
            370                 375                 380

His Asp Leu Leu Thr Thr Val Glu Glu Leu Cys Asp Gln Asn Glu Phe
385                 390                 395                 400

His Gly Ser Gln Glu Arg Tyr Phe Glu Leu Val Glu Arg Cys Ala Asp
            405                 410                 415

Gln Arg Pro Glu Ser Ser Leu Leu Asn Leu Ile Ser Tyr Arg Ala Gln
            420                 425                 430

Ser Ile His Pro Ala Lys Asp Gly Trp Ile Gln Asn Leu Gln Ala Leu
            435                 440                 445

Met Glu Arg Phe Phe Arg Ser Glu Ser Arg Gly Ala Val Arg Ile Lys
            450                 455                 460

Val Leu Asp Val Leu Ser Phe Val Leu Leu Ile Asn Arg Gln Phe Tyr
465                 470                 475                 480

Glu Glu Glu Leu Ile Asn Ser Val Val Ile Ser Gln Leu Ser His Ile
            485                 490                 495

Pro Glu Asp Lys Asp His Gln Val Arg Lys Leu Ala Thr Gln Leu Leu
            500                 505                 510

Val Asp Leu Ala Glu Gly Cys His Thr His Phe Asn Ser Leu Leu
            515                 520                 525

Asp Ile Ile Glu Lys Val Met Ala Arg Ser Leu Ser Pro Pro Glu
            530                 535                 540

Leu Glu Glu Arg Asp Val Ala Ala Tyr Ser Ala Ser Leu Glu Asp Val
545                 550                 555                 560

Lys Thr Ala Val Leu Gly Leu Leu Val Ile Leu Gln Thr Lys Leu Tyr
            565                 570                 575
```

-continued

```
Thr Leu Pro Ala Ser His Ala Thr Arg Val Tyr Glu Met Leu Val Ser
                580                 585                 590

His Ile Gln Leu His Tyr Lys His Ser Tyr Thr Leu Pro Ile Ala Ser
            595                 600                 605

Ser Ile Arg Leu Gln Ala Phe Asp Phe Leu Leu Leu Arg Ala Asp
        610                 615                 620

Ser Leu His Arg Leu Gly Leu Pro Asn Lys Asp Gly Val Val Arg Phe
625                 630                 635                 640

Ser Pro Tyr Cys Val Cys Asp Tyr Met Glu Pro Glu Arg Gly Ser Glu
                645                 650                 655

Lys Lys Thr Ser Gly Pro Leu Ser Pro Pro Thr Gly Pro Pro Gly Pro
            660                 665                 670

Ala Pro Ala Gly Pro Ala Val Arg Leu Gly Ser Val Pro Tyr Ser Leu
        675                 680                 685

Leu Phe Arg Val Leu Leu Gln Cys Leu Lys Gln Glu Ser Asp Trp Lys
690                 695                 700

Val Leu Lys Leu Val Leu Gly Arg Leu Pro Glu Ser Leu Arg Tyr Lys
705                 710                 715                 720

Val Leu Ile Phe Thr Ser Pro Cys Ser Val Asp Gln Leu Cys Ser Ala
                725                 730                 735

Leu Cys Ser Met Leu Ser Gly Pro Lys Thr Leu Glu Arg Leu Arg Gly
            740                 745                 750

Ala Pro Glu Gly Phe Ser Arg Thr Asp Leu His Leu Ala Val Val Pro
        755                 760                 765

Val Leu Thr Ala Leu Ile Ser Tyr His Asn Tyr Leu Asp Lys Thr Lys
        770                 775                 780

Gln Arg Glu Met Val Tyr Cys Leu Glu Gln Gly Leu Ile His Arg Cys
785                 790                 795                 800

Ala Ser Gln Cys Val Val Ala Leu Ser Ile Cys Ser Val Glu Met Pro
                805                 810                 815

Asp Ile Ile Ile Lys Ala Leu Pro Val Leu Val Val Lys Leu Thr His
            820                 825                 830

Ile Ser Ala Thr Ala Ser Met Ala Val Pro Leu Leu Glu Phe Leu Ser
        835                 840                 845

Thr Leu Ala Arg Leu Pro His Leu Tyr Arg Asn Phe Ala Ala Glu Gln
850                 855                 860

Tyr Ala Ser Val Phe Ala Ile Ser Leu Pro Tyr Thr Asn Pro Ser Lys
865                 870                 875                 880

Phe Asn Gln Tyr Ile Val Cys Leu Ala His His Val Ile Ala Met Trp
                885                 890                 895

Phe Ile Arg Cys Arg Leu Pro Phe Arg Lys Asp Phe Val Pro Phe Ile
            900                 905                 910

Thr Lys Gly Leu Arg Ser Asn Val Leu Leu Ser Phe Asp Asp Thr Pro
        915                 920                 925

Glu Lys Asp Ser Phe Arg Ala Arg Ser Thr Ser Leu Asn Glu Arg Pro
930                 935                 940

Lys Ser Leu Arg Ile Ala Arg Pro Pro Lys Gln Gly Leu Asn Asn Ser
945                 950                 955                 960

Pro Pro Val Lys Glu Phe Lys Glu Ser Ser Ala Ala Glu Ala Phe Arg
                965                 970                 975

Cys Arg Ser Ile Ser Val Ser Glu His Val Val Arg Ser Arg Ile Gln
            980                 985                 990

Thr Ser Leu Thr Ser Ala Ser Leu Gly Ser Ala Asp Glu Asn Ser Val
```

```
                995                1000              1005
Ala Gln Ala Asp Asp Ser Leu Lys Asn Leu His Leu Glu Leu Thr Glu
        1010            1015            1020

Thr Cys Leu Asp Met Met Ala Arg Tyr Val Phe Ser Asn Phe Thr Ala
1025            1030            1035            1040

Val Pro Lys Arg Ser Pro Val Gly Glu Phe Leu Leu Ala Gly Gly Arg
            1045            1050            1055

Thr Lys Thr Trp Leu Val Gly Asn Lys Leu Val Thr Val Thr Thr Ser
        1060            1065            1070

Val Gly Thr Gly Thr Arg Ser Leu Leu Gly Leu Asp Ser Gly Glu Leu
            1075            1080            1085

Gln Ser Gly Pro Glu Ser Ser Ser Pro Gly Val His Val Arg Gln
        1090            1095            1100

Thr Lys Glu Ala Pro Ala Lys Leu Glu Ser Gln Ala Gly Gln Gln Val
1105            1110            1115            1120

Ser Arg Gly Ala Arg Asp Arg Val Arg Ser Met Ser Gly Gly His Gly
            1125            1130            1135

Leu Arg Val Gly Ala Leu Asp Val Pro Ala Ser Gln Phe Leu Gly Ser
            1140            1145            1150

Ala Thr Ser Pro Gly Pro Arg Thr Ala Pro Ala Ala Lys Pro Glu Lys
            1155            1160            1165

Ala Ser Ala Gly Thr Arg Val Pro Val Gln Glu Lys Thr Asn Leu Ala
        1170            1175            1180

Ala Tyr Val Pro Leu Leu Thr Gln Gly Trp Ala Glu Ile Leu Val Arg
1185            1190            1195            1200

Arg Pro Thr Gly Asn Thr Ser Trp Leu Met Ser Leu Glu Asn Pro Leu
            1205            1210            1215

Ser Pro Phe Ser Ser Asp Ile Asn Asn Met Pro Leu Gln Glu Leu Ser
            1220            1225            1230

Asn Ala Leu Met Ala Ala Glu Arg Phe Lys Glu His Arg Asp Thr Ala
        1235            1240            1245

Leu Tyr Lys Ser Leu Ser Val Pro Ala Ala Ser Thr Ala Lys Pro Pro
        1250            1255            1260

Pro Leu Pro Arg Ser Asn Thr Val Ala Ser Phe Ser Ser Leu Tyr Gln
1265            1270            1275            1280

Ser Ser Cys Gln Gly Gln Leu His Arg Ser Val Ser Trp Ala Asp Ser
            1285            1290            1295

Ala Val Val Met Glu Glu Gly Ser Pro Gly Glu Val Pro Val Leu Val
            1300            1305            1310

Glu Pro Pro Gly Leu Glu Asp Val Glu Ala Ala Leu Gly Met Asp Arg
        1315            1320            1325

Arg Thr Asp Ala Tyr Ser Arg Ser Ser Ser Val Ser Ser Gln Glu Glu
            1330            1335            1340

Lys Ser Leu His Ala Glu Glu Leu Val Gly Arg Gly Ile Pro Ile Glu
1345            1350            1355            1360

Arg Val Val Ser Ser Glu Gly Gly Arg Pro Ser Val Asp Leu Ser Phe
            1365            1370            1375

Gln Pro Ser Gln Pro Leu Ser Lys Ser Ser Ser Pro Glu Leu Gln
            1380            1385            1390

Thr Leu Gln Asp Ile Leu Gly Asp Pro Gly Asp Lys Ala Asp Val Gly
        1395            1400            1405

Arg Leu Ser Pro Glu Val Lys Ala Arg Ser Gln Ser Gly Thr Leu Asp
        1410            1415            1420
```

Gly Glu Ser Ala Ala Trp Ser Ala Ser Gly Glu Asp Ser Arg Gly Gln
1425                1430                1435                1440

Pro Glu Gly Pro Leu Pro Ser Ser Ser Pro Arg Ser Pro Ser Gly Leu
            1445                1450                1455

Arg Pro Arg Gly Tyr Thr Ile Ser Asp Ser Ala Pro Ser Arg Arg Gly
            1460                1465                1470

Lys Arg Val Glu Arg Asp Ala Leu Lys Ser Arg Ala Thr Ala Ser Asn
        1475                1480                1485

Ala Glu Lys Val Pro Gly Ile Asn Pro Ser Phe Val Phe Leu Gln Leu
    1490                1495                1500

Tyr His Ser Pro Phe Phe Gly Asp Glu Ser Asn Lys Pro Ile Leu Leu
1505                1510                1515                1520

Pro Asn Glu Ser Gln Ser Phe Glu Arg Ser Val Gln Leu Leu Asp Gln
            1525                1530                1535

Ile Pro Ser Tyr Asp Thr His Lys Ile Ala Val Leu Tyr Val Gly Glu
            1540                1545                1550

Gly Gln Ser Asn Ser Glu Leu Ala Ile Leu Ser Asn Glu His Gly Ser
        1555                1560                1565

Tyr Arg Tyr Thr Glu Phe Leu Thr Gly Leu Gly Arg Leu Ile Glu Leu
    1570                1575                1580

Lys Asp Cys Gln Pro Asp Lys Val Tyr Leu Gly Gly Leu Asp Val Cys
1585                1590                1595                1600

Gly Glu Asp Gly Gln Phe Thr Tyr Cys Trp His Asp Ile Met Gln
            1605                1610                1615

Ala Val Phe His Ile Ala Thr Leu Met Pro Thr Lys Asp Val Asp Lys
            1620                1625                1630

His Arg Cys Asp Lys Lys Arg His Leu Gly Asn Asp Phe Val Ser Ile
        1635                1640                1645

Val Tyr Asn Asp Ser Gly Glu Asp Phe Lys Leu Gly Thr Ile Lys Gly
1650                1655                1660

Gln Phe Asn Phe Val His Val Ile Val Thr Pro Leu Asp Tyr Glu Cys
1665                1670                1675                1680

Asn Leu Val Ser Leu Gln Cys Arg Lys Asp Met Glu Gly Leu Val Asp
            1685                1690                1695

Thr Ser Val Ala Lys Ile Val Ser Asp Arg Asn Leu Pro Phe Val Ala
            1700                1705                1710

Arg Gln Met Ala Leu His Ala Asn Met Ala Ser Gln Val His His Ser
        1715                1720                1725

Arg Ser Asn Pro Thr Asp Ile Tyr Pro Ser Lys Trp Ile Ala Arg Leu
    1730                1735                1740

Arg His Ile Lys Arg Leu Arg Gln Arg Ile Cys Glu Glu Ala Ala Tyr
1745                1750                1755                1760

Ser Asn Pro Ser Leu Pro Leu Val His Pro Pro Ser His Ser Lys Ala
            1765                1770                1775

Pro Ala Gln Thr Pro Ala Glu Pro Thr Pro Gly Tyr Glu Val Gly Gln
            1780                1785                1790

Arg Lys Arg Leu Ile Ser Ser Val Glu Asp Phe Thr Glu Phe Val
        1795                1800                1805

<210> SEQ ID NO 7
<211> LENGTH: 1398
<212> TYPE: DNA
<213> ORGANISM: Homo sapiens
<220> FEATURE:

```
<221> NAME/KEY: gene
<222> LOCATION: (1)..(1398)
<223> OTHER INFORMATION: wild type AKT3

<400> SEQUENCE: 7
atgagcgatg ttaccattgt gaaagaaggt tgggttcaga agaggggaga atatataaaa     60
aactggaggc caagatactt cctttttgaag acagatggct cattcatagg atataaagag    120
aaacctcaag atgtggattt accttatccc ctcaacaact tttcagtggc aaaatgccag    180
ttaatgaaaa cagaacgacc aaagccaaac acatttataa tcagatgtct ccagtggact    240
actgttatag agagaacatt tcatgtagat actccagagg aaagggaaga atggacagaa    300
gctatccagg ctgtagcaga cagactgcag aggcaagaag aggagagaat gaattgtagt    360
ccaacttcac aaattgataa ataggagag gaagagatgg atgcctctac aacccatcat    420
aaaagaaaga caatgaatga ttttgactat ttgaaactac taggtaaagg cacttttggg    480
aaagttattt tggttcgaga gaaggcaagt ggaaaatact atgctatgaa gattctgaag    540
aaagaagtca ttattgcaaa ggatgaagtg gcacacactc taactgaaag cagagtatta    600
aagaacacta gacatccctt tttaacatcc ttgaaatatt ccttccagac aaaagaccgt    660
ttgtgttttg tgatggaata tgttaatggg ggcgagctgt ttttccattt gtcgagagag    720
cgggtgttct ctgaggaccg cacacgtttc tatggtgcag aaattgtctc tgccttggac    780
tatctacatt ccggaaagat tgtgtaccgt gatctcaagt tggagaatct aatgctggac    840
aaagatggcc acataaaaat tacagatttt ggactttgca agaagggat cacagatgca    900
gccaccatga gacattctg tggcactcca gaatatctgg caccagaggt gttagaagat    960
aatgactatg gccgagcagt agactggtgg ggcctagggg ttgtcatgta tgaaatgatg   1020
tgtgggaggt tacctttcta caaccaggac catgagaaac ttttgaatt aatattaatg   1080
gaagacatta aatttcctcg aacactctct tcagatgcaa atcattgct tcagggctc   1140
ttgataaagg atccaaataa acgccttggt ggaggaccag atgatgcaaa agaaattatg   1200
agacacagtt tcttctctgg agtaaactgg caagatgtat atgataaaaa gcttgtacct   1260
ccttttaaac ctcaagtaac atctgagaca gatactagat attttgatga agaatttaca   1320
gctcagacta ttacaataac accacctgaa aaatgtcagc aatcagattg tggcatgctg   1380
ggtaactgga aaaaataa                                                1398
```

<210> SEQ ID NO 8
<211> LENGTH: 465
<212> TYPE: PRT
<213> ORGANISM: Homo sapiens
<220> FEATURE:
<221> NAME/KEY: PEPTIDE
<222> LOCATION: (1)..(465)
<223> OTHER INFORMATION: wild type AKT3

<400> SEQUENCE: 8

Met Ser Asp Val Thr Ile Val Lys Glu Gly Trp Val Gln Lys Arg Gly
1               5                   10                  15

Glu Tyr Ile Lys Asn Trp Arg Pro Arg Tyr Phe Leu Leu Lys Thr Asp
            20                  25                  30

Gly Ser Phe Ile Gly Tyr Lys Glu Lys Pro Gln Asp Val Asp Leu Pro
        35                  40                  45

Tyr Pro Leu Asn Asn Phe Ser Val Ala Lys Cys Gln Leu Met Lys Thr
    50                  55                  60

Glu Arg Pro Lys Pro Asn Thr Phe Ile Ile Arg Cys Leu Gln Trp Thr

```
                65                  70                  75                  80
        Thr Val Ile Glu Arg Thr Phe His Val Asp Thr Pro Glu Arg Glu
                            85                  90                  95
        Glu Trp Thr Glu Ala Ile Gln Ala Val Ala Asp Arg Leu Gln Arg Gln
                        100                 105                 110
        Glu Glu Glu Arg Met Asn Cys Ser Pro Thr Ser Gln Ile Asp Asn Ile
                    115                 120                 125
        Gly Glu Glu Glu Met Asp Ala Ser Thr Thr His His Lys Arg Lys Thr
                130                 135                 140
        Met Asn Asp Phe Asp Tyr Leu Lys Leu Leu Gly Lys Gly Thr Phe Gly
        145                 150                 155                 160
        Lys Val Ile Leu Val Arg Glu Lys Ala Ser Gly Lys Tyr Tyr Ala Met
                        165                 170                 175
        Lys Ile Leu Lys Lys Glu Val Ile Ile Ala Lys Asp Glu Val Ala His
                    180                 185                 190
        Thr Leu Thr Glu Ser Arg Val Leu Lys Asn Thr Arg His Pro Phe Leu
                195                 200                 205
        Thr Ser Leu Lys Tyr Ser Phe Gln Thr Lys Asp Arg Leu Cys Phe Val
            210                 215                 220
        Met Glu Tyr Val Asn Gly Gly Glu Leu Phe Phe His Leu Ser Arg Glu
        225                 230                 235                 240
        Arg Val Phe Ser Glu Asp Arg Thr Arg Phe Tyr Gly Ala Glu Ile Val
                        245                 250                 255
        Ser Ala Leu Asp Tyr Leu His Ser Gly Lys Ile Val Tyr Arg Asp Leu
                    260                 265                 270
        Lys Leu Glu Asn Leu Met Leu Asp Lys Asp Gly His Ile Lys Ile Thr
                275                 280                 285
        Asp Phe Gly Leu Cys Lys Glu Gly Ile Thr Asp Ala Ala Thr Met Lys
            290                 295                 300
        Thr Phe Cys Gly Thr Pro Glu Tyr Leu Ala Pro Glu Val Leu Glu Asp
        305                 310                 315                 320
        Asn Asp Tyr Gly Arg Ala Val Asp Trp Trp Gly Leu Gly Val Val Met
                        325                 330                 335
        Tyr Glu Met Met Cys Gly Arg Leu Pro Phe Tyr Asn Gln Asp His Glu
                    340                 345                 350
        Lys Leu Phe Glu Leu Ile Leu Met Glu Asp Ile Lys Phe Pro Arg Thr
                355                 360                 365
        Leu Ser Ser Asp Ala Lys Ser Leu Leu Ser Gly Leu Leu Ile Lys Asp
            370                 375                 380
        Pro Asn Lys Arg Leu Gly Gly Gly Pro Asp Asp Ala Lys Glu Ile Met
        385                 390                 395                 400
        Arg His Ser Phe Phe Ser Gly Val Asn Trp Gln Asp Val Tyr Asp Lys
                        405                 410                 415
        Lys Leu Val Pro Pro Phe Lys Pro Gln Val Thr Ser Glu Thr Asp Thr
                    420                 425                 430
        Arg Tyr Phe Asp Glu Glu Phe Thr Ala Gln Thr Ile Thr Ile Thr Pro
                435                 440                 445
        Pro Glu Lys Cys Gln Gln Ser Asp Cys Gly Met Leu Gly Asn Trp Lys
            450                 455                 460
        Lys
        465

<210> SEQ ID NO 9
```

<211> LENGTH: 3207
<212> TYPE: DNA
<213> ORGANISM: Homo sapiens
<220> FEATURE:
<221> NAME/KEY: gene
<222> LOCATION: (1)..(3207)
<223> OTHER INFORMATION: wild type PIK3CA

<400> SEQUENCE: 9

| | | | | | |
|---|---|---|---|---|---|
| atgcctccac | gaccatcatc | aggtgaactg | tggggcatcc | acttgatgcc | cccaagaatc | 60 |
| ctagtagaat | gtttactacc | aaatggaatg | atagtgactt | tagaatgcct | ccgtgaggct | 120 |
| acattaataa | ccataaagca | tgaactattt | aaagaagcaa | gaaaataccc | cctccatcaa | 180 |
| cttcttcaag | atgaatcttc | ttacattttc | gtaagtgtta | ctcaagaagc | agaaagggaa | 240 |
| gaatttttg | atgaaacaag | acgactttgt | gaccttcggc | ttttttcaacc | cttttttaaaa | 300 |
| gtaattgaac | cagtaggcaa | ccgtgaagaa | aagatcctca | atcgagaaat | tggttttgct | 360 |
| atcggcatgc | cagtgtgtga | atttgatatg | gttaaagatc | cagaagtaca | ggacttccga | 420 |
| agaaatattc | tgaacgtttg | taaagaagct | gtggatctta | gggacctcaa | ttcacctcat | 480 |
| agtagagcaa | tgtatgtcta | tcctccaaat | gtagaatctt | caccagaatt | gccaaagcac | 540 |
| atatataata | aattagataa | agggcaaata | atagtggtga | tctgggtaat | agtttctcca | 600 |
| aataatgaca | agcagaagta | tactctgaaa | atcaaccatg | actgtgtacc | agaacaagta | 660 |
| attgctgaag | caatcaggaa | aaaaactcga | agtatgttgc | tatcctctga | caactaaaa | 720 |
| ctctgtgttt | tagaatatca | gggcaagtat | attttaaaag | tgtgtggatg | tgatgaatac | 780 |
| ttcctagaaa | aatatcctct | gagtcagtat | aagtatataa | gaagctgtat | aatgcttggg | 840 |
| aggatgccca | atttgatgtt | gatggctaaa | gaaagccttt | attctcaact | gccaatggac | 900 |
| tgttttacaa | tgccatctta | ttccagacgc | atttccacag | ctacaccata | tatgaatgga | 960 |
| gaaacatcta | caaaatccct | tgggttata | aatagtgcac | tcagaataaa | aattctttgt | 1020 |
| gcaacctacg | tgaatgtaaa | tattcgagac | attgataaga | tctatgttcg | aacaggtatc | 1080 |
| taccatggag | agaacccctt | atgtgacaat | gtgaacactc | aaagagtacc | ttgttccaat | 1140 |
| cccaggtgga | atgaatggct | gaattatgat | atatacattc | ctgatcttcc | tcgtgctgct | 1200 |
| cgactttgcc | tttccatttg | ctctgttaaa | ggccgaaagg | gtgctaaaga | ggaacactgt | 1260 |
| ccattggcat | gggaaatat | aaacttgttt | gattacacag | acactctagt | atctggaaaa | 1320 |
| atggctttga | atctttggcc | agtacctcat | ggattagaag | atttgctgaa | ccctattggt | 1380 |
| gttactggat | caaatccaaa | taagaaaact | ccatgcttag | agttggagtt | tgactggttc | 1440 |
| agcagtgtgg | taaagttccc | agatatgtca | gtgattgaag | agcatgccaa | ttggtctgta | 1500 |
| tcccgagaag | caggatttag | ctattccac | gcaggactga | gtaacagact | agctagagac | 1560 |
| aatgaattaa | gggaaaatga | caaagaacag | ctcaaagcaa | tttctacacg | agatcctctc | 1620 |
| tctgaaatca | ctgagcagga | gaaagatttt | ctatggagtc | acagacacta | ttgtgtaact | 1680 |
| atccccgaaa | ttctacccaa | attgcttctg | tctgttaaat | ggaattctag | agatgaagta | 1740 |
| gcccagatgt | attgcttggt | aaaagattgg | cctccaatca | aacctgaaca | ggctatggaa | 1800 |
| cttctggact | gtaattaccc | agatcctatg | gttcgaggtt | ttgctgttcg | gtgcttggaa | 1860 |
| aaatatttaa | cagatgacaa | actttctcag | tatttaattc | agctagtaca | ggtcctaaaa | 1920 |
| tatgaacaat | atttggataa | cttgcttgtg | agatttttac | tgaagaaagc | attgactaat | 1980 |
| caaaggattg | gcacttttt | cttttggcat | ttaaaatctg | atgcacaa | taaaacagtt | 2040 |
| agccagaggt | ttggcctgct | tttggagtcc | tattgtcgtg | catgtgggat | gtatttgaag | 2100 |

-continued

```
cacctgaata ggcaagtcga ggcaatggaa aagctcatta acttaactga cattctcaaa    2160
caggagaaga aggatgaaac acaaaaggta cagatgaagt ttttagttga gcaaatgagg    2220
cgaccagatt tcatggatgc tctacagggc tttctgtctc ctctaaaccc tgctcatcaa    2280
ctaggaaacc tcaggcttga agagtgtcga attatgtcct ctgcaaaaag gccactgtgg    2340
ttgaattggg agaacccaga catcatgtca gagttactgt ttcagaacaa tgagatcatc    2400
tttaaaaatg gggatgattt acggcaagat atgctaacac ttcaaattat tcgtattatg    2460
gaaaatatct ggcaaaatca aggtcttgat cttcgaatgt taccttatgg ttgtctgtca    2520
atcggtgact gtgtgggact tattgaggtg gtgcgaaatt ctcacactat tatgcaaatt    2580
cagtgcaaag gcggcttgaa aggtgcactg cagttcaaca gccacacact acatcagtgg    2640
ctcaaagaca gaacaaagg agaaatatat gatgcagcca ttgacctgtt tacacgttca    2700
tgtgctggat actgtgtagc taccttcatt ttgggaattg gagatcgtca caatagtaac    2760
atcatggtga agacgatgg acaactgttt catatagatt ttggacactt tttggatcac    2820
aagaagaaaa aatttggtta taaacgagaa cgtgtgccat ttgttttgac acaggatttc    2880
ttaatagtga ttagtaaagg agcccaagaa tgcacaaaga caagagaatt tgagaggttt    2940
caggagatgt gttacaaggc ttatctagct attcgacagc atgccaatct cttcataaat    3000
cttttctcaa tgatgcttgg ctctggaatg ccagaactac aatcttttga tgacattgca    3060
tacattcgaa agaccctagc cttagataaa actgagcaag aggctttgga gtatttcatg    3120
aaacaaatga atgatgcaca tcatggtggc tggacaacaa aaatggattg gatcttccac    3180
acaattaaac agcatgcatt gaactga                                       3207
```

<210> SEQ ID NO 10
<211> LENGTH: 1068
<212> TYPE: PRT
<213> ORGANISM: Homo sapiens
<220> FEATURE:
<221> NAME/KEY: PEPTIDE
<222> LOCATION: (1)..(1068)
<223> OTHER INFORMATION: wild type PIK3CA

<400> SEQUENCE: 10

```
Met Pro Pro Arg Pro Ser Ser Gly Glu Leu Trp Gly Ile His Leu Met
1               5                   10                  15

Pro Pro Arg Ile Leu Val Glu Cys Leu Leu Pro Asn Gly Met Ile Val
            20                  25                  30

Thr Leu Glu Cys Leu Arg Glu Ala Thr Leu Ile Thr Ile Lys His Glu
        35                  40                  45

Leu Phe Lys Glu Ala Arg Lys Tyr Pro Leu His Gln Leu Leu Gln Asp
    50                  55                  60

Glu Ser Ser Tyr Ile Phe Val Ser Val Thr Gln Glu Ala Glu Arg Glu
65                  70                  75                  80

Glu Phe Phe Asp Glu Thr Arg Arg Leu Cys Asp Leu Arg Leu Phe Gln
            85                  90                  95

Pro Phe Leu Lys Val Ile Glu Pro Val Gly Asn Arg Glu Glu Lys Ile
            100                 105                 110

Leu Asn Arg Glu Ile Gly Phe Ala Ile Gly Met Pro Val Cys Glu Phe
        115                 120                 125

Asp Met Val Lys Asp Pro Glu Val Gln Asp Phe Arg Arg Asn Ile Leu
    130                 135                 140

Asn Val Cys Lys Glu Ala Val Asp Leu Arg Asp Leu Asn Ser Pro His
```

```
                145                 150                 155                 160
Ser Arg Ala Met Tyr Val Tyr Pro Pro Asn Val Glu Ser Ser Pro Glu
                    165                 170                 175

Leu Pro Lys His Ile Tyr Asn Lys Leu Asp Lys Gly Gln Ile Ile Val
                    180                 185                 190

Val Ile Trp Val Ile Val Ser Pro Asn Asn Asp Lys Gln Lys Tyr Thr
                    195                 200                 205

Leu Lys Ile Asn His Asp Cys Val Pro Glu Gln Val Ile Ala Glu Ala
                    210                 215                 220

Ile Arg Lys Lys Thr Arg Ser Met Leu Leu Ser Ser Glu Gln Leu Lys
225                 230                 235                 240

Leu Cys Val Leu Glu Tyr Gln Gly Lys Tyr Ile Leu Lys Val Cys Gly
                    245                 250                 255

Cys Asp Glu Tyr Phe Leu Glu Lys Tyr Pro Leu Ser Gln Tyr Lys Tyr
                    260                 265                 270

Ile Arg Ser Cys Ile Met Leu Gly Arg Met Pro Asn Leu Met Leu Met
                    275                 280                 285

Ala Lys Glu Ser Leu Tyr Ser Gln Leu Pro Met Asp Cys Phe Thr Met
                    290                 295                 300

Pro Ser Tyr Ser Arg Arg Ile Ser Thr Ala Thr Pro Tyr Met Asn Gly
305                 310                 315                 320

Glu Thr Ser Thr Lys Ser Leu Trp Val Ile Asn Ser Ala Leu Arg Ile
                    325                 330                 335

Lys Ile Leu Cys Ala Thr Tyr Val Asn Val Asn Ile Arg Asp Ile Asp
                    340                 345                 350

Lys Ile Tyr Val Arg Thr Gly Ile Tyr His Gly Gly Glu Pro Leu Cys
                    355                 360                 365

Asp Asn Val Asn Thr Gln Arg Val Pro Cys Ser Asn Pro Arg Trp Asn
                    370                 375                 380

Glu Trp Leu Asn Tyr Asp Ile Tyr Ile Pro Asp Leu Pro Arg Ala Ala
385                 390                 395                 400

Arg Leu Cys Leu Ser Ile Cys Ser Val Lys Gly Arg Lys Gly Ala Lys
                    405                 410                 415

Glu Glu His Cys Pro Leu Ala Trp Gly Asn Ile Asn Leu Phe Asp Tyr
                    420                 425                 430

Thr Asp Thr Leu Val Ser Gly Lys Met Ala Leu Asn Leu Trp Pro Val
                    435                 440                 445

Pro His Gly Leu Glu Asp Leu Leu Asn Pro Ile Gly Val Thr Gly Ser
                    450                 455                 460

Asn Pro Asn Lys Glu Thr Pro Cys Leu Glu Leu Glu Phe Asp Trp Phe
465                 470                 475                 480

Ser Ser Val Val Lys Phe Pro Asp Met Ser Val Ile Glu Glu His Ala
                    485                 490                 495

Asn Trp Ser Val Ser Arg Glu Ala Gly Phe Ser Tyr Ser His Ala Gly
                    500                 505                 510

Leu Ser Asn Arg Leu Ala Arg Asp Asn Glu Leu Arg Glu Asn Asp Lys
                    515                 520                 525

Glu Gln Leu Lys Ala Ile Ser Thr Arg Asp Pro Leu Ser Glu Ile Thr
                    530                 535                 540

Glu Gln Glu Lys Asp Phe Leu Trp Ser His Arg His Tyr Cys Val Thr
545                 550                 555                 560

Ile Pro Glu Ile Leu Pro Lys Leu Leu Leu Ser Val Lys Trp Asn Ser
                    565                 570                 575
```

```
Arg Asp Glu Val Ala Gln Met Tyr Cys Leu Val Lys Asp Trp Pro Pro
            580                 585                 590

Ile Lys Pro Glu Gln Ala Met Glu Leu Leu Asp Cys Asn Tyr Pro Asp
        595                 600                 605

Pro Met Val Arg Gly Phe Ala Val Arg Cys Leu Glu Lys Tyr Leu Thr
        610                 615                 620

Asp Asp Lys Leu Ser Gln Tyr Leu Ile Gln Leu Val Gln Val Leu Lys
625                 630                 635                 640

Tyr Glu Gln Tyr Leu Asp Asn Leu Leu Val Arg Phe Leu Leu Lys Lys
                645                 650                 655

Ala Leu Thr Asn Gln Arg Ile Gly His Phe Phe Phe Trp His Leu Lys
            660                 665                 670

Ser Glu Met His Asn Lys Thr Val Ser Gln Arg Phe Gly Leu Leu Leu
        675                 680                 685

Glu Ser Tyr Cys Arg Ala Cys Gly Met Tyr Leu Lys His Leu Asn Arg
        690                 695                 700

Gln Val Glu Ala Met Glu Lys Leu Ile Asn Leu Thr Asp Ile Leu Lys
705                 710                 715                 720

Gln Glu Lys Lys Asp Glu Thr Gln Lys Val Gln Met Lys Phe Leu Val
                725                 730                 735

Glu Gln Met Arg Arg Pro Asp Phe Met Asp Ala Leu Gln Gly Phe Leu
            740                 745                 750

Ser Pro Leu Asn Pro Ala His Gln Leu Gly Asn Leu Arg Leu Glu Glu
        755                 760                 765

Cys Arg Ile Met Ser Ser Ala Lys Arg Pro Leu Trp Leu Asn Trp Glu
        770                 775                 780

Asn Pro Asp Ile Met Ser Glu Leu Leu Phe Gln Asn Asn Glu Ile Ile
785                 790                 795                 800

Phe Lys Asn Gly Asp Asp Leu Arg Gln Asp Met Leu Thr Leu Gln Ile
                805                 810                 815

Ile Arg Ile Met Glu Asn Ile Trp Gln Asn Gln Gly Leu Asp Leu Arg
            820                 825                 830

Met Leu Pro Tyr Gly Cys Leu Ser Ile Gly Asp Cys Val Gly Leu Ile
        835                 840                 845

Glu Val Val Arg Asn Ser His Thr Ile Met Gln Ile Gln Cys Lys Gly
        850                 855                 860

Gly Leu Lys Gly Ala Leu Gln Phe Asn Ser His Thr Leu His Gln Trp
865                 870                 875                 880

Leu Lys Asp Lys Asn Lys Gly Glu Ile Tyr Asp Ala Ala Ile Asp Leu
                885                 890                 895

Phe Thr Arg Ser Cys Ala Gly Tyr Cys Val Ala Thr Phe Ile Leu Gly
            900                 905                 910

Ile Gly Asp Arg His Asn Ser Asn Ile Met Val Lys Asp Asp Gly Gln
        915                 920                 925

Leu Phe His Ile Asp Phe Gly His Phe Leu Asp His Lys Lys Lys Lys
        930                 935                 940

Phe Gly Tyr Lys Arg Glu Arg Val Pro Phe Val Leu Thr Gln Asp Phe
945                 950                 955                 960

Leu Ile Val Ile Ser Lys Gly Ala Gln Glu Cys Thr Lys Thr Arg Glu
                965                 970                 975

Phe Glu Arg Phe Gln Glu Met Cys Tyr Lys Ala Tyr Leu Ala Ile Arg
            980                 985                 990
```

-continued

```
Gln His Ala Asn Leu Phe Ile Asn Leu Phe Ser Met Met Leu Gly Ser
            995                 1000                1005

Gly Met Pro Glu Leu Gln Ser Phe Asp Asp Ile Ala Tyr Ile Arg Lys
        1010                1015                1020

Thr Leu Ala Leu Asp Lys Thr Glu Gln Glu Ala Leu Glu Tyr Phe Met
1025                1030                1035                1040

Lys Gln Met Asn Asp Ala His His Gly Gly Trp Thr Thr Lys Met Asp
            1045                1050                1055

Trp Ile Phe His Thr Ile Lys Gln His Ala Leu Asn
        1060                1065

<210> SEQ ID NO 11
<211> LENGTH: 20
<212> TYPE: DNA
<213> ORGANISM: Artificial Sequence
<220> FEATURE:
<223> OTHER INFORMATION: C1483 sense primer

<400> SEQUENCE: 11
taggttacag gcctggatgg                                            20

<210> SEQ ID NO 12
<211> LENGTH: 20
<212> TYPE: DNA
<213> ORGANISM: Artificial Sequence
<220> FEATURE:
<223> OTHER INFORMATION: C1483 antisense primer

<400> SEQUENCE: 12
cttggcctcc caaaatgtta                                            20

<210> SEQ ID NO 13
<211> LENGTH: 21
<212> TYPE: DNA
<213> ORGANISM: Artificial Sequence
<220> FEATURE:
<223> OTHER INFORMATION: L2427 sense primer

<400> SEQUENCE: 13
tccaggctac ctggtatgag a                                          21

<210> SEQ ID NO 14
<211> LENGTH: 20
<212> TYPE: DNA
<213> ORGANISM: Artificial Sequence
<220> FEATURE:
<223> OTHER INFORMATION: L2427 antisense primer

<400> SEQUENCE: 14
gccttccttt caaatccaaa                                            20

<210> SEQ ID NO 15
<211> LENGTH: 36
<212> TYPE: DNA
<213> ORGANISM: Artificial Sequence
<220> FEATURE:
<223> OTHER INFORMATION: annealing forward primer for pCIG-mTOR mutant-
      IRES-EGFP

<400> SEQUENCE: 15
aattccaatt gcccgggctt aagatcgata cgcgta                          36

<210> SEQ ID NO 16
<211> LENGTH: 36
```

```
<212> TYPE: DNA
<213> ORGANISM: Artificial Sequence
<220> FEATURE:
<223> OTHER INFORMATION: annealing reverse primer for pCIG-mTOR mutant-
      IRES-EGFP

<400> SEQUENCE: 16
ccggtacgcg tatcgatctt aagcccgggc aattgg                              36

<210> SEQ ID NO 17
<211> LENGTH: 50
<212> TYPE: DNA
<213> ORGANISM: Artificial Sequence
<220> FEATURE:
<223> OTHER INFORMATION: forward primer for pCIG-mTOR mutant-IRES-EGFP

<400> SEQUENCE: 17
gatcacaatt gtggccacca tggactacaa ggacgacgat gacaagatgc               50

<210> SEQ ID NO 18
<211> LENGTH: 41
<212> TYPE: DNA
<213> ORGANISM: Artificial Sequence
<220> FEATURE:
<223> OTHER INFORMATION: reverse primer for pCIG-mTOR mutant-IRES-EGFP

<400> SEQUENCE: 18
tgatcaacgc gtttaccaga aagggcacca gccaatatag c                        41

<210> SEQ ID NO 19
<211> LENGTH: 33
<212> TYPE: DNA
<213> ORGANISM: Artificial Sequence
<220> FEATURE:
<223> OTHER INFORMATION: Y1450D sense primer

<400> SEQUENCE: 19
tcgtgcagtt tctcatccca ggtagcctgg atc                                 33

<210> SEQ ID NO 20
<211> LENGTH: 33
<212> TYPE: DNA
<213> ORGANISM: Artificial Sequence
<220> FEATURE:
<223> OTHER INFORMATION: Y1450D antisense primer

<400> SEQUENCE: 20
gatccaggct acctgggatg agaaactgca cga                                 33

<210> SEQ ID NO 21
<211> LENGTH: 23
<212> TYPE: DNA
<213> ORGANISM: Artificial Sequence
<220> FEATURE:
<223> OTHER INFORMATION: C1483R sense primer

<400> SEQUENCE: 21
ggcctcgagg cggcgcatgc ggc                                            23

<210> SEQ ID NO 22
<211> LENGTH: 23
<212> TYPE: DNA
<213> ORGANISM: Artificial Sequence
<220> FEATURE:
<223> OTHER INFORMATION: C1483R antisense primer

<400> SEQUENCE: 22
```
gccgcatgcg ccgcctcgag gcc                                                  23

<210> SEQ ID NO 23
<211> LENGTH: 33
<212> TYPE: DNA
<213> ORGANISM: Artificial Sequence
<220> FEATURE:
<223> OTHER INFORMATION: L2427Q sense primer

<400> SEQUENCE: 23
gtctatgacc ccttgcagaa ctggaggctg atg                                       33

<210> SEQ ID NO 24
<211> LENGTH: 33
<212> TYPE: DNA
<213> ORGANISM: Artificial Sequence
<220> FEATURE:
<223> OTHER INFORMATION: L2427Q antisense primer

<400> SEQUENCE: 24
catcagcctc cagttctgca aggggtcata gac                                       33

<210> SEQ ID NO 25
<211> LENGTH: 33
<212> TYPE: DNA
<213> ORGANISM: Artificial Sequence
<220> FEATURE:
<223> OTHER INFORMATION: L2427P sense primer

<400> SEQUENCE: 25
gtctatgacc ccttgccgaa ctggaggctg atg                                       33

<210> SEQ ID NO 26
<211> LENGTH: 33
<212> TYPE: DNA
<213> ORGANISM: Artificial Sequence
<220> FEATURE:
<223> OTHER INFORMATION: L2427P antisense primer

<400> SEQUENCE: 26
catcagcctc cagttcggca aggggtcata gac                                       33

<210> SEQ ID NO 27
<211> LENGTH: 21
<212> TYPE: DNA
<213> ORGANISM: Artificial Sequence
<220> FEATURE:
<223> OTHER INFORMATION: 7280T sense primer

<400> SEQUENCE: 27
cccaggcact tgatgatact c                                                    21

<210> SEQ ID NO 28
<211> LENGTH: 20
<212> TYPE: DNA
<213> ORGANISM: Artificial Sequence
<220> FEATURE:
<223> OTHER INFORMATION: 7280T antisense primer

<400> SEQUENCE: 28
cttgctttgg gtggagagtt                                                      20

<210> SEQ ID NO 29
<211> LENGTH: 27
<212> TYPE: DNA

```
<213> ORGANISM: Artificial Sequence
<220> FEATURE:
<223> OTHER INFORMATION: TSC-1 R22W-F primer

<400> SEQUENCE: 29
gtcacgtcgt cccacacacc cagcatg                                    27

<210> SEQ ID NO 30
<211> LENGTH: 27
<212> TYPE: DNA
<213> ORGANISM: Artificial Sequence
<220> FEATURE:
<223> OTHER INFORMATION: TSC-1 R22W-R primer

<400> SEQUENCE: 30
catgctgggt gtgtgggacg acgtgac                                    27

<210> SEQ ID NO 31
<211> LENGTH: 43
<212> TYPE: DNA
<213> ORGANISM: Artificial Sequence
<220> FEATURE:
<223> OTHER INFORMATION: TSC-1 R204C-F primer

<400> SEQUENCE: 31
ctttcatact gtaatgagaa cacaaaaagg agacgaagtt gca                  43

<210> SEQ ID NO 32
<211> LENGTH: 43
<212> TYPE: DNA
<213> ORGANISM: Artificial Sequence
<220> FEATURE:
<223> OTHER INFORMATION: TSC-1 R204C-R primer

<400> SEQUENCE: 32
tgcaacttcg tctccttttt gtgttctcat tacagtatga aag                  43

<210> SEQ ID NO 33
<211> LENGTH: 33
<212> TYPE: DNA
<213> ORGANISM: Artificial Sequence
<220> FEATURE:
<223> OTHER INFORMATION: TSC-2 V1547I-F primer

<400> SEQUENCE: 33
tctccaacat acaggatggc gatcttgtgg gtg                             33

<210> SEQ ID NO 34
<211> LENGTH: 33
<212> TYPE: DNA
<213> ORGANISM: Artificial Sequence
<220> FEATURE:
<223> OTHER INFORMATION: TSC-2 V1547I-R primer

<400> SEQUENCE: 34
cacccacaag atcgccatcc tgtatgttgg aga                             33

<210> SEQ ID NO 35
<211> LENGTH: 35
<212> TYPE: DNA
<213> ORGANISM: Artificial Sequence
<220> FEATURE:
<223> OTHER INFORMATION: AKT3 R247H-F primer

<400> SEQUENCE: 35
caccatagaa acgtgtgtgg tcctcagaga acacc                           35
```

```
<210> SEQ ID NO 36
<211> LENGTH: 35
<212> TYPE: DNA
<213> ORGANISM: Artificial Sequence
<220> FEATURE:
<223> OTHER INFORMATION: AKT3 R247H-R primer

<400> SEQUENCE: 36
ggtgttctct gaggaccaca cacgtttcta tggtg                               35

<210> SEQ ID NO 37
<211> LENGTH: 20
<212> TYPE: DNA
<213> ORGANISM: Artificial Sequence
<220> FEATURE:
<223> OTHER INFORMATION: DNA sequence corresponding to TSC1 targetting
      sgRNA

<400> SEQUENCE: 37
tgctggactc ctccacactg                                                20

<210> SEQ ID NO 38
<211> LENGTH: 20
<212> TYPE: DNA
<213> ORGANISM: Artificial Sequence
<220> FEATURE:
<223> OTHER INFORMATION: DNA sequence corresponding to TSC2 targetting
      sgRNA

<400> SEQUENCE: 38
aatcccaggt gtgcagaagg                                                20
```